United States Patent [19]
Parrish et al.

[11] Patent Number: 6,028,309
[45] Date of Patent: Feb. 22, 2000

[54] METHODS AND CIRCUITRY FOR CORRECTING TEMPERATURE-INDUCED ERRORS IN MICROBOLOMETER FOCAL PLANE ARRAY

[75] Inventors: William J. Parrish, Santa Barbara; James T. Woolaway, Goleta, both of Calif.

[73] Assignee: Indigo Systems Corporation, Santa Barbara, Calif.

[21] Appl. No.: 09/021,714

[22] Filed: Feb. 10, 1998

Related U.S. Application Data

[63] Continuation-in-part of application No. 08/799,663, Feb. 11, 1997, Pat. No. 5,756,999.

[51] Int. Cl.$^7$ .................................. G01J 5/20; G01J 5/24
[52] U.S. Cl. .................. 250/332; 250/338.1; 250/338.4; 250/252.1
[58] Field of Search ............................. 250/338.1, 338.4, 250/349, 370.08, 252.1 A, 332

[56] References Cited

U.S. PATENT DOCUMENTS

| | | | |
|---|---|---|---|
| 5,286,976 | 2/1994 | Cole | 250/349 |
| 5,367,167 | 11/1994 | Keenan | 250/338.4 |
| 5,486,698 | 1/1996 | Hanson et al. | 250/332 |
| 5,489,776 | 2/1996 | Lung | 250/332 |
| 5,554,849 | 9/1996 | Gates | 250/370.08 |

OTHER PUBLICATIONS

C.G. Bethea et al., "Long Wavelength Infrared 128×128 $Al_xGa_{1-x}As$/GaAs Quantum Well infrared Camera and Imaging System", IEEE Transactions on Electron Devices, vol. 40, No. 11, Nov. 1993, pp. 1957–1963.

*Primary Examiner*—Constantine Hannaher
*Assistant Examiner*—Albert Gagliardi
*Attorney, Agent, or Firm*—Skjerven, Morrill, MacPherson, Franklin & Friel LLP; David E. Steuber

[57] ABSTRACT

Correction for temperature-induced non-uniformities in the response characteristics of the microbolometers in an infrared focal plane array (FPA) is performed by applying a non-uniform corrective bias to the individual microbolometers. The corrective bias is applied either before or during the bias or integration period during which the detectors are sampled. The bias-correction can be applied to two-dimensional detector multiplexers at each column amplifier input, the reference potential for each column amplifier or the voltage supply for each detector element. The magnitude of each corrective bias is determined by calibrating the detectors at different temperatures and different levels of incident infrared radiation. According to another aspect of this invention, a microbolometer which is thermally-shorted to the substrate on which the read out integrated circuit (ROIC) is formed is used along with the sensing microbolometer to compensate for variations in temperature. In some embodiments, an adjustable voltage is applied to the thermally-shorted microbolometer to provide an offset correction. Circuitry for providing on-ROIC substrate temperature control is also described. This invention allows the operation of a microbolometer FPA over a wider range of device substrate temperatures and thereby significantly reduces the complexity and cost of the system as compared with the conventional technique of cooling the FPA.

17 Claims, 41 Drawing Sheets

INCIDENT
INFRARED RADIATION

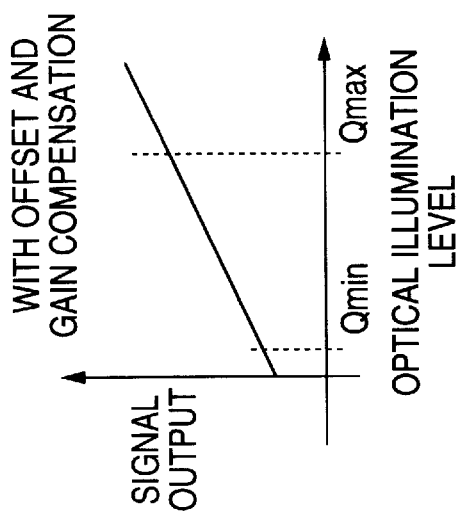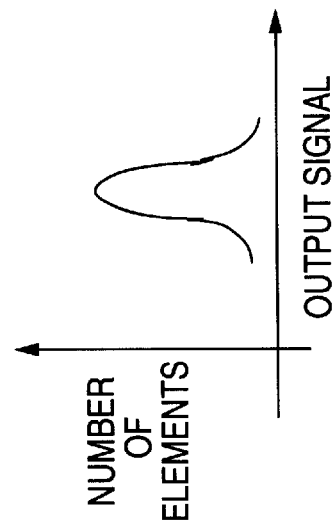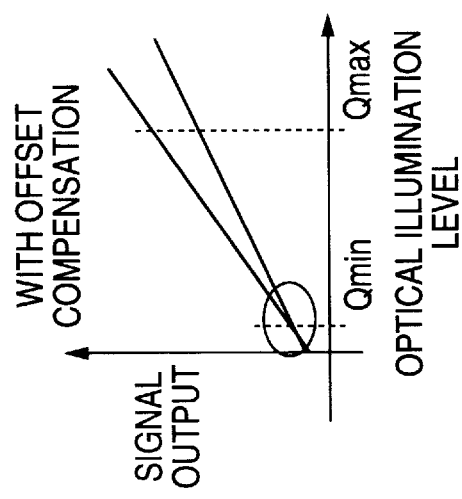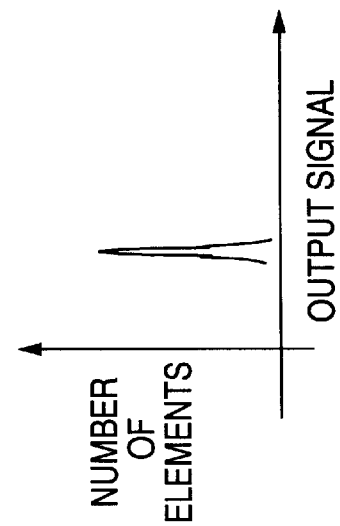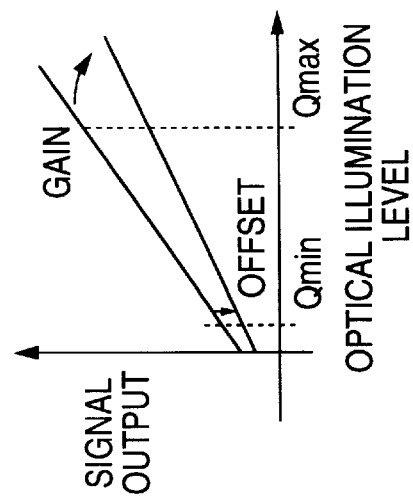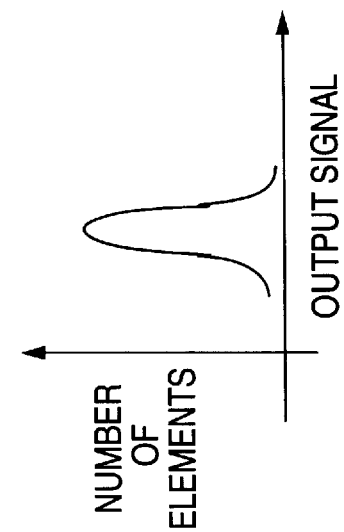

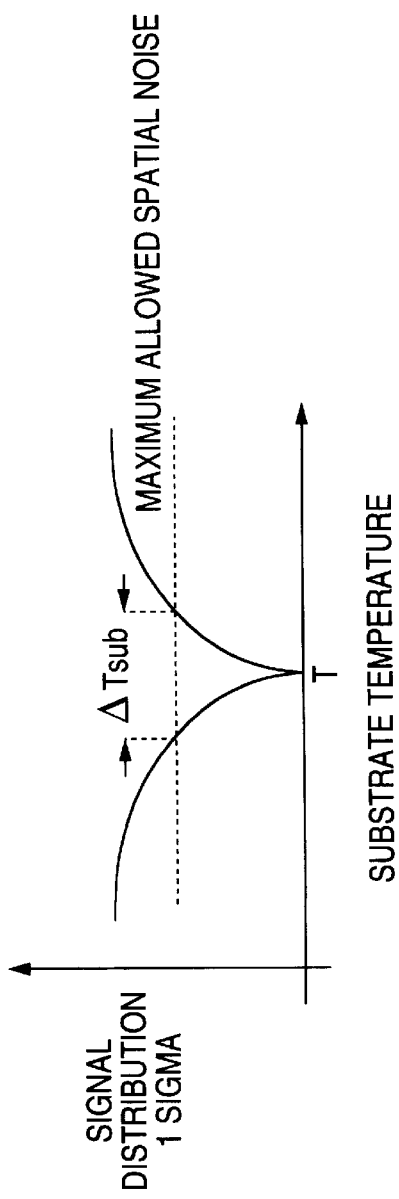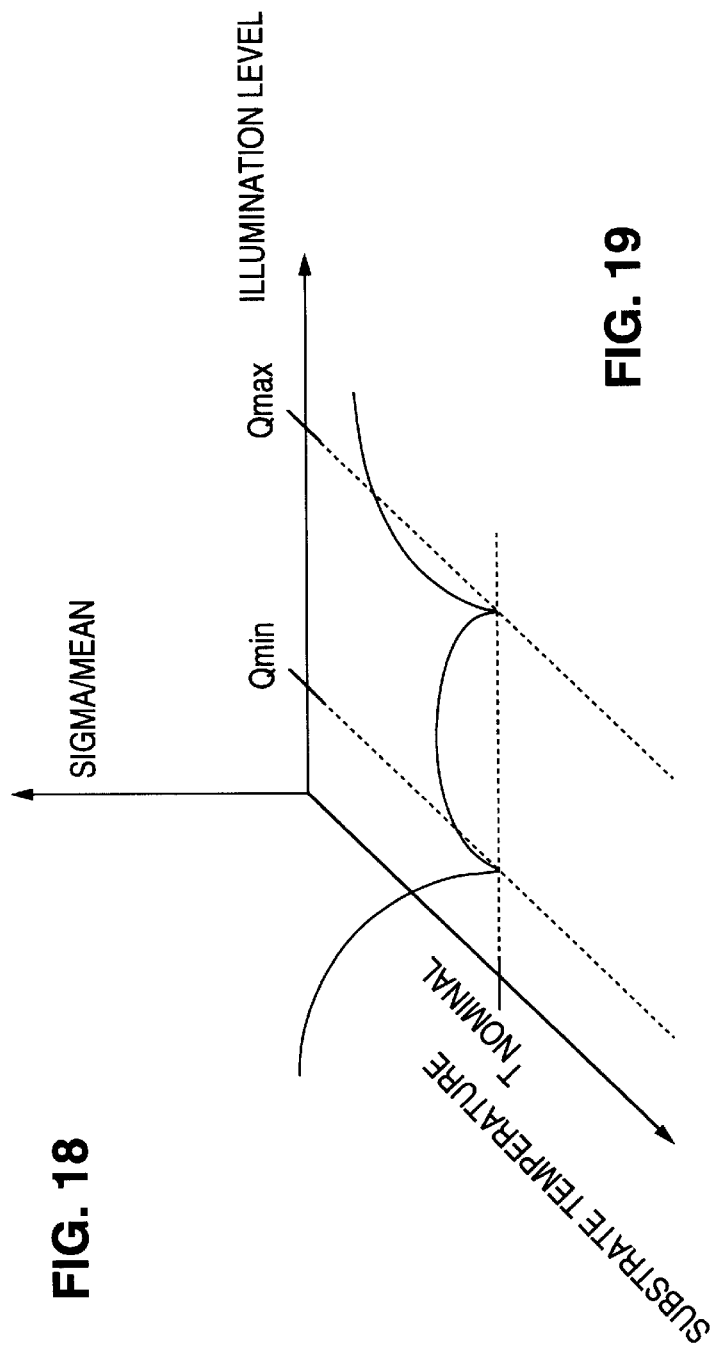

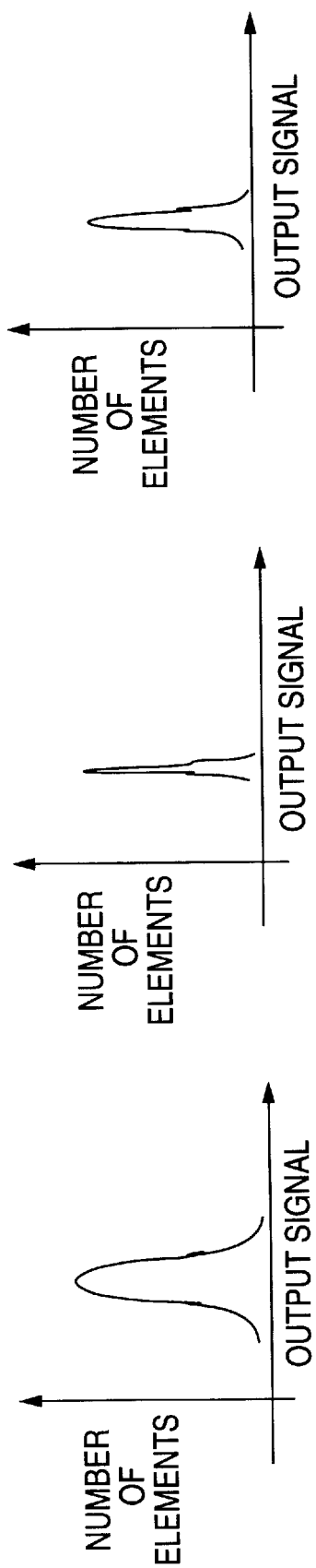
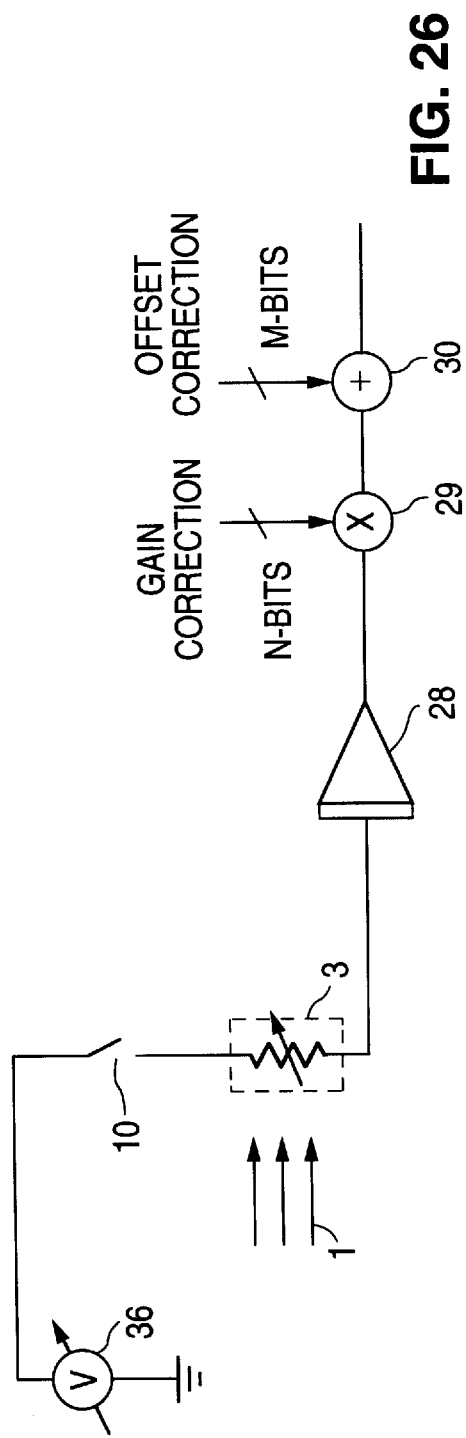

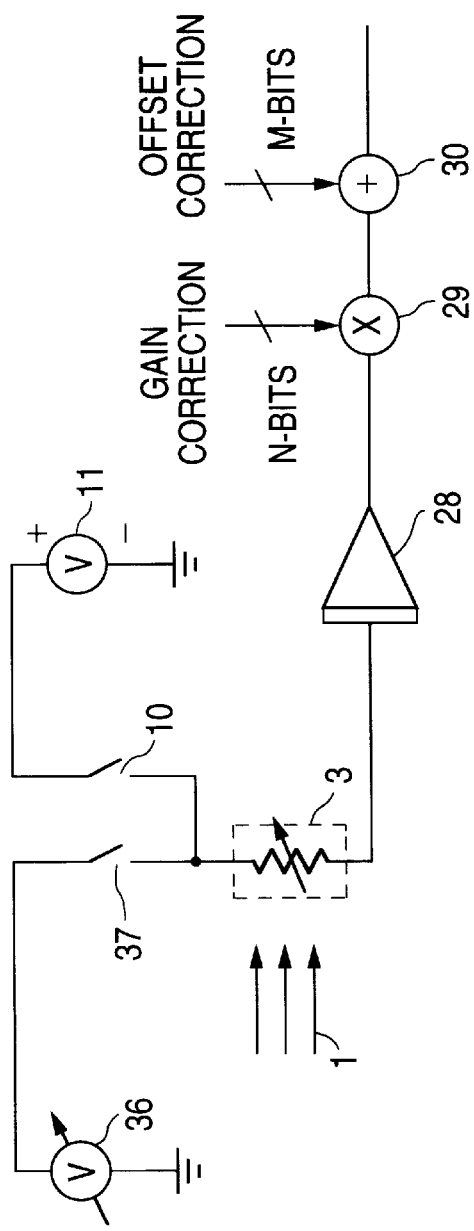
FIG. 27
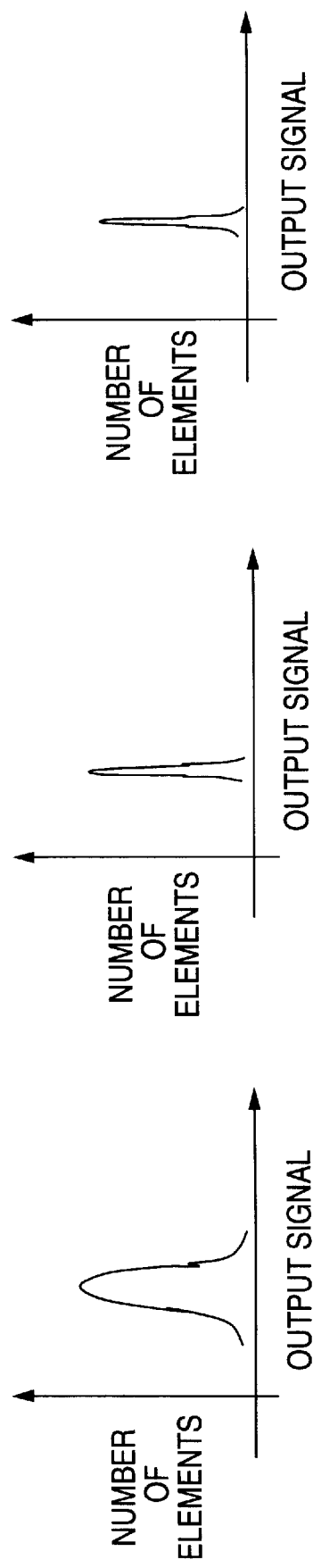
FIG. 28C
FIG. 28B
FIG. 28A

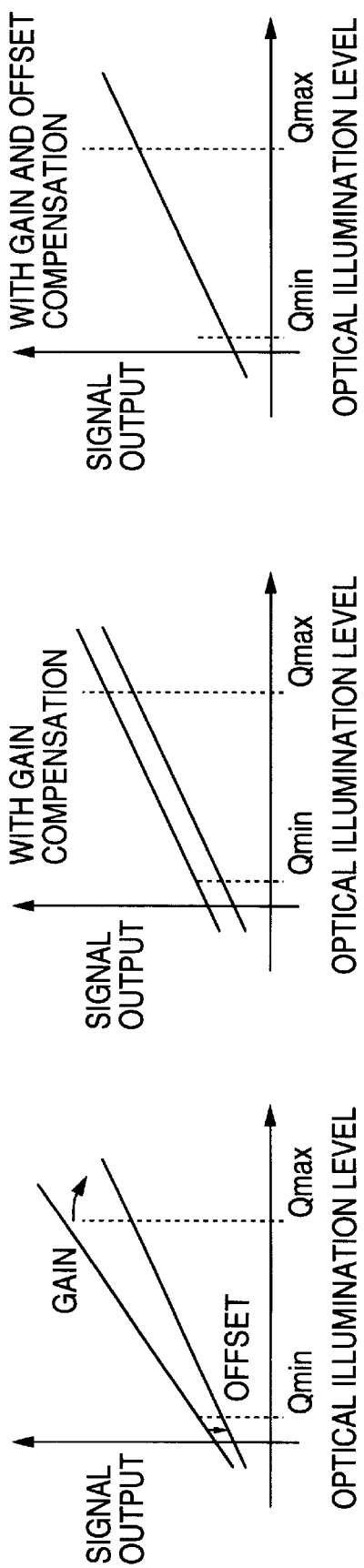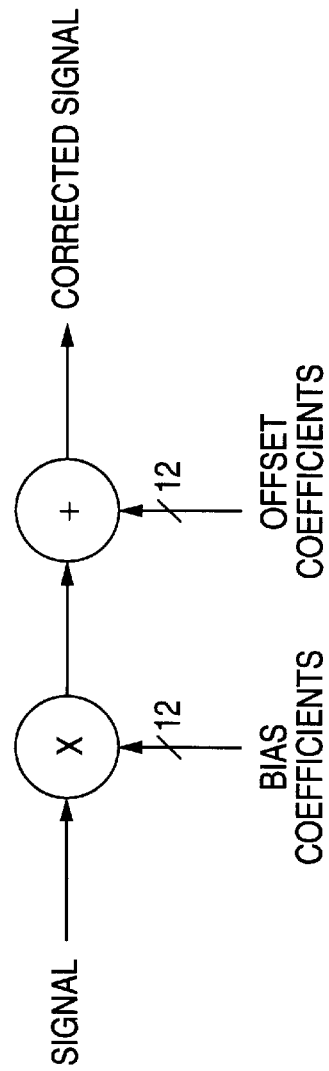

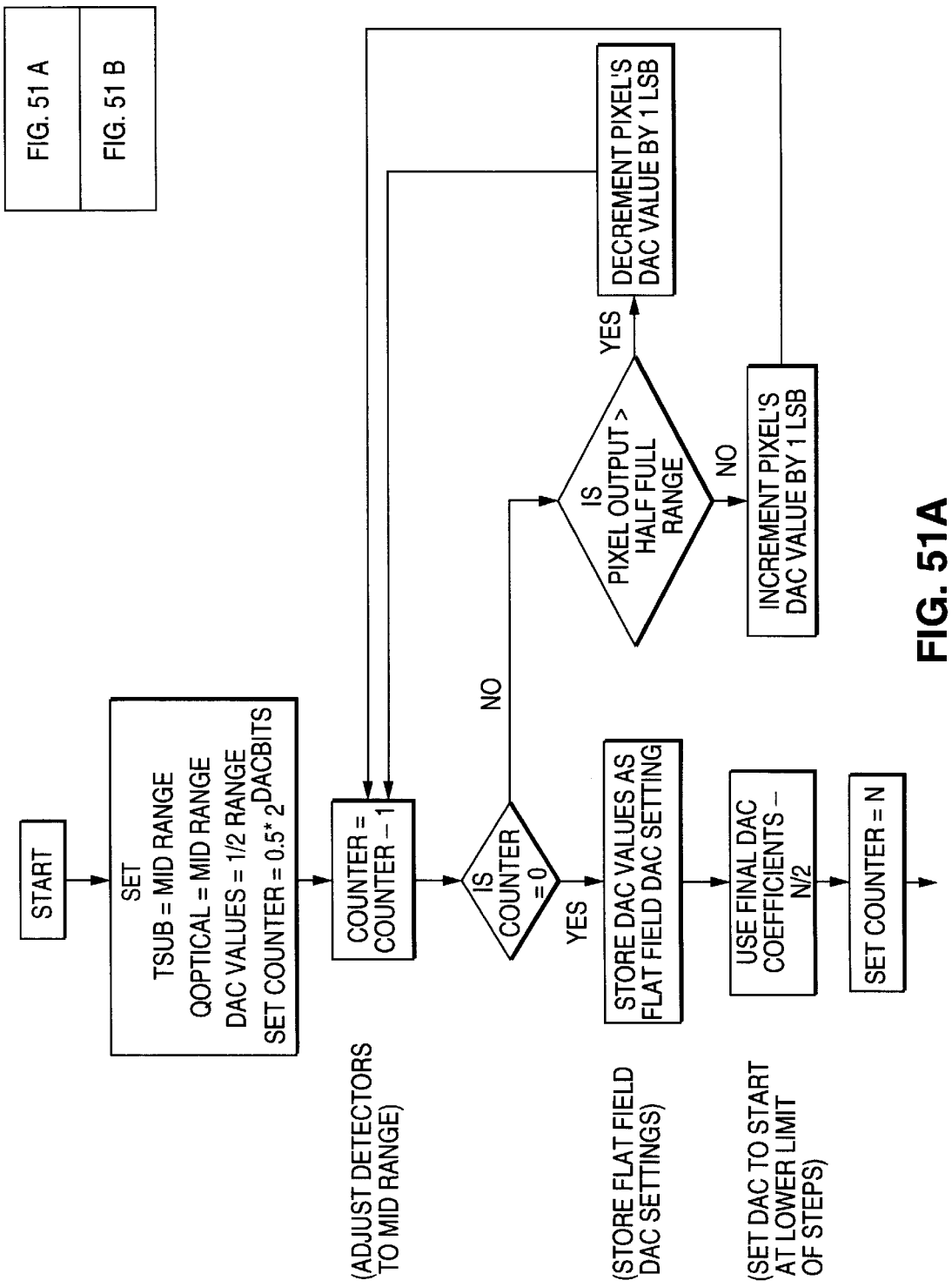

METHODS AND CIRCUITRY FOR CORRECTING TEMPERATURE-INDUCED ERRORS IN MICROBOLOMETER FOCAL PLANE ARRAY

REFERENCE TO RELATED APPLICATION

This application is a continuation-in-part of application Ser. No. 08/799,663, filed Feb. 11, 1997, now U.S. Pat. No. 5,756,999, which is incorporated herein by reference in its entirety.

BACKGROUND OF THE INVENTION

During the 1880's, an infrared detector called the bolometer was developed. The bolometer operates on the principle that the electrical resistance of the bolometer material changes with respect to the bolometer temperature, which in turn changes in response to the quantity of absorbed incident infrared radiation. These characteristics can be exploited to measure incident infrared radiation on the bolometer by sensing the resulting change in its resistance. When used as an infrared detector, the bolometer is generally thermally isolated from its supporting substrate or surroundings to allow the absorbed incident infrared radiation to generate a temperature change in the bolometer material.

Modern microbolometer structures were developed by the Honeywell Corporation. For a recent summary of references see U.S. Pat. No. 5,420,419. Microbolometer arrays are typically fabricated on monolithic silicon substrates or integrated circuits by constructing two-dimensional arrays of closely spaced air bridge structures coated with a temperature sensitive resistive material, such as vanadium oxide, that absorbs infrared radiation. The air bridge structure provides good thermal isolation between the microbolometer detector and the silicon substrate. A typical microbolometer structure measures approximately 50 microns by 50 microns.

Microbolometer arrays can be used to sense a focal plane of incident radiation (typically infrared) by absorbing the radiation and producing a corresponding change in the temperatures and therefore resistances of each microbolometer in the array. With each microbolometer functioning as a pixel, a two-dimensional image or picture representation of the incident infrared radiation can be generated by translating the changes in resistance of each microbolometer into a time-multiplexed electrical signal that can be displayed on a monitor or stored in a computer. The circuitry used to perform this translation is commonly known as the Read Out Integrated Circuit (ROIC), and is fabricated as an integrated circuit in the silicon substrate. The microbolometer array is then fabricated on top of the ROIC. The combination of the ROIC and microbolometer array is commonly known as a microbolometer infrared Focal Plane Array (FPA). Microbolometer FPAs containing as many as 320×240 detectors have been demonstrated.

Individual microbolometer detectors will have non-uniform responses to uniform incident infrared radiation, even when the bolometers are manufactured as part of a microbolometer FPA. This is due to small variations in the detectors' electrical and thermal properties as a result of the manufacturing process. These non-uniformities in the microbolometer response characteristics must be corrected to produce an electrical signal with adequate signal-to-noise ratio for image display or processing.

Under the conditions where uniform electrical bias and incident infrared radiation are applied to an array of microbolometer detectors, differences in detector response will occur. This is commonly referred to as spatial non-uniformity, and is due to the variations in a number of critical performance characteristics of the microbolometer detectors. This is a natural result of the microbolometer fabrication process. The characteristics contributing to spatial non-uniformity include the infrared radiation absorption coefficient, resistance, temperature coefficient of resistance (TCR), heat capacity, and thermal conductivity of the individual detectors.

The magnitude of the response non-uniformity can be substantially larger than the magnitude of the actual response due to the incident infrared radiation. The resulting ROIC output signal is difficult to process, as it requires system interface electronics having a very high dynamic range. In order to achieve an output signal dominated by the level of incident infrared radiation, processing to correct for detector non-uniformity is required.

Previous methods for implementing an ROIC for microbolometer arrays have used an architecture wherein the resistance of each microbolometer is sensed by applying a uniform voltage and current and a resistive load to the microbolometer element. The current resulting from the applied voltage is integrated over time by an amplifier to produce an output voltage level proportional to the value of the integrated current. The output voltage is then multiplexed to the signal acquisition system.

Gain and offset corrections are applied to the output signal to correct for the errors which arise from the microbolometer property non-uniformities. This process is commonly referred to as two-point correction. In this technique two correction coefficients are applied to the sampled signal of each element. The gain correction is implemented by multiplying the output voltage by a unique gain coefficient. The offset correction is implemented by an adding a unique offset coefficient to the output voltage. Both analog and digital techniques have been utilized to perform two-point non-uniformity correction.

The current state-of-the-art in microbolometer array ROICs suffers from two principal problems. The first problem is that the large magnitude of the microbolometer introduced non-uniformities in the ROIC output signal requires a large instantaneous dynamic range in the sensor interface electronics, increasing the cost and complexity for the system. Current advanced ROIC architectures incorporate part of the correction on the ROIC to minimize the instantaneous dynamic range requirements at the acquisition systems interface.

The second problem is that the application of a fixed coefficient two-point gain and offset correction method to minimize array non-uniformity works well only for a very small range of substrate temperatures, on the order of 0.005 to 0.025 degrees Kelvin. In order to maintain the substrate temperature within this range, a thermo-electric cooler, temperature sensor, and temperature control electronics are required, again adding to system cost and complexity.

Microbolometer Operation

FIGS. 1A, 1B and 1C illustrate three possible configurations for microbolometer detectors. Incident infrared radiation 1 is projected onto each of the microbolometer detectors. The microbolometer detector 2, shown in FIG. 1A, is thermally-shorted to the substrate material. This is a common form of bolometer and is representative of most single-detector bolometers and thermistors. Microbolometers can be manufactured to provide a high thermal conductivity to the substrate, or this property can be introduced through post-processing whereby a thermally conductive material is selectively applied to these microbolometer detectors. Although this detector is thermally connected to the substrate, the resistance properties and temperature coefficient of resistance (TCR) of these detectors are equivalent to the thermally isolated microbolometer detector 3, shown in FIG. 1B. These detectors have a high TCR (1% to 5%/° C.) which is designated by the arrow in the resistor symbol.

The thermally isolated microbolometer 3 is most commonly used to sense infrared radiation. Microbolometer 3 is thermally isolated from its supporting substrate or surroundings to allow the absorbed incident infrared radiation to generate a temperature change in the microbolometer material. In FIG. 1B, this isolation is designated by the dashed square box around the detector.

The final configuration, shown in FIG. 1C, is the shielded microbolometer 4. The shielded microbolometer 4 is identical to the isolated microbolometer 3 with the exception that incident infrared radiation 1 is shielded from the microbolometer. The radiation shield is designated by a solid line 5 in FIG. 1C.

The principles of operation for the microbolometers shown in FIGS. 1A–1C are as follows. The temperature of the non-isolated microbolometer 2 is dominated by the high thermal conductivity to the substrate. Therefore incident infrared radiation and electrical power dissipated in the microbolometer have little effect on the temperature of the microbolometer. Microbolometer 2 has the same high TCR as the thermally isolated microbolometer 3 and therefore provides a high sensitivity reference to the substrate temperature.

The thermally isolated microbolometer 3 changes temperature in response to the incident radiation level, changes in the substrate temperature, and the electrical power dissipated in the detector during the measurement of the microbolometer resistance. The heating due to resistive measurement is referred to as self-heating. As fabricated, the thermally isolated microbolometer is not perfectly insulated from the substrate. Therefore the temperature of the thermally isolated microbolometer does track the substrate temperature to some extent, although the rate of temperature change due to this mechanism is much slower than those due to incident radiation or self-heating.

The shielded isolated microbolometer 4 does not change temperature in response to the incident radiation level, but does change temperature as a result of self heating and temperature changes in the substrate.

FIGS. 2–4 illustrate three commonly used techniques for measuring the resistance of the microbolometer detector. FIG. 2 shows the applied voltage method of sensing the detector resistance. An applied voltage is used to generate a current in the circuit designated Iout. By measuring the current Iout the resistance of the microbolometer detector can be determined. The relationship between the applied voltage and measured current is defined by Ohms Law.

$$Iout = \frac{Vapplied}{Rbolometer}$$

Where Iout is the measured current, Vapplied is the applied voltage and Rbolometer is the microbolometer detector resistance.

A second method for measuring the microbolometer resistance is shown in FIG. 3. Here a constant current is applied to the microbolometer detector 3, and the voltage that develops across the microbolometer as a result is measured. Again Ohms Law defines the relationship between the applied current and the measured voltage.

Vout=Iapplied*Rbolometer

A third method for measuring the microbolometer resistance is shown in FIG. 4. This circuit includes a resistive load 6. A voltage is applied across the series combination of the microbolometer 3 and the load 6. The microbolometer resistance can be determined by measuring the voltage across the microbolometer. The following expression describes the microbolometer resistance as a function of applied voltage, load resistance, and the measured voltage across the microbolometer.

$$Rbolometer = \frac{Rload}{(Vapplied / Vout) - 1}$$

where Rload is the value of load resistor 6.

These circuit implementations can be used to measure infrared radiation incident on the microbolometer by sensing the change in microbolometer temperature due to the optical (infrared) energy absorbed by the detector. The temperature rise in the microbolometer detector due to self-heating generally is significantly larger than the temperature rise resulting from the incident infrared radiation. The relatively small contribution of incident radiation to the change in microbolometer resistance is difficult to detect. For this reason, it is desirable to incorporate more complex circuits using in-circuit reference schemes in order to minimize the contribution of self-heating to the output signal. In the case of the resistive load circuit approach (FIG. 4), the load resistor 6 may be designed to have a low temperature coefficient of resistance, or it may be thermally-shorted to the substrate, or shielded from incident infrared radiation.

Circuit bridge concepts have been designed to minimize the errors in resistance measurement due to self-heating. FIG. 5 illustrates a microbolometer bridge concept used to isolate and measure only the level of incident infrared radiation. Here a microbolometer that is thermally isolated and shielded from incident radiation is shown in a bridge configuration with three conventional low TCR resistors, 6a, 6b and 6c. The output voltage in FIG. 5 will remain relatively constant in spite of a change in ambient temperature, because the increase in resistance of the microbolometer detector and the shielded microbolometer will increase by approximately the same amount and keep the voltage drops across the elements of the bridge circuit approximately unchanged.

Microbolometer Focal Plane Arrays

In systems where a single detector is employed, two conductive leads can be attached to the microbolometer material providing a means of conducting current through the microbolometer to sense its resistance. FIG. 6 illustrates the electrical connection to the microbolometer detector. In this case, a thermally isolated microbolometer 3 is shown in the presence of incident infrared radiation 1 with two leads connecting to microbolometer terminals R+ and R−. FIG. 7 shows the physical implementation of a microbolometer of the kind developed by Honeywell. The R+ and R− electrical connections to the microbolometer are created at the ends of the legs 9 where the microbolometer comes in contact with the substrate 8.

In cases where it is desired to sense the resistance or temperature of an array of microbolometer detectors it becomes physically impractical to provide individual wire lead connections for each detector. FIGS. 8 and 9 illustrate the method of interconnecting to a microbolometer detector array. Shown in FIGS. 8 and 9 is a three-by-three detector array requiring nine positive and negative interconnects. Interconnects for the individual microbolometer detectors 3 in the array are created as part of the fabrication process, and contact the circuitry in the silicon substrate 8.

Large two-dimensional arrays of microbolometers can utilize a Read Out Integrated Circuit (ROIC) to provide the required bolometer interface. The ROIC incorporates circuitry that is placed in spatial proximity to the detectors to perform the functions of the detector interface and multiplexing. The circuitry associated with a particular microbolometer detector is often located in the silicon substrate directly beneath the detector and is referred to as the unit cell.

By time-multiplexing signals of the microbolometer detectors the number of required electrical interconnect leads can be greatly reduced. FIG. 10 shows schematically a one-dimensional multiplexing scheme for a microbolometer array. Three microbolometer detectors 3 are multiplexed to a single column amplifier 15. A row enable line 16 is used to control an address switch 10 in a unit cell 14. This allows selective connection of the unit cell bolometers to the column amplifier 12. The current through each microbolometer detector will be sequentially sampled for integration by the amplifier. The order of sequencing and the time period of each sample is determined by the sequencing and duration of each row enable signal's active period. In this embodiment a uniform bias 11 is applied to the microbolometer array at the time each detector is addressed. A conventional inverting amplifier 12, and its feedback element 13 is shown in the column amplifier block 15. In an actual ROIC the address switches 10 shown in FIG. 10 would be implemented as MOS or bipolar transistors, and are shown as switches to simplify the illustration.

Multiplexing can be expanded to a second dimension by arraying the one-dimensional configuration shown in FIG. 10. The resulting two-dimensional three-by-three configuration is shown in FIG. 11. The two-dimensional array is implemented by adding column interconnects and incorporating column multiplexing switches 18. Column amplifiers 15 shown in FIG. 10 have been modified to incorporate a sample and hold stage 12A to allow time-simultaneous sampling of the signal in the column dimension. Outputs from sample and hold stages 12A are selected by the column enable signal 19 that controls the column switch 18. An output line 17 common to all columns is used to bus the output signals from the column amplifiers 15 to the ROIC output.

To simplify the multiplexing process and system interface, the ROIC contains digital logic circuitry to generate the signals required to control the row and column address switches. FIGS. 12 and 13 show an implementation of logic circuitry capable of generating the addressing signals for the row and column address switches. In each case a chain of D-flip flops 21 is used to shift an addressing signal through the row and column enables. The multiplexing process is performed by enabling a row and then sequentially enabling the column selects.

The addressing synchronization signals RowSync and ColumnSync (FIGS. 12 and 13 respectively) are inputs to the ROIC or are generated by on-ROIC logic. These signals are driven to the first D-flop's 21 "D" terminal and inverted by inverter 20 to the "D-bar" terminal. Row and column clocks are used to shift the sync pulses down the shift registers. AND gates 22 are used to decode a unique addressing state for each of the Row Enable and Column Enable outputs.

FIG. 14 illustrates the placement of the components to provide a ROIC for an 8×8 array of microbolometer detectors. The array of unit cells, column amplifiers, a column multiplexer 25 and a row 26 multiplexer are integrated on to a single ROIC silicon die. The microbolometer array is constructed on top of the unit cell array. In addition to the circuits previously described, bias generation and timing control circuitry 24 and an output amplifier 27 are included. The ROIC provides critical interfaces for both the microbolometer detector array and the external system.

Microbolometer Non-Uniformity Correction

When uniform electrical bias and incident infrared radiation are applied to an array of microbolometer detectors, differences in detector response will occur. As noted above, this is commonly referred to as spatial non-uniformity, and is due to the distribution in values of a number of critical performance characteristics of the microbolometer detectors, a natural result of the microbolometer fabrication process. The characteristics contributing to detector non-uniformity include the detectors' infrared radiation absorption coefficient, resistance, temperature coefficient of resistance (TCR), heat capacity, and thermal conductivity.

The magnitude of the response non-uniformity can be substantially larger than the magnitude of the response due to the incident infrared radiation. The resulting ROIC output signal is difficult to process as it requires system interface electronics having a very high dynamic range. In order to achieve an output signal dominated by the response due to incident infrared radiation, processing to correct for detector non-uniformity is required.

FIG. 15 shows a conventional method to correct for microbolometer non-uniformities. A single detector signal path is shown for simplicity. Here a uniform bias 11 is applied to all of the microbolometer array detectors 3. Current from the microbolometer is integrated by the integration stage 28. Offset 29 and gain 30 correction functions are shown at the output of the integration stage. The offset and gain corrections are addition and multiplication functions, respectively. These functions together are commonly referred to as two-point correction. It is possible for the offset and gain corrections to be implemented as a part of the integration stage or after the integration stage, on or off of the ROIC, and either in analog or digital form. In addition, the offset correction can be performed either before or after the gain correction.

FIGS. 16A, 16B and 16C illustrate the traditional two-point correction technique. The graph in FIG. 16A shows the transfer function for two detectors having different responses to the same optical (infrared) stimulus. Qmin and Qmax are the maximum and minimum anticipated levels of infrared radiation, respectively. The graph in FIG. 16B shows the application of offset correction. Offset correction coefficients are acquired at Qmin for this operation. The graph in FIG. 16C shows the application of both offset and gain correction. Here gain coefficients are calculated for signal response between Qmin and Qmax. For arrays with linear signal transfer functions, this technique can provide a high degree of correction and produce an image that is pleasing to the eye. However, due to the high sensitivity of microbolometer arrays to substrate temperature, traditional two-point correction methods are successful for only a small range of substrate temperatures.

Values for the gain and offset correction terms, or coefficients, are specific to each microbolometer detector and are generated and stored during a calibration process. For a constant substrate temperature, two uniform infrared illumination levels (such as Qmin and Qmax) can be used to acquire the gain and offset correction coefficients. At a substrate temperature $T_1$ and uniform infrared illumination level Qmin, the signal outputs of the detectors can be used to derive the offset coefficients. By then changing the uniform infrared illumination to a different level Qmax while maintaining the substrate temperature at $T_1$, the gain coefficients can be calculated from the output signals.

The gain and offset correction coefficients generated in this way are normally stored in a correction coefficient memory. The output signal from the sensor is converted to digital form and is processed through gain and offset (multiply and addition) processes. Correction coefficient data are retrieved from the correction coefficient memory and applied to the output data in the multiply and addition processes.

The two-point correction process is further described in C. G. Bethea et al., "Long Wavelength Infrared 128×128 $Al_xGa_{1-x}As$/GaAs Quantum Well Infrared Camera and Imaging System", IEEE Transactions On Electron Devices, Vol. 40, No. 11, November 1993, pp. 1957–1963, which is incorporated herein by reference in its entirety.

The conventional two-point correction process can provide spatial non-uniformity correction below the theoretical temporal noise of the microbolometer detectors. This correction technique is only effective, however, for a small range of microbolometer substrate temperature variations (on the order of 0.01 degree Kelvin).

FIGS. 17A–17C illustrate graphs showing the number of elements in a microbolometer array (vertical axis) having a given signal output (horizontal axis) in the presence of uniform input signals (bias and incident optical radiation). FIG. 17A shows the simulated uncorrected signal distribution for a microbolometer array. FIG. 17B shows the simulated resulting distribution after applying a two-point correction. FIG. 17C shows the simulated resulting signal distribution after the microbolometer substrate temperature has been changed.

It is thus apparent that microbolometer arrays have a large sensitivity to the ROIC substrate temperature. Changes in the substrate temperature introduce substantial errors to the non-uniformity correction results. FIG. 18 shows the two-point corrected signal distribution for an array of microbolometers as a function of substrate temperature. Temperature $T_1$ was used as the substrate temperature for the calibration process. For a substrate temperature equal to $T_1$, near ideal spatial non-uniformity correction is achieved. As the substrate temperature moves away from $T_1$ the spatial non-uniformity rapidly increases.

FIG. 19 shows the non-uniformity vs. optical signal for a microbolometer ROIC array corrected using the traditional two-point method. The vertical axis is plotted as sigma/mean of the array output signal, which is a measure of the spatial non-uniformity of the ROIC array. Qmin and Qmax are the optical illumination levels used to generate the two-point gain and offset correction coefficients. At optical illumination levels above Qmax or below Qmin the spatial non-uniformity for the sensor degrades rapidly. Also note that the spatial non-uniformity degrades between Qmin and Qmax, but to a limited extent due to nonlinearity.

For a microbolometer sensor array that has been corrected using the traditional two-point method with substrate temperature at Tnominal (the midpoint between the maximum and minimum expected temperatures), the spatial non-uniformity degrades rapidly when the substrate temperature is changed from Tnominal. This effect is shown in FIG. 20. Two points are shown where the spatial non-uniformity is at a minimum. These are at Qmin and Qmax where the substrate is at Tnominal. As the substrate temperature changes, the spatial non-uniformity and sigma/mean degrades rapidly.

Systems utilizing past microbolometer infrared detector technologies have required cooling systems, vacuum packaging systems and complex processing electronics to maintain the substrate temperature within a very tight tolerance (e.g., 0.01 degrees Kelvin). The added cost of these systems has impeded the development of a high-volume, low-cost commercial market for infrared imaging systems. A microbolometer infrared detector array which did not require high tolerance cooling would have the potential to become the first infrared technology to allow penetration into high-volume, low-cost commercial markets.

SUMMARY OF THE INVENTION

The following disclosure describes an invention that provides a new and greatly improved method for performing non-uniformity correction on microbolometer focal plane arrays. This invention allows a significant reduction in the complexity and cost associated with correcting the spatial non-uniformity of the microbolometer detectors and thus solves a significant technical problem impeding low-cost production of microbolometer infrared imaging systems.

The first section of this application describes embodiments of a circuit that incorporates substrate temperature compensation circuitry, providing the ability to perform non-uniformity correction for a range of substrate temperatures over 0.1 degree Kelvin (the prior art range was 0.005 to 0.025 degree Kelvin).

The first embodiment disclosed is a circuit which includes a common gate amplifier with a substrate temperature compensated load. This circuit provides substrate temperature compensation for the load impedance and offset current. The microbolometer array is uniformly biased by a bias generator and the source potential of the common gate amplifier. A second bias generator provides the common gate amplifier gate bias. A thermally-shorted microbolometer is used as a load for the circuit. A load bias can be adjusted to optimize the operating point for the circuit. A second amplifier is used to amplify the signal level at the node connecting the load resistor and the drain of the common gate amplifier. As a result of the substrate temperature compensation provided in this circuit, the range of substrate temperature change that is possible while maintaining the two-point corrected non-uniformity signal distribution below the microbolometer temporal noise level is increased by more than an order of magnitude over non-compensated circuit approaches.

The second section of this application describes methods by which a non-uniform bias is applied to a microbolometer array, providing the ability to perform non-uniformity correction for a range of substrate temperatures over 10 degrees Kelvin. Two methods are described. One method is a bias-correction method that is performed on the microbolometer detectors during the current integration period (also referred to as the "bias period"). The second method is a pre-bias-correction method that is performed on the microbolometer detectors before the current integration or bias period. With both the bias and pre-bias methods, the microbolometer detector array is biased such that the ratio among the output signals from the individual microbolometers remains nearly constant as the substrate temperature changes. After the bias or pre-bias correction method has been applied, a standard two-point gain and offset non-uniformity correction is used to correct the non-uniformities in the properties of the microbolometer detectors.

The bias-correction method involves the application of a unique voltage or current to each microbolometer detector during the integration period. The pre-bias-correction method involves the application of a unique voltage or current to each microbolometer detector prior to the integration period. The unique voltage or current may be applied with a digital-to-analog converter or with some other element such as a reactive component (e.g., a capacitor) connected in the circuit. The ultimate objective is to transfer a predetermined amount of energy to each microbolometer detector so as to vary the temperature of the detector by a predetermined amount. Any circuitry or components that achieve this purpose are within the scope of this invention.

The application of bias or pre-bias correction, followed by conventional two-point gain and offset correction, provides excellent non-uniformity correction over a much wider range of substrate temperatures than was previously possible. Either of these correction techniques results in a reduction in substrate temperature sensitivity of two to three orders of magnitude over previous correction schemes. The third section of this application describes circuits that can be used to implement the bias and pre-bias methods. All of the circuits described also incorporate substrate temperature compensation circuitry.

Two embodiments of circuitry using the bias-correction method for microbolometer infrared detectors are described, including a microbolometer bias-corrected common gate amplifier, and a microbolometer bias-corrected transimpedance amplifier, respectively. For each embodiment three versions are shown for the placement of the bias-correction circuitry.

The fourth section of this application describes circuitry for performing on-ROIC substrate temperature control for microbolometer infrared focal plane arrays.

In one embodiment, a circuit to perform on-ROIC substrate temperature control includes a current source for supplying a constant current through a thermally-shorted microbolometer. This circuit is used to sense the substrate temperature. An amplifier drives an on-ROIC resistor to heat the ROIC substrate to a constant temperature. A voltage source may be used to set the desired substrate temperature. A low pass filter may be used at the input of amplifier to stabilize the thermal control loop.

The resistive elements required to implement on-ROIC circuitry to control the temperature of the ROIC substrate are the substrate temperature sensor resistor and the heating element resistor. A material with a low thermal conductivity, such as silica glass, may be used to provide a thermal standoff from the surrounding environment.

The fifth section of this application describes circuitry located on the ROIC for controlling the offset of the signal generated by each microbolometer in the array.

This is accomplished by providing an adjustable bias across each thermally-shorted microbolometer. In one embodiment, an adjustable load bias is provided at the negative terminal of each thermally-shorted microbolometer, and the values of the load biases are set such that the voltage offsets resulting from the microbolometers in the array are equalized. In a second embodiment, an adjustable bias is applied to the gate of a transistor that is connected in series with the thermally-shorted microbolometer, and the values of the gate biases are set to control the size of the currents through the thermally-shorted microbolometers and thereby equalize the current offsets of the microbolometers in the array.

BRIEF DESCRIPTION OF THE DRAWINGS

FIGS. 16A, 16B and 16C illustrate a conventional two-point correction process using analog or digital correction methods.

FIGS. 17A, 17B and 17C are illustrations of the simulated correction process results and substrate temperature sensitivity for uniform applied microbolometer bias.

FIG. 18 is an illustration of the correction process temperature stability for uniform applied microbolometer bias.

FIG. 19 shows the result of applying two-point correction to the ROIC at constant substrate temperature equal to Tnominal.

FIGS. 25A, 25B and 25C are illustrations of the correction process results and substrate temperature sensitivity for uniform applied microbolometer bias using substrate temperature compensated circuit configurations.

FIG. 26 is a schematic diagram of a bias-corrected microbolometer with two-point offset non-uniformity correction.

FIG. 27 is a schematic diagram of a pre-bias-corrected microbolometer with two-point gain and offset non-uniformity correction.

FIGS. 28A, 28B and 28C are illustrations of the correction process results and temperature sensitivity for a bias or pre-bias-corrected microbolometer detector array.

FIGS. 45A, 45B, 45C and 45D illustrate a bias-corrected two-point compensation process using 12-bit coefficients.

FIG. 47A shows two detector transfer functions prior to compensation. FIG. 47B shows mean gain at the substrate temperatures Tmin and Tmax.

FIG. 48A shows two detectors transfer functions after bias-correction compensation. FIG. 48B shows the two detectors after bias-correction compensation and traditional gain and offset processing.

FIGS. 51A and 51B show a flow diagram for bias-corrected three-point compensated gain ratio correction coefficient generation.

DETAILED DESCRIPTION OF THE INVENTION

The first section of this detailed description describes circuit embodiments that incorporate substrate temperature compensation circuitry, providing the ability to perform non-uniformity correction for a range of substrate temperatures over 0.1 degree Kelvin.

The second section of this detailed description describes methods by which a non-uniform bias is applied to a microbolometer array, providing the ability to perform non-uniformity correction for a range of substrate temperatures over 10 degrees Kelvin.

The third section of this detailed description describes circuit embodiments that apply a non-uniform bias to a microbolometer array and incorporate substrate temperature compensation circuitry, providing the ability to perform non-uniformity correction for a range of substrate temperatures over 10 degrees Kelvin.

The fourth section of this detailed description describes circuitry to perform on-ROIC substrate temperature control for microbolometer infrared focal plane arrays.

The fifth section of this detailed description describes on-ROIC circuitry for correcting the offset of the voltage or current output of each microbolometer detector in the array.

Figure 21:
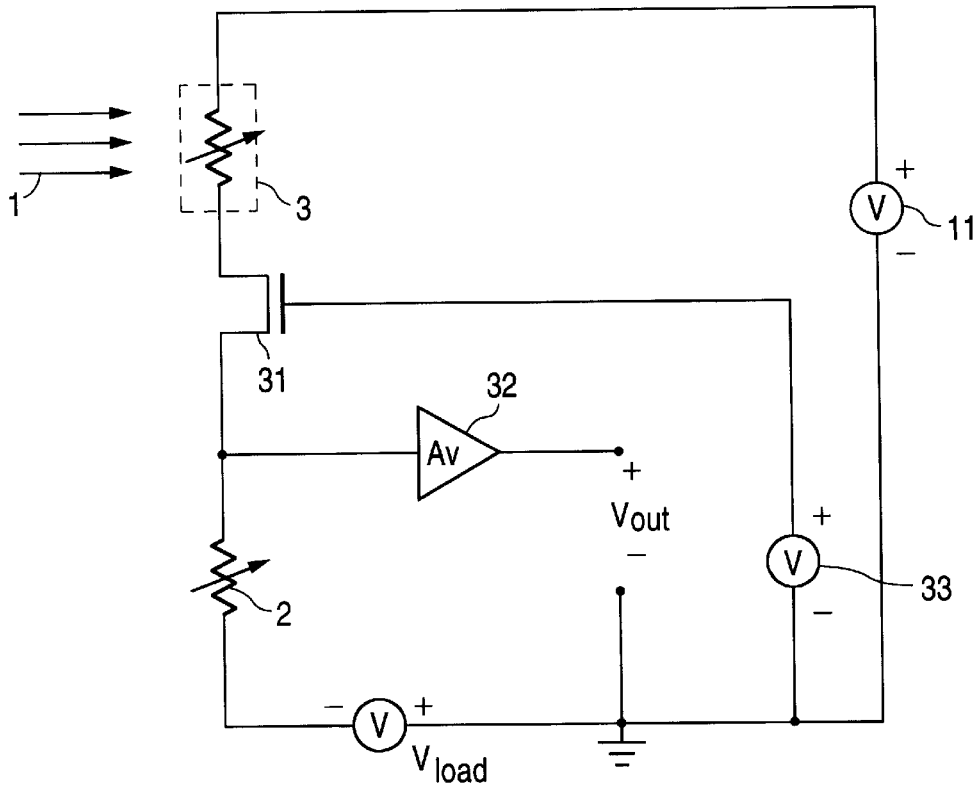
FIG. 21 is a schematic diagram of a common gate amplifier incorporating thermally-shorted micro-bolometer load to provide substrate temperature compensation.

I. Embodiments of Circuits that Incorporate Substrate Temperature Compensation Circuitry The first circuit disclosed includes a common gate amplifier with a substrate temperature compensated load, as shown in FIG. 21. This circuit provides substrate temperature compensation for the load impedance and offset current. A thermally isolated detector microbolometer 3 is uniformly biased by a bias generator 11 and the source potential of a common gate amplifier or MOSFET 31. A second bias generator 33 provides the gate bias for the common gate amplifier 31. A thermally-shorted microbolometer 2 is used as a substrate temperature compensated load for the circuit. Bias Vload is adjusted to optimize the operating point for the circuit by setting Vout at a desired point within a range of output voltages. A second amplifier 32 is used to amplify the signal level at the node connecting the load resistor (microbolometer 2) and the drain of the common gate amplifier 31. The common gate amplifier 31 shown is a PMOS transistor; however, an NMOS implementation is also possible.

Figure 1A:
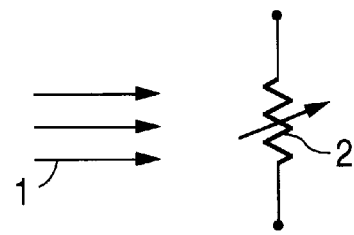
FIGS. 1A, 1B and 1C are illustrations of microbolometer symbols.
Figure 1B:
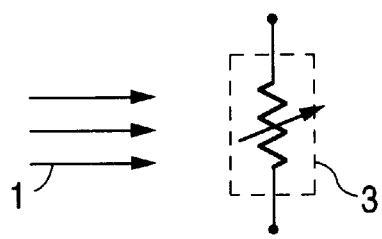
Figure 1C:
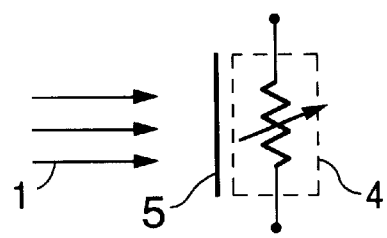
Figure 2:
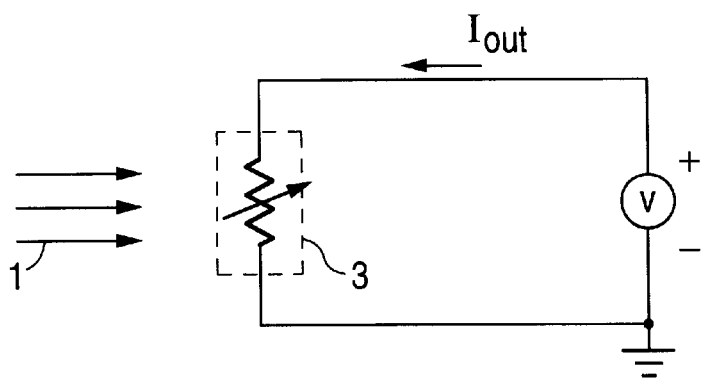
FIG. 2 is an illustration of the applied voltage method for measuring microbolometer resistance.
Figure 3:
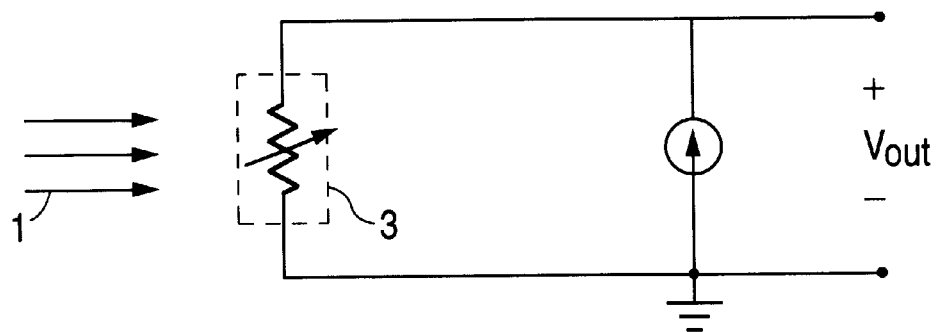
FIG. 3 is an illustration of the applied current method for measuring microbolometer resistance.
Figure 4:
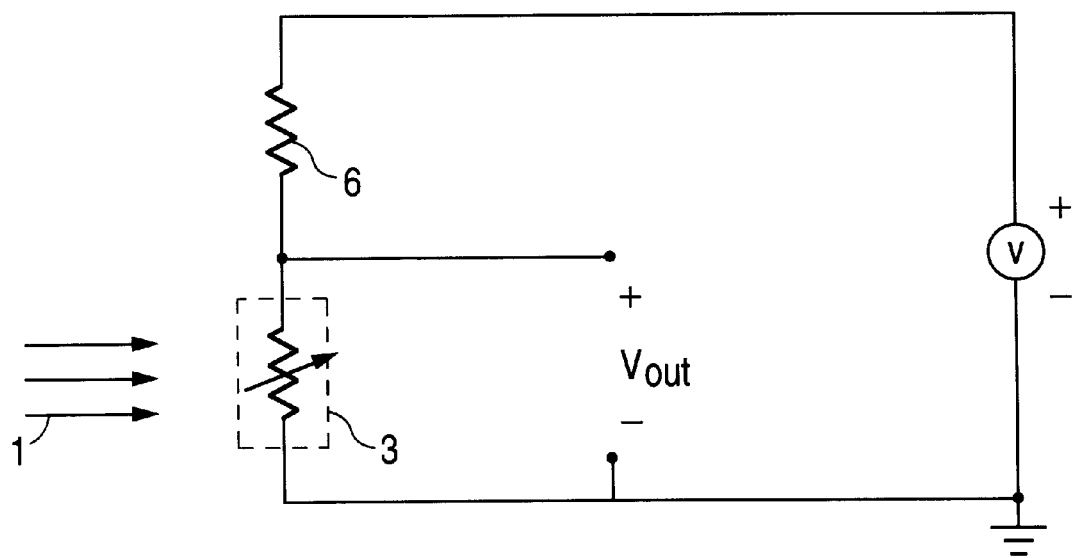
FIG. 4 is an illustration of the load resistor method for measuring microbolometer resistance.
Figure 5:
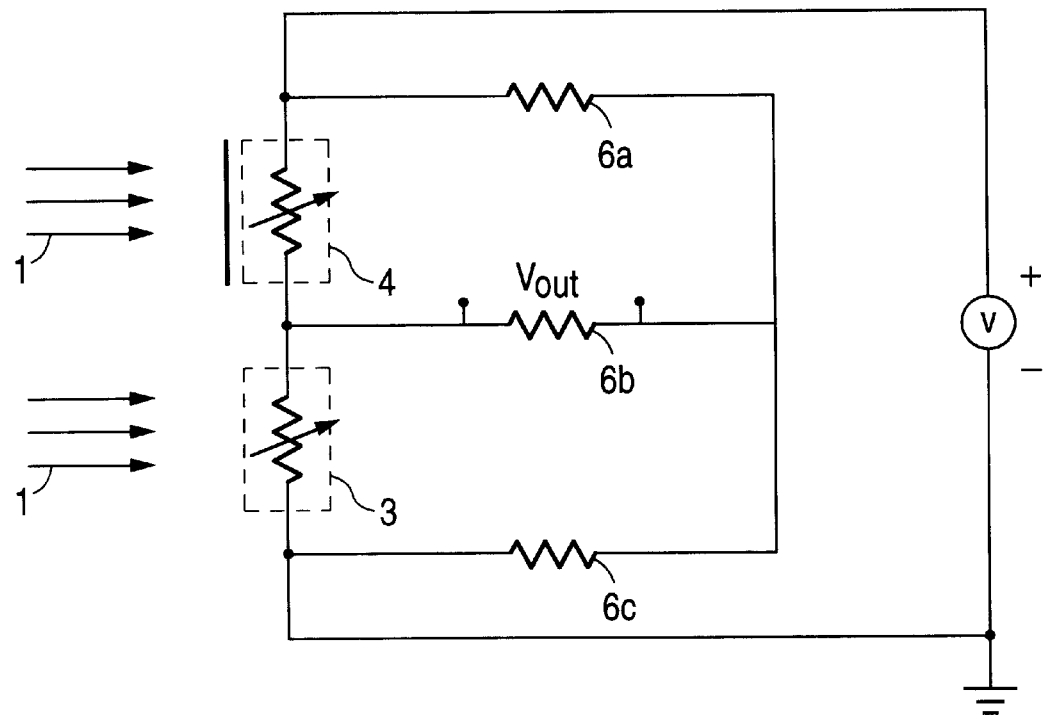
FIG. 5 is a schematic diagram of a bridge configuration using a shielded microbolometer for measuring microbolometer resistance.
Figure 6:
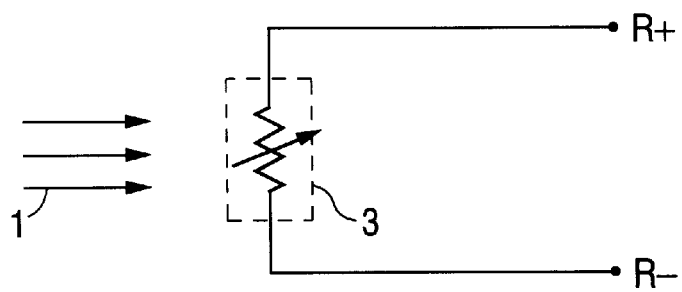
FIG. 6 is a schematic diagram of a single microbolometer with two terminal interconnection.
Figure 7:
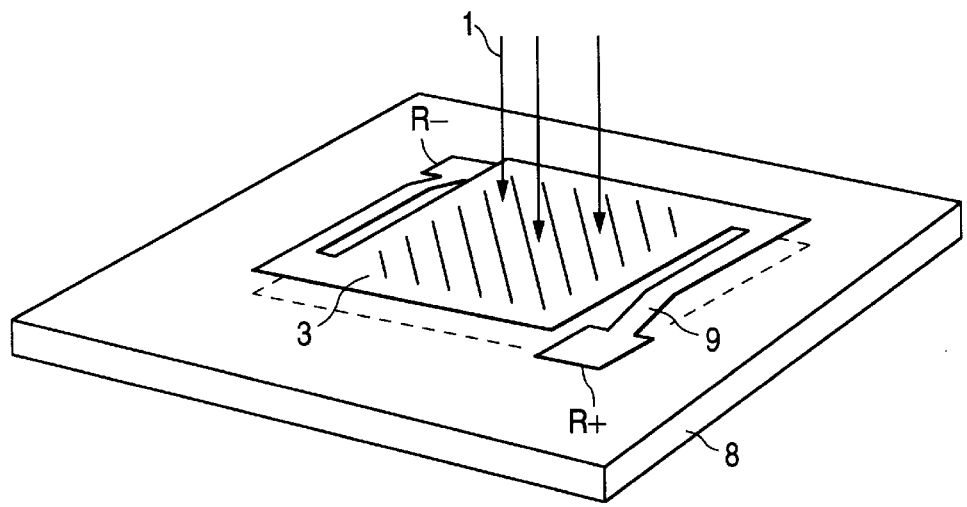
FIG. 7 is a perspective view of a single microbolometer detector.
Figure 8:
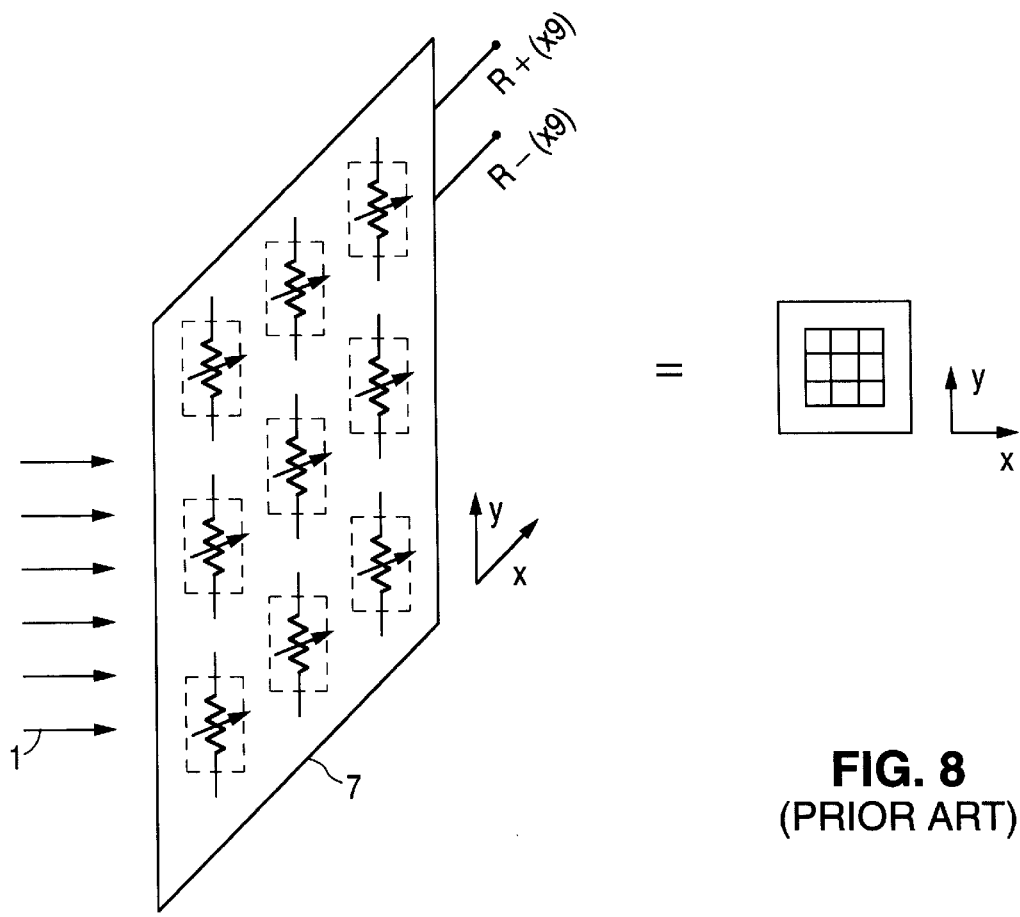
FIG. 8 is a schematic diagram of a three-by-three array of two-terminal bolometers showing nine positive and negative interconnect terminals.
Figure 9:
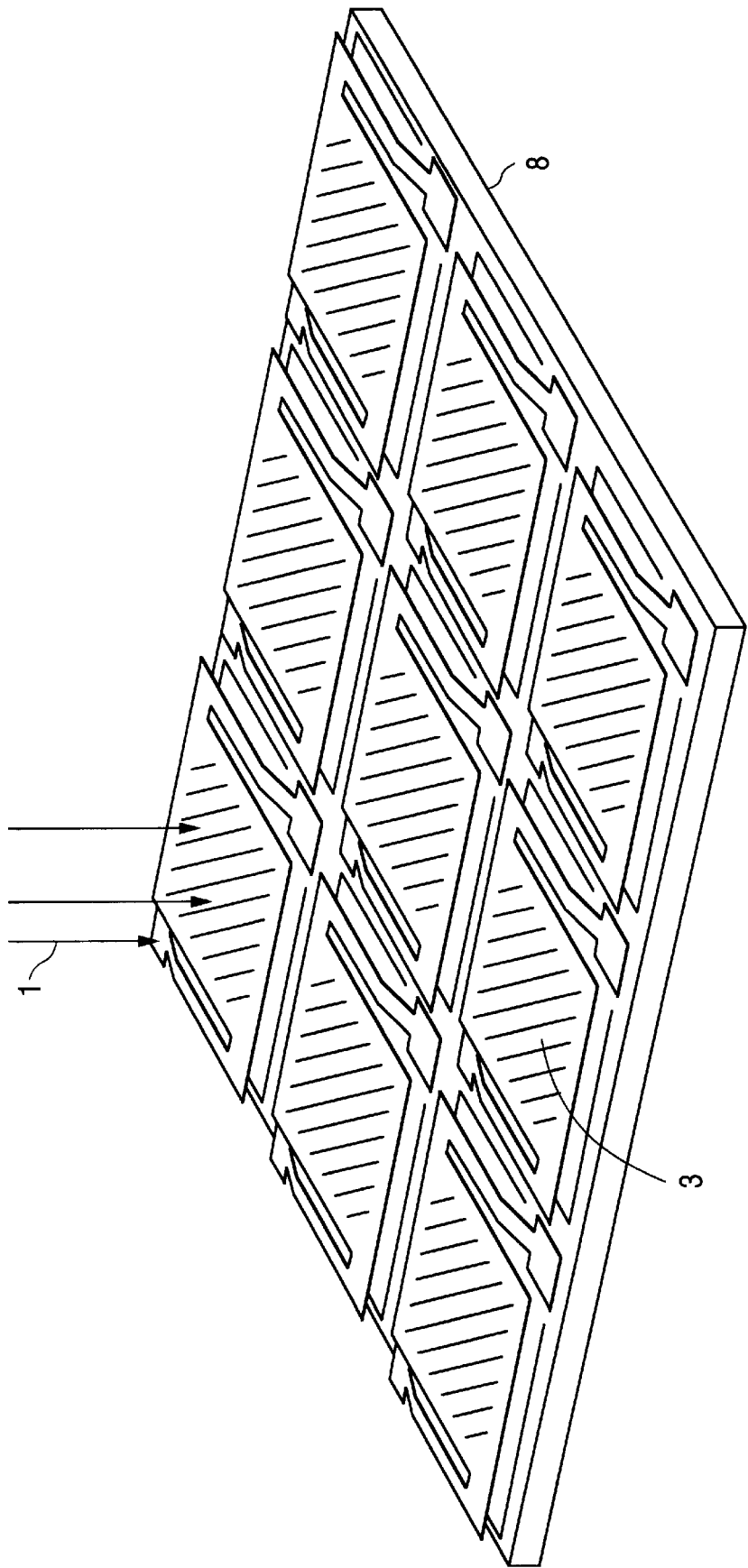
FIG. 9 is an illustration of a three-by-three array of two-terminal microbolometers requiring nine positive and nine negative interconnect terminals.
Figure 10:
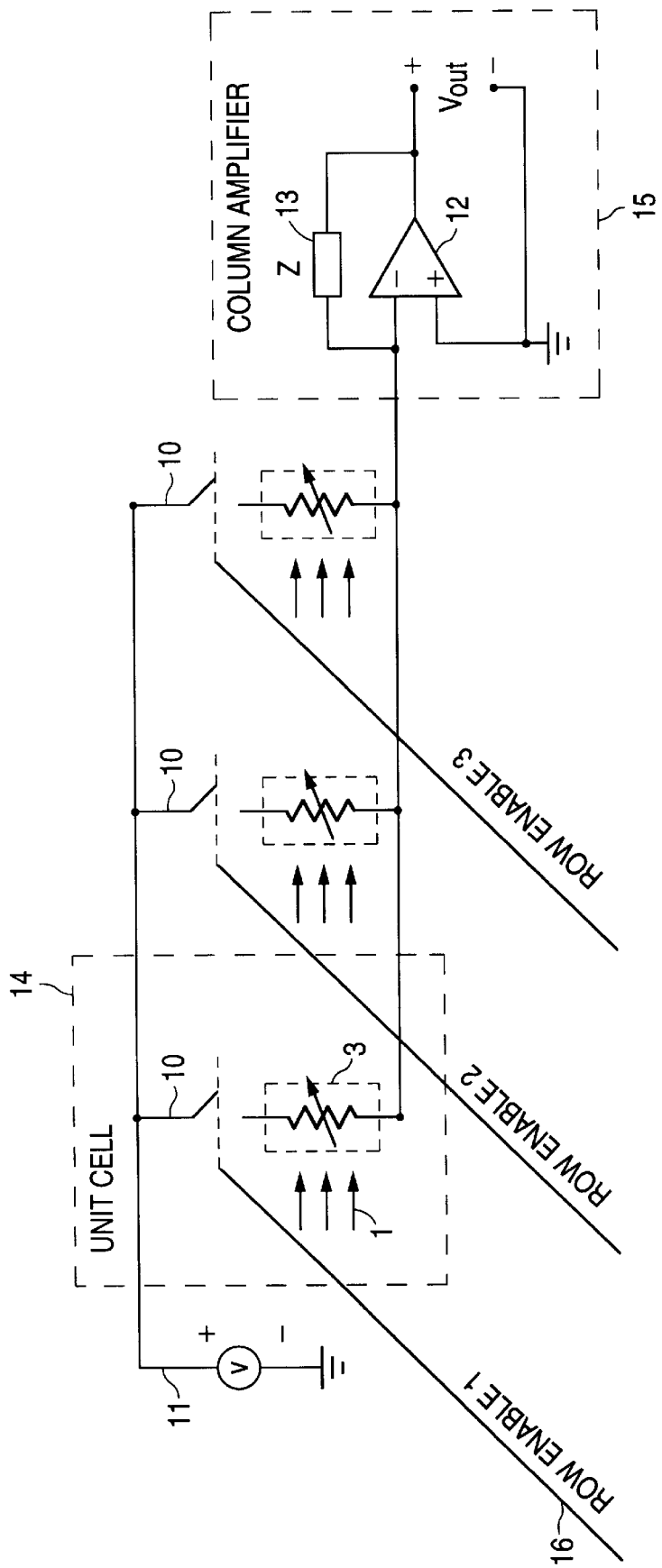
FIG. 10 is a schematic diagram of a one-dimensional multiplexer with three detectors.
Figure 11:
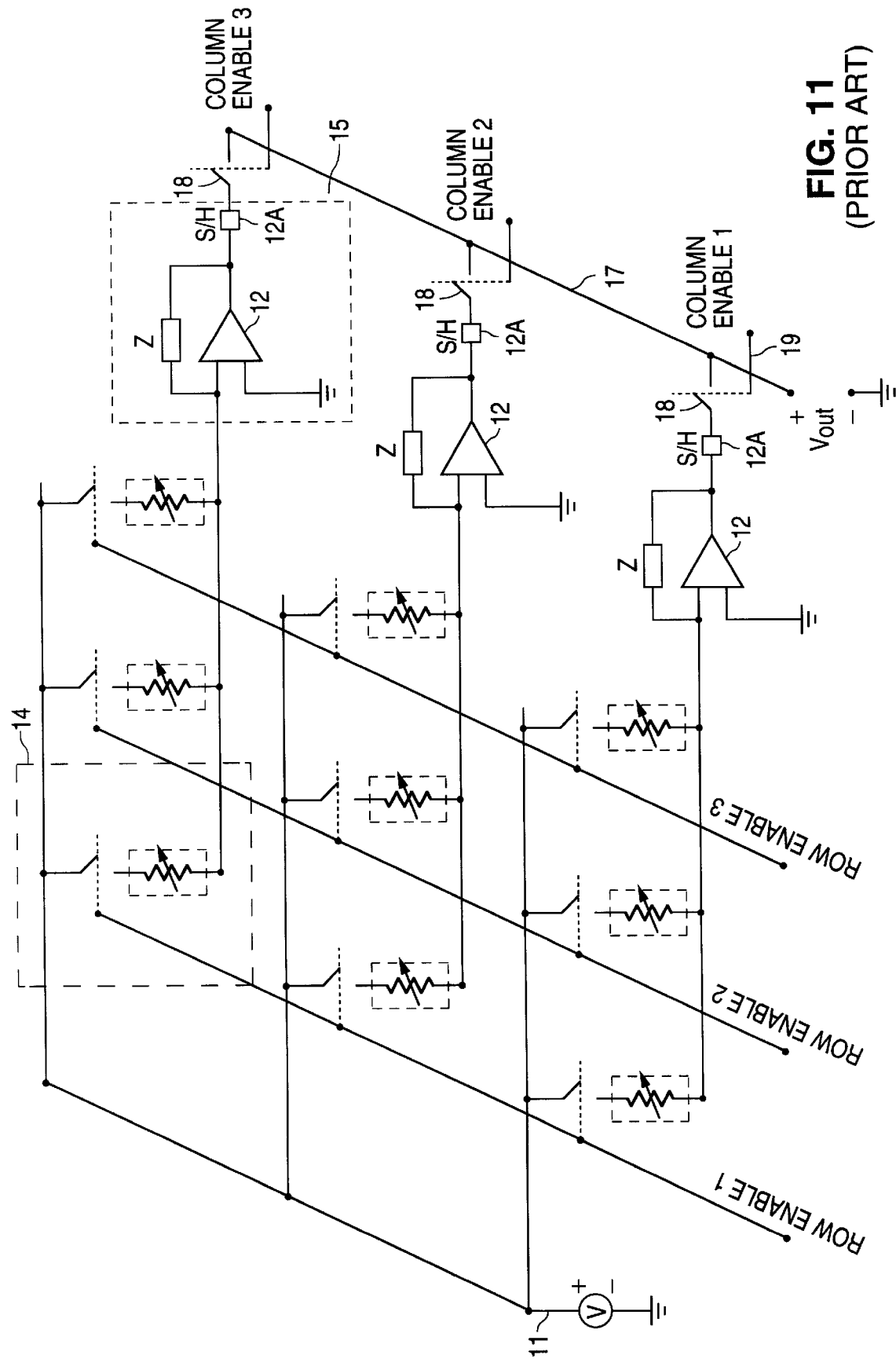
FIG. 11 is a schematic diagram of a two-dimensional array of microbolometers and associated addressing, bias and amplification circuitry.
Figure 12:
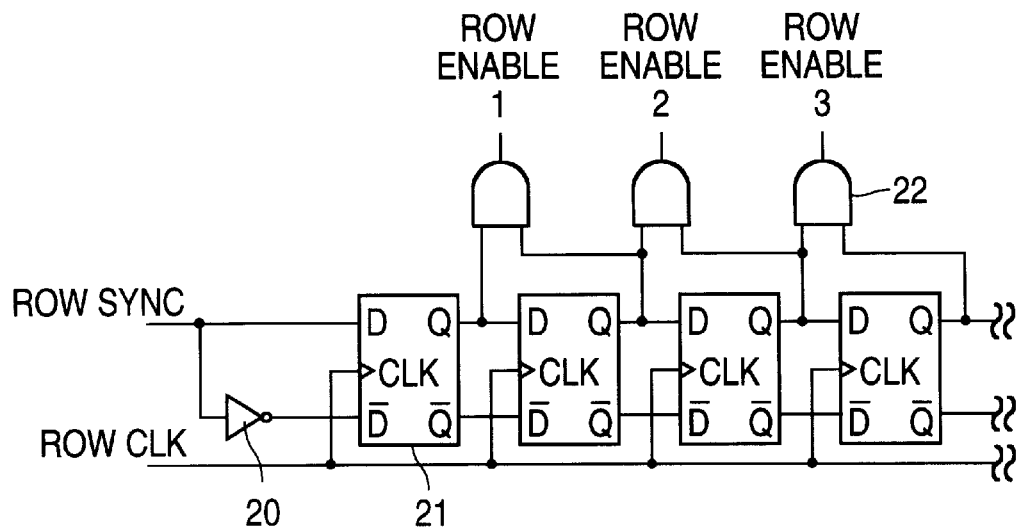
FIG. 12 is a schematic diagram of the logic used to address the Row Enable transistors.
Figure 13:
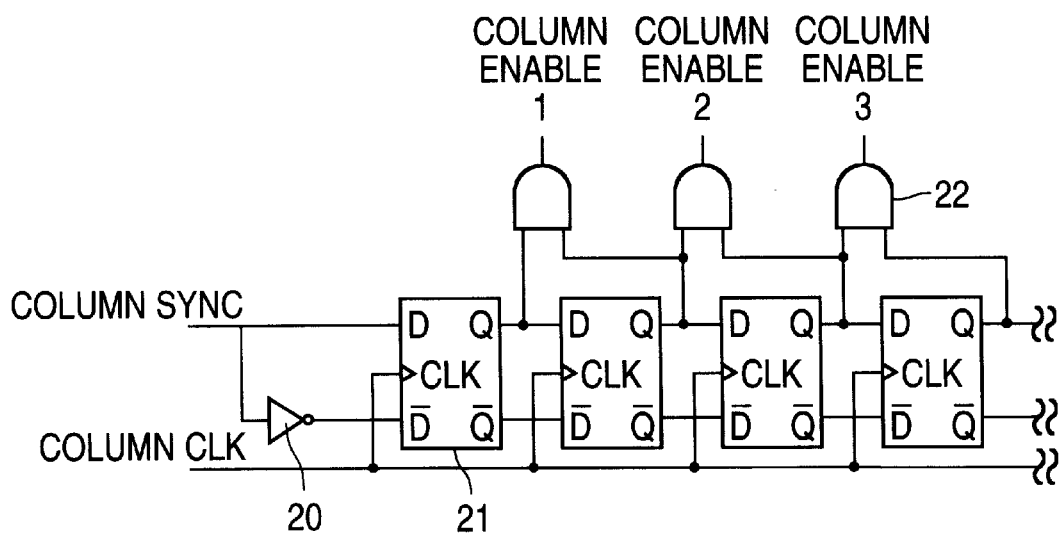
FIG. 13 is a schematic diagram of the logic used to address the Column Enable select transistors.
Figure 14:
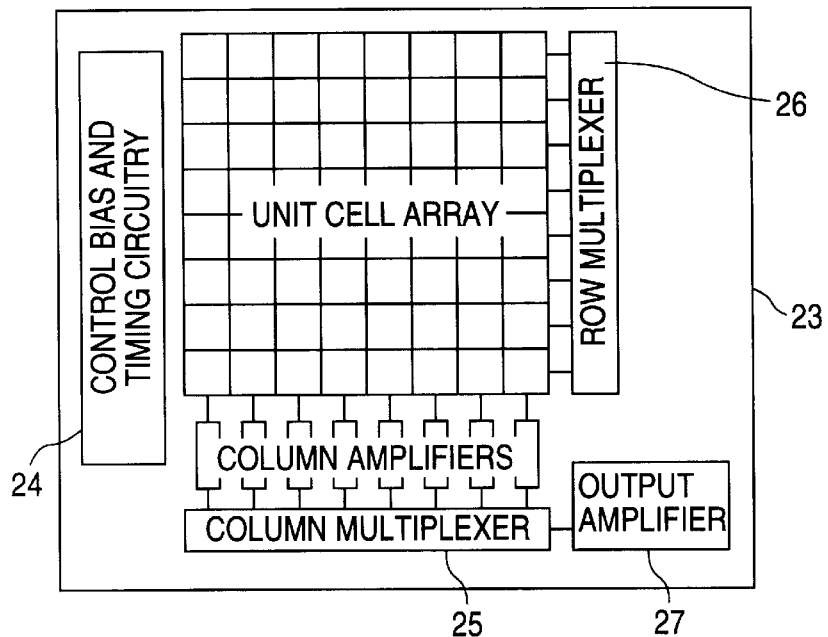
FIG. 14 is an illustration of a ROIC for bolometers.
Figure 15:
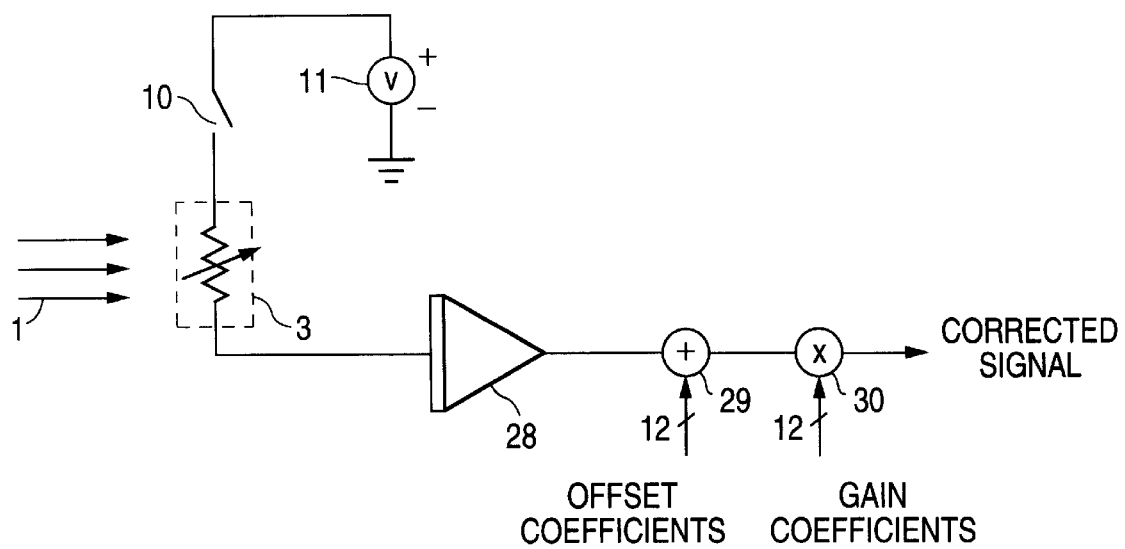
FIG. 15 is a schematic diagram of the conventional two-point gain and offset correction process for microbolometer non-uniformity correction.
Figure 20:
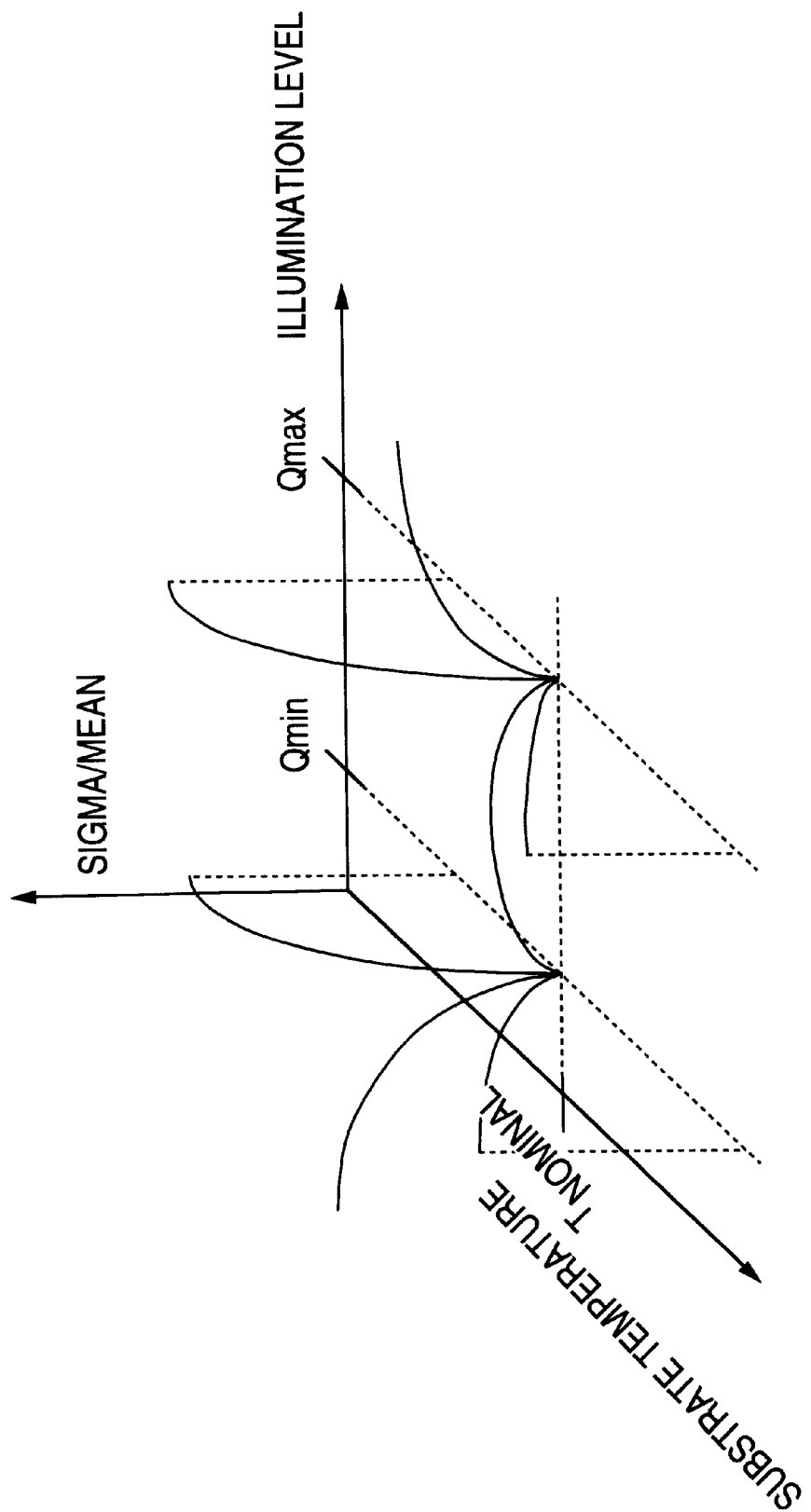
FIG. 20 is an illustration of substrate uniformity stability as a function of temperature around the calibration temperature Tnominal.
Figure 22:
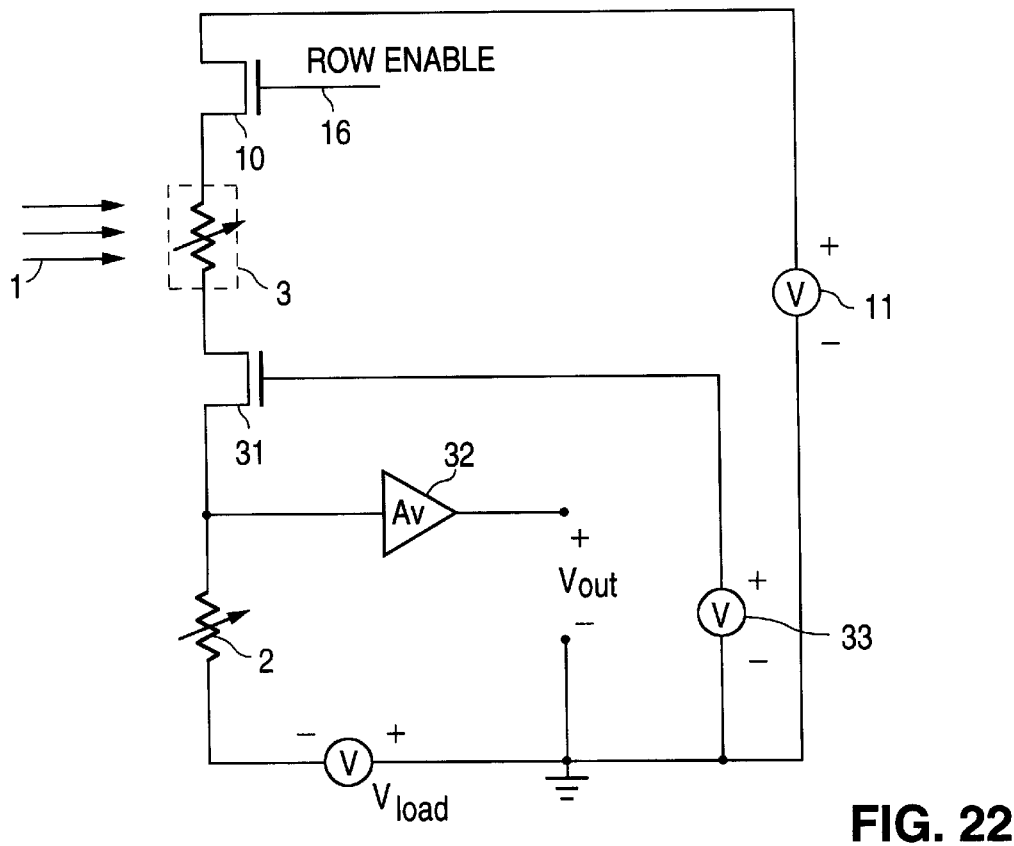
FIG. 22 is a schematic diagram of a common gate amplifier with substrate temperature compensated load circuit using supply side of the microbolometer row enable select transistor.
Figure 23:
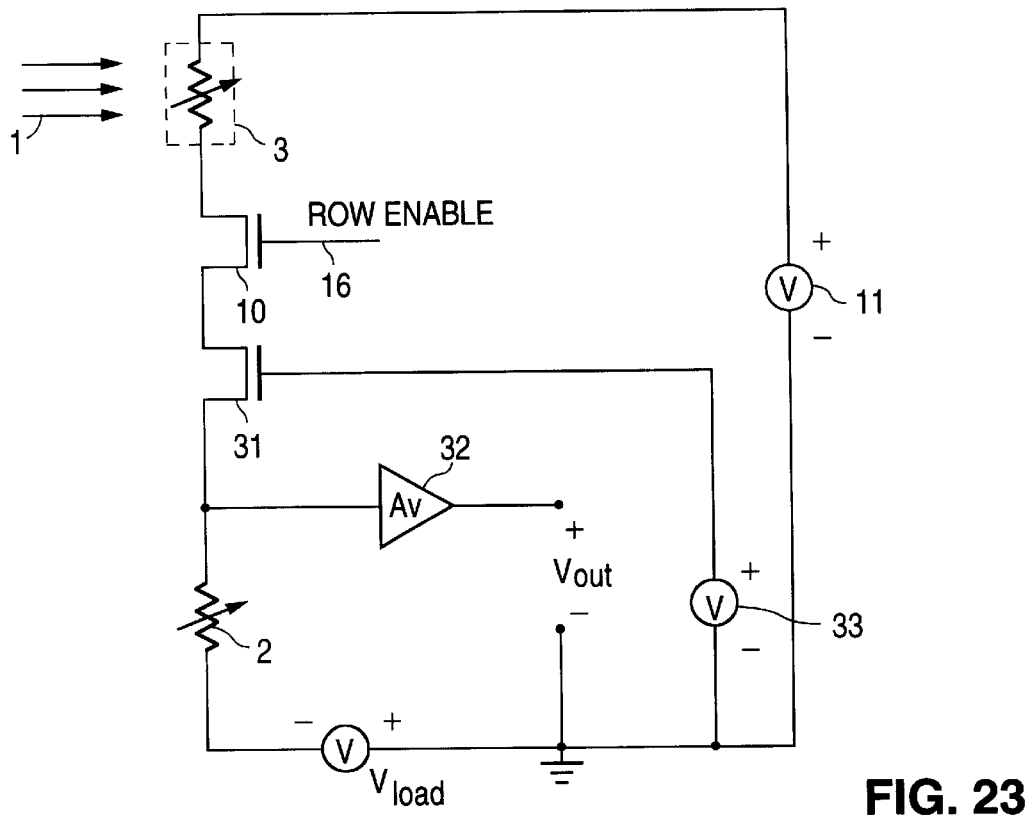
FIG. 23 is a schematic diagram of a common gate amplifier with substrate temperature compensated load circuit using common gate amplifier side of the microbolometer row enable select transistor.

To implement this circuit in an array configuration, part of the circuit is placed in the unit cell and part in the column amplifier as shown in FIGS. 10 and 11. In addition, a select transistor is required to support the row addressing for multiplexing. FIG. 22 shows placement of a select transistor 10 on the supply side of the microbolometer 3. FIG. 23 shows placement of select transistor 10 on the common gate amplifier side of the microbolometer 3. For these circuits the select transistor 10 and the microbolometer 3 are placed in the unit cell. The common gate amplifier 31, microbolometer 2, and amplifier 32 are placed in the column amplifier.

The incident radiation 1 heats the microbolometer 3, which lowers the resistance of the microbolometer 3. During the bias integration period the current through microbolometer 3 is determined by the voltage across and resistance of microbolometer 3. The voltage across microbolometer 3 is equal to the difference between the voltage of the bias generator 11 and the source potential of common gate amplifier 31. Higher levels of incident radiation 1 cause the temperature of microbolometer 3 to rise and the resistance of microbolometer 3 to fall, and therefore a larger current flows into the source of common gate amplifier 31. Since the source and drain currents of common gate amplifier 31 are approximately equal, the same current flows through thermally-shorted microbolometer 2. The voltage across microbolometer 2 is amplified by the voltage amplifier 32. Thus, increased levels of incident radiation 1 result in a higher current through and voltage across microbolometer 2, and this voltage change is amplified by voltage amplifier 32 to generate the output voltage Vout.

The circuit shown in FIG. 21 has a limited response to changes in the substrate temperature as a result of temperature tracking between microbolometer 3 and thermally-shorted microbolometer 2. To a first order, microbolometer 3 and thermally-shorted microbolometer 2 track changes in the substrate temperature. Since essentially the same current flows through microbolometers 2 and 3 and the resistance of microbolometers 2 and 3 track substrate temperature changes, the respective voltages across microbolometers 2 and 3 do not change appreciably with changes in the substrate temperature.

The bias Vload is used to change the voltage across thermally-shorted microbolometer 2 and thereby adjust the potential at the input of voltage amplifier 32. In this manner the operation point of voltage amplifier 32 is adjusted.

The circuits shown in FIGS. 21–23 have the advantage that substrate temperature fluctuations are compensated by the load to the first order. This is due to the fact that the temperature (and therefore resistances) of the active microbolometer 3 and the thermally-shorted microbolometer 2 both track changes in the substrate temperature. A second advantage of these circuits is that signal gain can be established at the amplifier 32 input by setting the resistance value of the load microbolometer 2 to a desired ratio to the active detector microbolometer 3. And the second bias generator 33 is used to drive the gate of the common gate amplifier 31 in order to provide a variable bias for the microbolometer 3.

Figure 24:
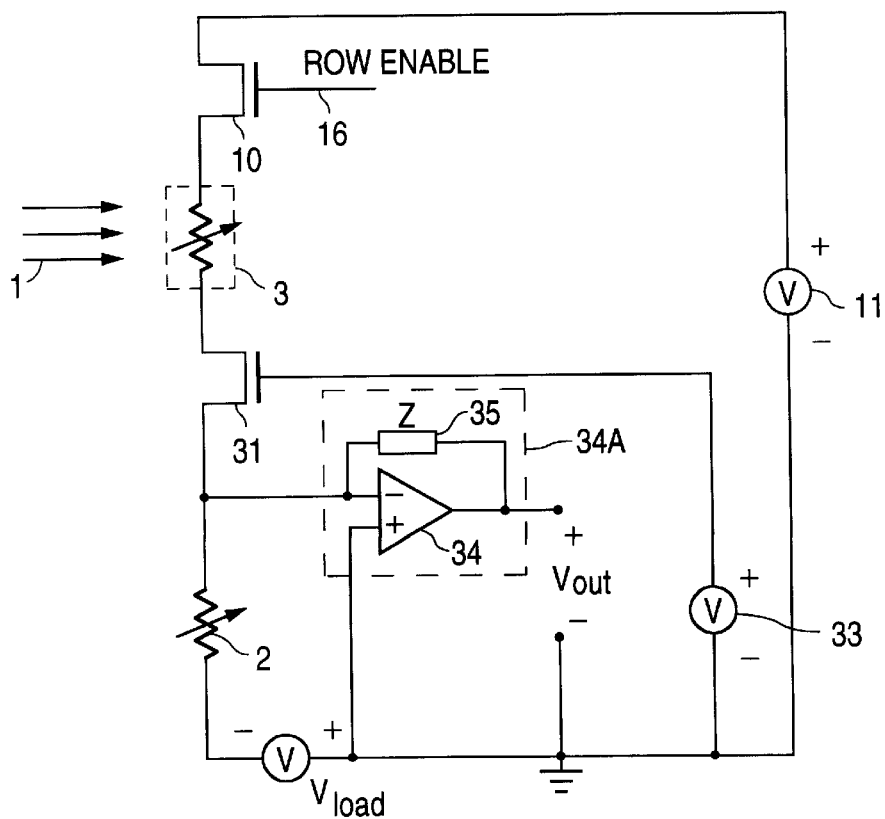
FIG. 24 is a schematic diagram of a transimpedance amplifier with substrate temperature compensated offset.

A second microbolometer amplifier circuit, including a transimpedance amplifier with substrate temperature compensated offset, is shown in FIG. 24. Here current from the thermally isolated detector microbolometer 3 is amplified and integrated by the amplifier 34 and capacitive feedback circuit 35, which together form a transimpedance amplifier 34A. A thermally-shorted microbolometer 2 is used to provide a substrate temperature compensated offset current for the circuit. Microbolometer 3 responds as described above to changes in the incident radiation 1. In this case, however, the drain current of the common gate amplifier 31 flows into the inverting input of the transimpedance amplifier 34A. The voltage across thermally-shorted microbolometer 2 generates a second current which flows out of the inverting input of the transimpedance amplifier 34A. Transimpedance amplifier 34A generates an output voltage that is dependent on the difference between these two currents.

An increased level of radiation 1 produces a larger current flowing through common gate amplifier 31 and into the inverting input of transimpedance amplifier 34A. Since the impedance at the inverting input of the transimpedance amplifier is low, the voltage across thermally-shorted microbolometer 2 is unaffected by the change in current from microbolometer 3 and common gate amplifier 31. Similarly, the current through microbolometer 2 is, to the first order, unaffected by the change in current from microbolometer 3 and common gate amplifier 31. Since the current through thermally-shorted microbolometer 2 is the same as the current flowing out of the inverting input of transimpedance amplifier 34A, the difference current at the inverting input of the transimpedance amplifier is a function only of changes in the current through microbolometer 3.

Since the resistances of microbolometers 2 and 3 track changes in the substrate temperature, as described above, and the voltages across microbolmeters 2 and 3 are constant, changes in the substrate temperature result in no net change in the difference current at the inverting input of transimpedance amplifier 34A.

Bias Vload is used to adjust the offset current from microbolometer 2 and can be used to set the operational point of the transimpedance amplifier 34A.

As in circuits shown in FIGS. 22 and 23, the row select transistors in the unit cell can be located on either side of the detector microbolometer 3. And the second bias generator 33 is used to drive the gate of the common gate amplifier 31 in order to provide a variable bias for the microbolometer 3.

FIGS. 25A, 25B and 25C illustrate the results of performing a two-point correction using the substrate temperature compensated circuits shown in FIGS. 21–24. FIGS. 25A–25C correspond to FIGS. 17A–17C, respectively. As in FIGS. 17A–17C, the non-uniformity distribution is corrected using a two-point gain and offset correction algorithm. The temperature of the substrate is then changed and the spatial non-uniformity rapidly increases, as shown in FIG. 25C. Nonetheless, due to the substrate temperature compensation in these circuits, the range of substrate temperature change that is possible while maintaining the two-point corrected non-uniformity signal distribution below the microbolometer temporal noise level is increased by more than an order of magnitude over non-compensated circuit approaches.

II. Embodiments of Methods which Apply Non-uniform Bias to a Microbolometer Array In the previously discussed circuits, a uniform bias is applied to the microbolometer array. In these circuits all array detectors are biased using a single bias supply value. During the bias period, a microbolometer detector significantly increases in temperature for small duty cycles as:

Trise=Pbias*Time/ThermalMass where Pbias is the electrical power input to generate a detector output signal, Time is the bias period and Thermal-Mass is the heat energy required to heat the microbolometer detector one degree Kelvin.

In order to maximize the signal-to-noise ratio from the detector, the signal must be frequency band-limited. The most common and effective technique of band limiting is signal integration over the bias period. The microbolometer's resistance changes during the bias period due to the change in temperature of the microbolometer detector. The integration process in effect averages the response during this period to yield a single integrated value.

The microbolometer detector resistance, Rdet(T), can be modeled as:

$$Rdet(T)=Ro*exp(alpha*To^2*(To^{-1}-T^{-1}))$$

where Ro is the microbolometer resistance at a standard temperature, To, (usually 300 degrees Kelvin), alpha is the temperature coefficient of resistance (TCR) at To, and T is the substrate temperature.

The integrated current (charge) flowing out of a fixed voltage bias, Vbias, over an integration/bias period, Tint, is then:

$$Qdet(Tint) = Vbias \int_0^{Tint} (Rdet(T))^{-1} \, dt$$

Similar expressions can be derived for current bias or resistive bias with integration of output voltage.

If a uniform bias is applied to all detectors in a non-uniform microbolometer array, the ratio of the response of their integrated outputs to the optical signal will vary significantly over even a small range in substrate temperature. According to this invention, unique compensating biases are applied to the microbolometer array detectors. Two methods of accomplishing this will be described.

A. Bias-correction Method

According to the bias-correction method, a unique bias amplitude is applied to each detector during the integration period to support uniformity correction.

The bias-correction method can be implemented as an adjustable voltage, current, or load bias that is applied to the microbolometer detectors during the integration (measurement) period. FIG. 26 conceptually illustrates an adjustable voltage implementation of the bias-correction method. Here, the bias-correction value is applied during the integration period of the microbolometer detector using an adjustable voltage source 36. The bias-correction value is controlled by the output of a digital-to-analog converter (DAC) (not shown). The adjustable bolometer bias may be used to correct the optical gain of the signal for uniform output at a particular substrate temperature in conjunction with single-point offset correction 30 to remove residual fixed offsets.

Non-uniformity correction can be achieved over a very wide range of substrate temperatures when the bias-correction method is used to bias the microbolometer detector array such that the ratio of the response of the individual integrated microbolometer output signals to the mean optical signal response of the array remains nearly constant as the substrate temperature changes. After the bias-correction method has been applied, a standard two-point gain 29 and offset 30 non-uniformity correction is used. With this method, the bias-correction is performed on the ROIC prior to the integration process.

B. Pre-Bias-correction Method

According to the pre-bias-correction method a unique bias amplitude is applied to each detector during a selected time interval prior to the integration period to support uniformity correction.

The pre-bias-correction method can be implemented as an adjustable voltage, current, or load bias that is applied to the microbolometer detectors prior to the integration period. FIG. 27 conceptually illustrates an adjustable voltage implementation of the bias-correction method. Here, the pre-bias-correction value 36 is applied to the microbolometer detector through switch 37 during a specified time interval (the "pre-bias period") prior to the integration period. Switch 37 is closed and switch 10 is open during the pre-bias period; the conditions of the switches are reversed during the integration period.

A uniform bias 11 is applied to all microbolometer detectors during the integration period. The adjustable bolometer pre-bias may be used to correct the optical gain of the signal for uniform output at a particular substrate temperature in conjunction with single-point offset correction 30 to remove residual fixed offsets.

Non-uniformity correction can be achieved over a very wide range of substrate temperatures when the pre-bias-correction method is used to pre-bias the microbolometer detector array such that the ratio of the response of the individual integrated microbolometer output signals to the mean optical signal response of the array remains nearly constant as the substrate temperature changes. The pre-bias will increase or decrease the output signal of the integrating amplifier 28 by a selected amount. After the pre-bias-correction method has been applied, a standard two-point gain 29 and offset 30 non-uniformity correction is used. The pre-bias-correction must be performed on the ROIC prior to the integration process.

The application of the bias or pre-bias-correction methods followed by conventional two-point gain and offset correction provides excellent non-uniformity correction over a much wider range of substrate temperatures than was previously possible. Either of these correction techniques results in a reduction in substrate temperature sensitivity of two to three orders of magnitude over previous correction schemes. FIGS. 28A, 28B and 28C illustrate the simulated reduced sensitivity to substrate temperature changes for the bias or pre-bias-correction methods. FIG. 28A shows the signal distribution before any correction, FIG. 28B shows the signal distribution after two-point correction, and FIG. 28C shows the signal distribution after two-point and bias or pre-bias-correction methods.

Applying Correction Coefficients to two Circuit Implementations for the Bias-correction Method The specific implementation of two circuit approaches using the bias-correction method for microbolometer infrared detectors are described here, the microbolometer bias-corrected common gate amplifier with temperature compensated load, and the microbolometer bias-corrected transimpedance amplifier with substrate temperature compensated offset. For each circuit approach three versions are shown for the placement and implementation of the bias-correction circuitry.

For simplicity the following circuit figures are drawn without the row select transistors shown. As in the common gate temperature compensated load circuit (FIGS. 22 and 23), the row select transistors in the unit cell can be located on either side of the microbolometer detector.

Microbolometer Bias-corrected Common Gate Amplifier with Temperature Compensated Load The microbolometer bias-corrected common gate amplifier with temperature compensated load provides substrate temperature compensation for the load impedance and offset current as well as bias-correction for the microbolometer detector. Three implementations for the bias-correction portion of this circuit are described.

Figure 29:
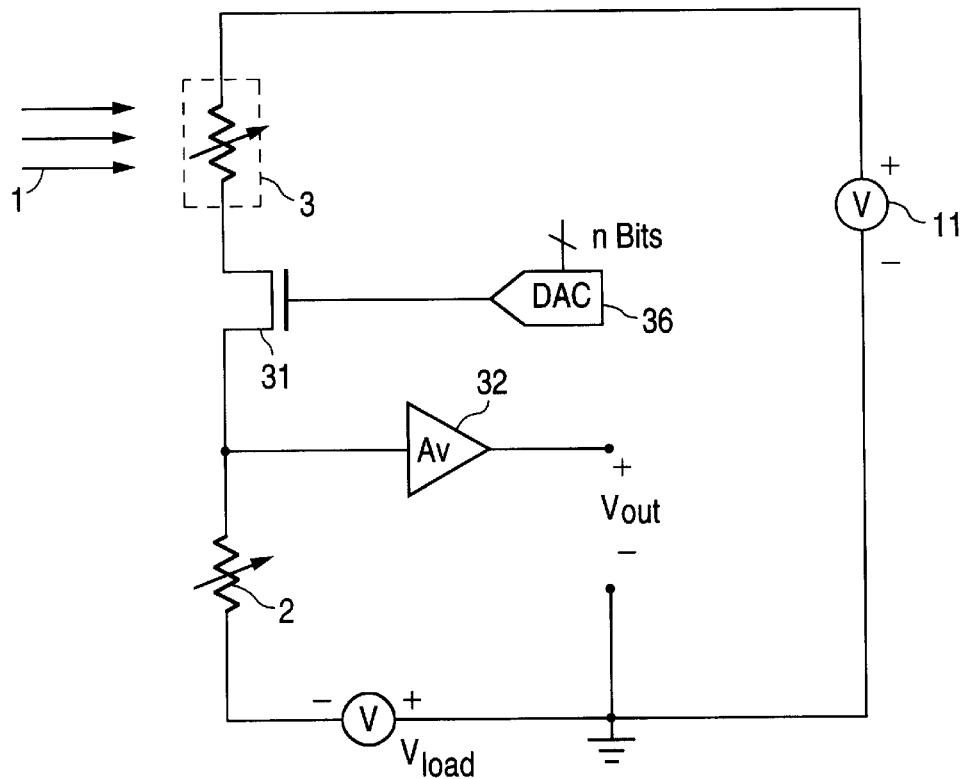
FIG. 29 is a schematic diagram for a microbolometer bias-corrected common gate amplifier with temperature compensated load using gate adjustment of microbolometer bias.

FIG. 29 shows a schematic of a circuit for the microbolometer bias-corrected common gate amplifier with temperature compensated load, using a gate adjustment configuration to vary the microbolometer bias. (It will be noted that FIG. 29 is identical to FIG. 21, except that a DAC 36 has been substituted for the bias source 33.) The microbolometer 3 is biased by the voltage source 11 and the source potential of the common gate amplifier 31. A digital-to-analog converter (DAC) 36 is used to drive the gate of the common gate amplifier in order to provide a variable bias for the microbolometer 3. A thermally-shorted microbolometer 2 is biased by Vload and is used as a load for the circuit. A second amplifier 32 is used to amplify the signal at the node between microbolometer 2 and the drain of the common gate amplifier 31.

Figure 30:
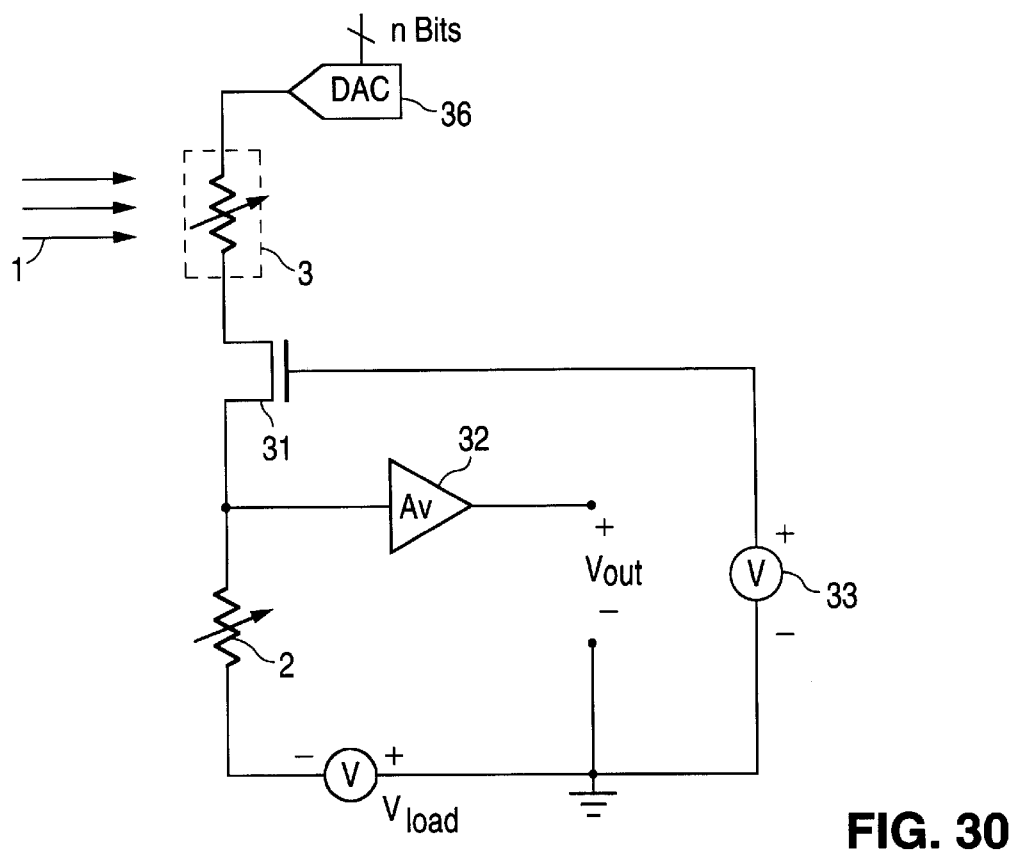
FIG. 30 is a schematic diagram for a microbolometer bias-corrected common gate amplifier with temperature compensated load using supply adjustment of microbolometer bias.

FIG. 30 shows a schematic of another circuit for the microbolometer bias-corrected common gate amplifier with temperature compensated load, using a supply adjustment configuration to vary the microbolometer bias. The microbolometer 3 is biased by the DAC 36 and the source potential of the common gate amplifier 31. A fixed voltage source 33 is used to drive the gate of the common gate amplifier. The DAC provides a variable bias for the microbolometer 3, with n bits input for gain correction. A thermally-shorted microbolometer 2 is biased by Vload and is used as a load for the circuit. A second amplifier 32 is used to amplify the signal at the node between microbolometer 2 and the drain of the common gate amplifier 31.

Figure 31:
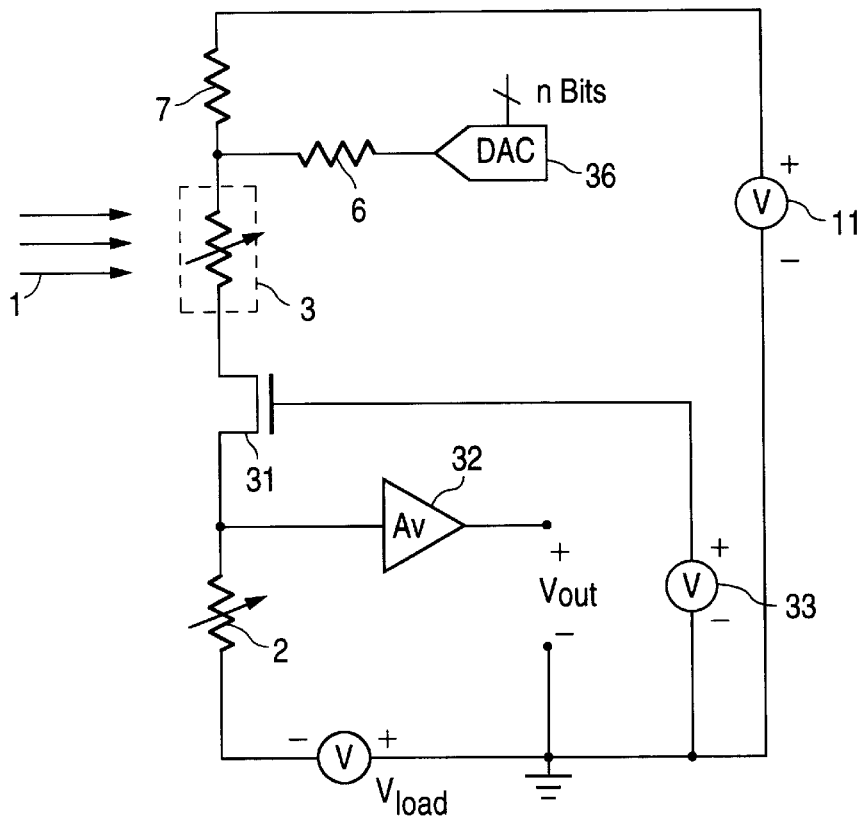
FIG. 31 is a schematic diagram for a microbolometer bias-corrected common gate amplifier with temperature compensated load using voltage divider supply adjustment of microbolometer bias.

FIG. 31 shows the schematic of yet another circuit for the microbolometer bias-corrected common gate amplifier with temperature compensated load, using a voltage divider and DAC 36 to adjust the microbolometer bias. The microbolometer 3 is biased by a voltage divider, formed by resistors 6 and 7, driven by DAC 36, and the source potential of the common gate amplifier 31. A fixed voltage source 33 is used to drive the gate of the common gate amplifier 31. The DAC 36 provides a variable bias for the microbolometer detector. A thermally-shorted microbolometer 2 is used as a load for the circuit. A second amplifier 32 is used to amplify the signal at the node between microbolometer 2 and the drain of the common gate amplifier 31.

Microbolometer Bias-corrected Transimpedance Amplifier with Substrate Temperature Compensated Offset The microbolometer bias-corrected transimpedance amplifier with substrate temperature compensated offset provides substrate temperature compensation for the offset current as well as bias-correction for the microbolometer detector. Three implementations for the bias-correction portion of this circuit are described.

Figure 32:
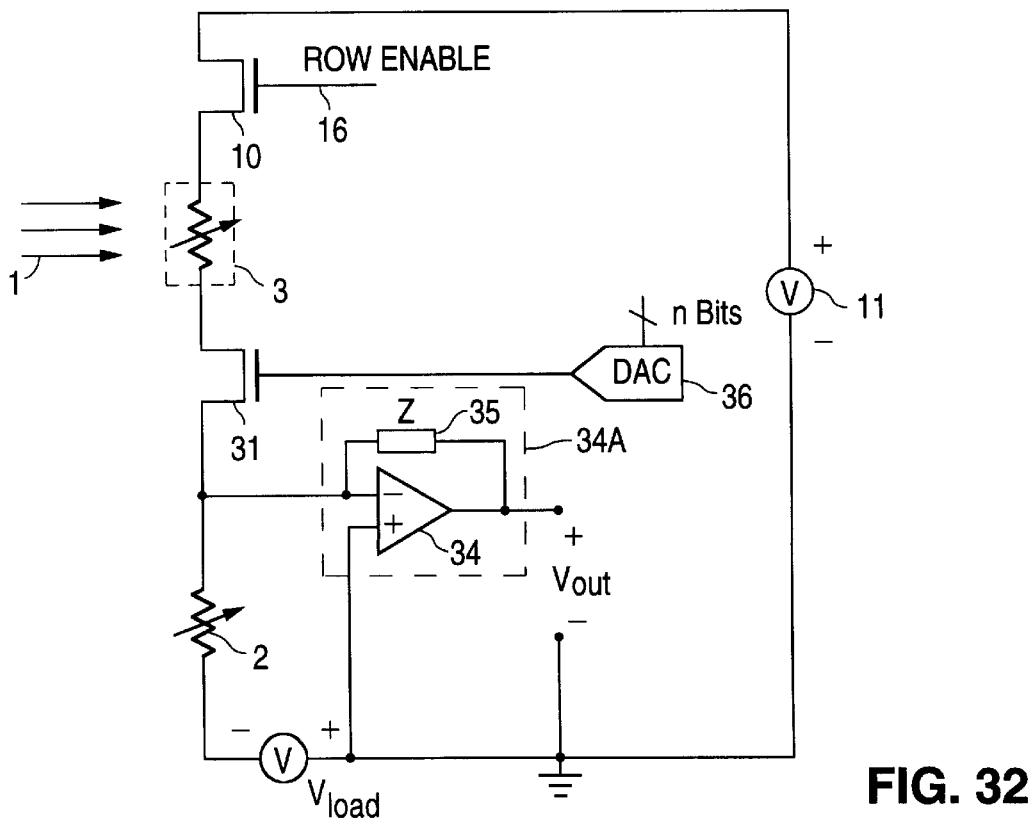
FIG. 32 is a schematic diagram for a microbolometer bias-corrected transimpedance amplifier with substrate temperature compensated offset using gate adjustment of microbolometer bias.

FIG. 32 shows a schematic of a circuit for the microbolometer bias-corrected transimpedance amplifier with substrate temperature compensated offset, using a gate adjustment configuration to vary the microbolometer bias. (Note that FIG. 32 is identical to FIG. 22, except that DAC 36 has been substituted for bias source 33.) The microbolometer 3 is biased by the voltage source 11 and the source potential of the common gate amplifier 31. A DAC 36 is used to drive the gate of the common gate amplifier in order to provide variable bias for the microbolometer detector. A thermally-shorted microbolometer 2 is used to generate a compensated offset current for the circuit. A transimpedance amplifier with an amplifier 34 and a feedback circuit 35 is used to amplify and integrate the signal at the node between microbolometer 2 and the drain of the common gate amplifier. The component Z in the capacitive feedback circuit 35 can be implemented as a switched capacitor to allow integration.

Figure 33:
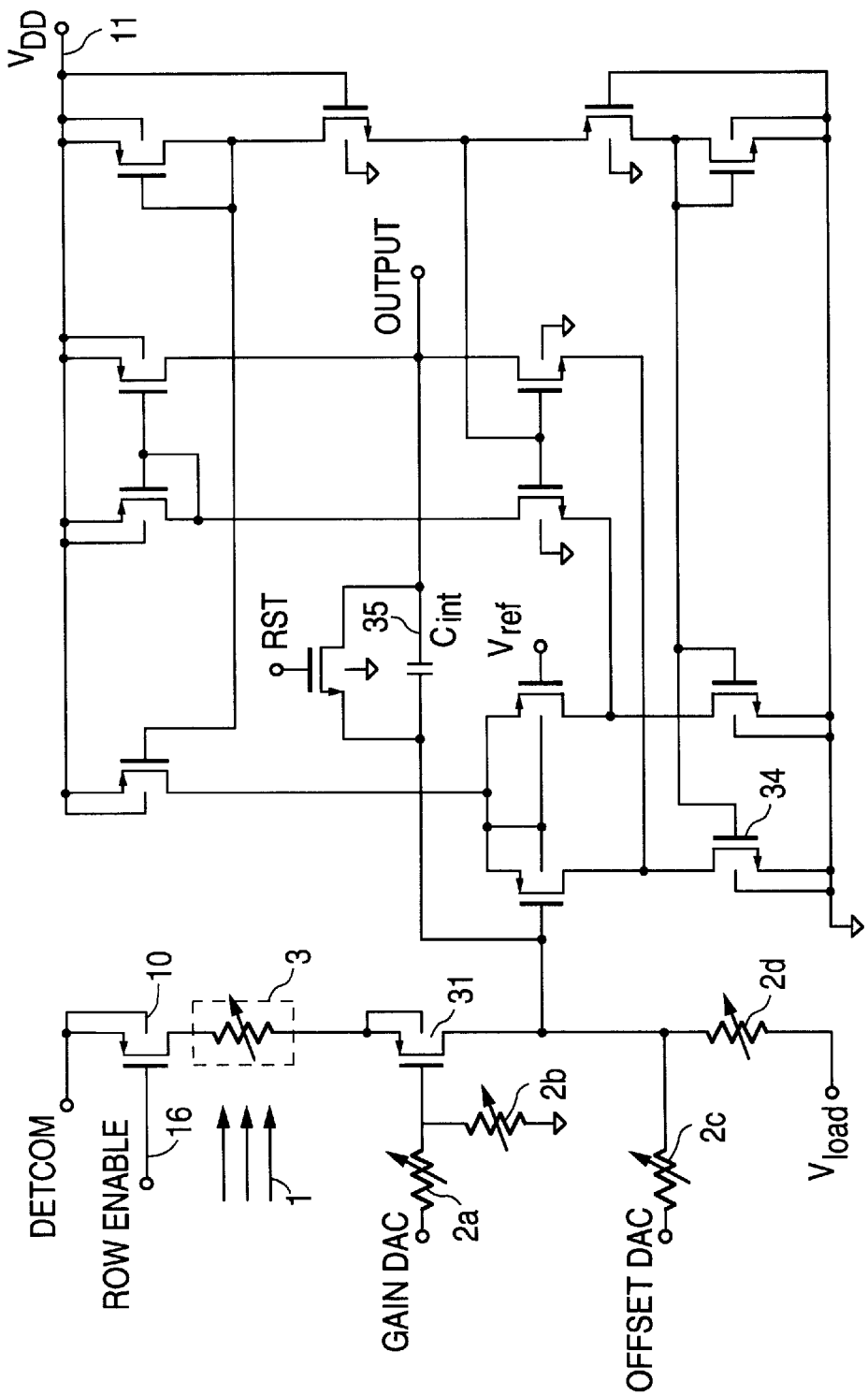
FIG. 33 is a preferred circuit implementation of the column amplifier shown above in FIG. 32.

FIG. 33 provides a detailed, preferred circuit implementation for the functional diagram shown in FIG. 32. Here, a folded cascode implementation for a CMOS differential amplifier is used in a capacitive transimpedance amplifier configuration to implement amplifier 34 and feedback circuit 35 from FIG. 32. The row enable signal 16 is shown biasing the gate of the row enable select p-channel transistor 10. The microbolometer detector element 3 is shown biased by DETCOM, which is enabled by the row enable transistor 10, and the source potential of the common gate p-channel amplifier 31. The controlling bias for the gate of 31 is supplied from a conventional CMOS DAC (not shown) through a substrate temperature compensated divider network using thermally shorted microbolometers 2a and 2b. A second conventional DAC (not shown) is used to supply a bias to an offset network using thermally shorted microbolometers 2c and 2d for the control of offset current into the charge integrating amplifier feedback circuit 35, which can be discharged by application of RST to the gate of a shorting transistor.

Figure 34:
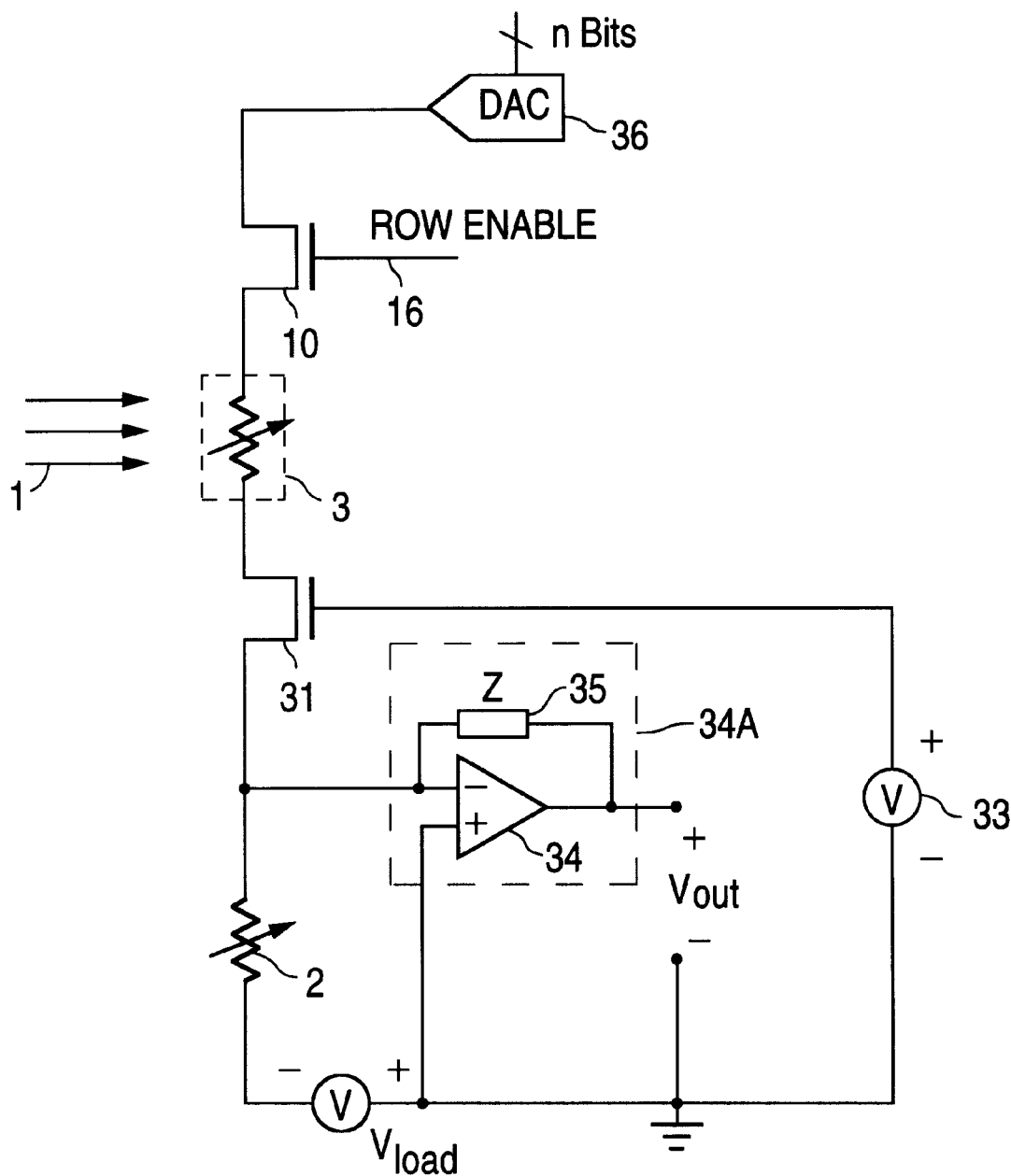
FIG. 34 is a schematic diagram for a microbolometer bias-corrected transimpedance amplifier with substrate temperature compensated offset using supply adjustment of microbolometer bias.

FIG. 34 shows a schematic of a circuit for the microbolometer bias-corrected transimpedance amplifier with substrate temperature compensated offset, using a supply adjustment configuration to vary the microbolometer bias. The microbolometer 3 is biased by DAC 36 and the source potential of the common gate amplifier 31. A fixed voltage source 33 is used to drive the gate of the common gate amplifier 31. The DAC 36 provides a variable bias for the microbolometer detector. A thermally-shorted microbolometer 2 is used to generate a compensated offset current for the circuit. A transimpedance amplifier including an amplifier 34 and feedback circuit 35 is used to amplify and integrate the signal at the node between microbolometer 2 and the drain of the common gate amplifier 31. The component Z in feedback circuit 35 can be implemented as a switched capacitor to allow integration. In this case, by changing the size of the capacitor, the gain for the integrator can be varied.

Figure 35:
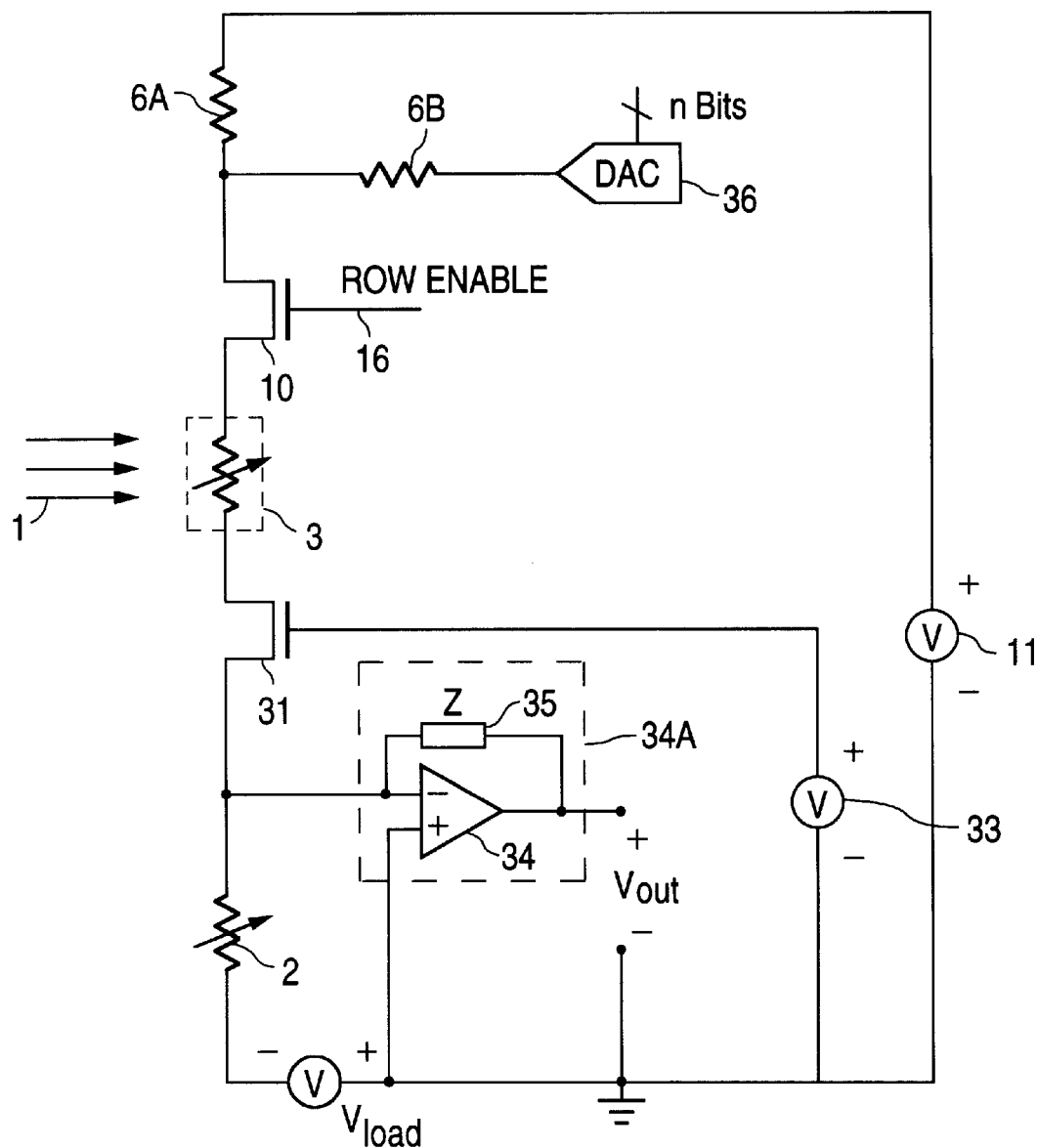
FIG. 35 is a schematic diagram for a microbolometer bias-corrected transimpedance amplifier with substrate temperature compensated offset using a voltage divider supply adjustment of microbolometer bias.

FIG. 35 shows a schematic of a circuit for the microbolometer bias-corrected transimpedance amplifier with substrate temperature compensated offset, using a voltage divider supply adjustment of microbolometer bias. The microbolometer 3 is biased by a voltage divider, formed of resistors 6A and 6B, driven by DAC 36, and the source potential of the common gate amplifier 31. A fixed voltage source 33 is used to drive the gate of the common gate amplifier. The DAC provides a variable bias for the microbolometer 3. A thermally-shorted microbolometer 2 is used to generate a compensated offset current for the circuit. A transimpedance amplifier including an amplifier 34 and a feedback circuit 35 is used to amplify and/or integrate the signal at the node between the load resistor and the drain of the common gate amplifier 31. The transimpedance amplifier feedback component Z can be implemented as a switched capacitor to allow integration.

The output voltage could be taken at other points in the circuits shown in FIGS. 29–35, for example, across the capacitive feedback circuit 35.

Figure 36:
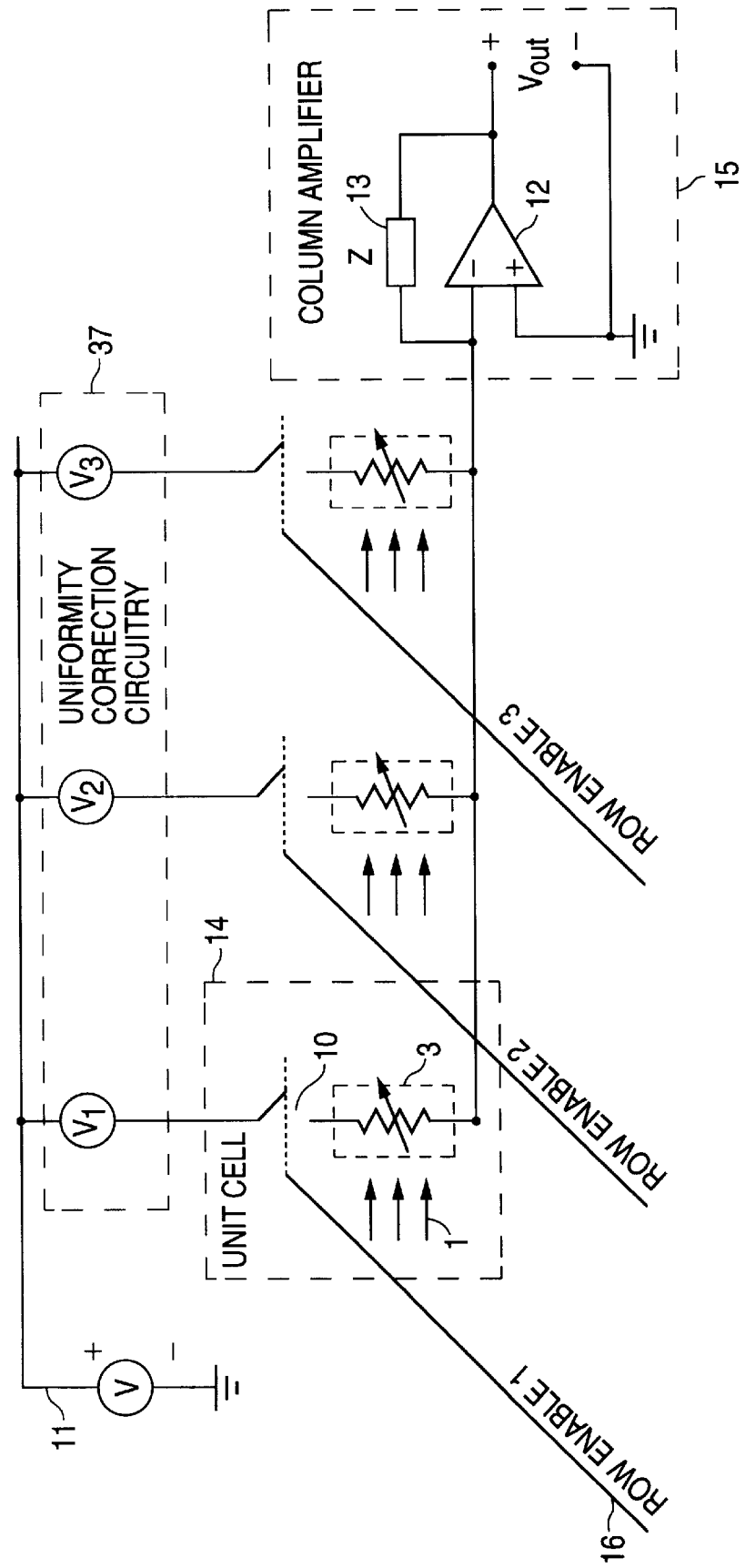
FIG. 36 is a schematic diagram of a one dimensional multiplexer with three detectors showing application of the bias-correction method at the detector bias supply.

III. Embodiments of Circuits which Apply a Non-uniform Bias to a Microbolometer Array and Incorporate Substrate Temperature Compensation Circuitry In order to implement the bias-correction method an adjustable bias must be supplied to each of the microbolometer array detectors. FIG. 36 shows the implementation of a single column of three detectors. Here the microbolometer bias is modified by three adjustable voltage sources shown here as $v_1$, $v_2$, $V_3$. These voltage sources are placed in series between the detector bias supply 11 and the unit cell microbolometer select transistor 10. The current through each microbolometer detector will be sequentially sampled for integration by the column amplifier 15. Column amplifier 15 has an inherent sample-and-hold capability such that the output of amplifier 12 will hold a fixed voltage after the current stops flowing and the integration process stops. The order of sequencing and the time period of each sample is determined by the sequencing and duration of the active period of each row enable signal.

Figure 37:
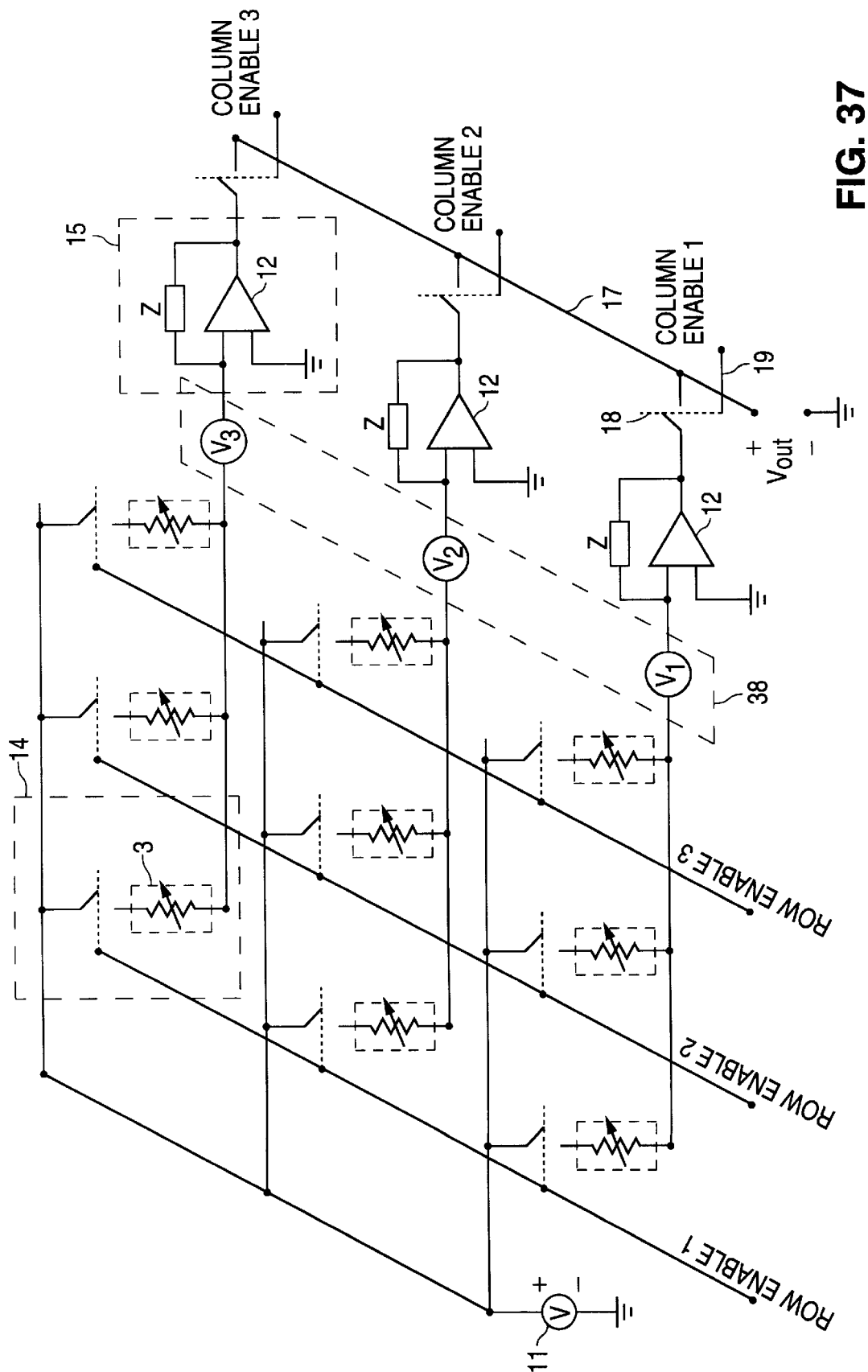
FIG. 37 is a schematic diagram of a two dimensional three-by-three detector multiplexer showing application of the bias-correction method at the column amplifier input.

A two-dimensional three-by-three detector multiplexer with an implementation of the bias-correction method is shown in FIG. 37. Here bias sources $v_1$, $v_2$, and $v_3$ are shown in series with the inputs of the column amplifiers 15. Each column amplifier 15 has an inherent sample-and-hold capability such that its output of amplifier 12 will hold a fixed voltage after the current stops flowing and the integration process stops. During each bias period, the current through each microbolometer detector 3 in a given row will be sequentially sampled for integration by the corresponding column amplifier 15. The order of sequencing and the time period of each sample is determined by the sequencing and duration of the active period of each row enable signal. Values for the bias sources $v_1$, $v_2$, and $v_3$ are adjusted for each row of detectors 3 thus providing unique bias values for each microbolometer detector. Individual column amplifiers 15 shown in FIG. 37 are selected by the column enable signal 19 that controls the column switch 18. An output line 17 common to all columns is used to bus the output signals from the column amplifiers 15 to the ROIC output.

Figure 38:
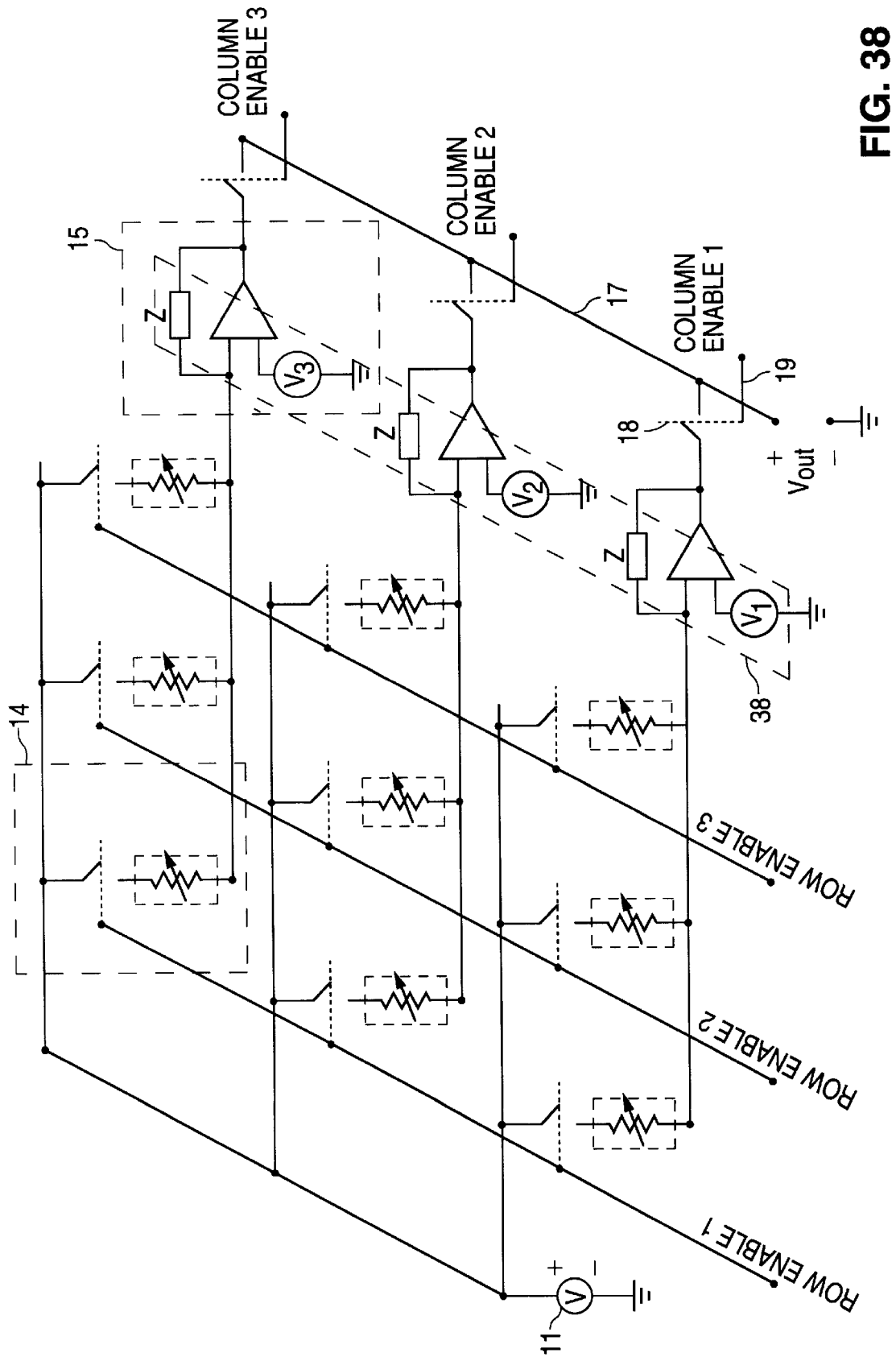
FIG. 38 is a schematic diagram of a two dimensional three-by-three detector multiplexer showing application of the bias-correction method at the reference potential for each column amplifier input.

A second possible configuration for implementing the bias-correction method is shown in FIG. 38. Here bias sources $v_1$, $v_2$, and $v_3$ are shown being applied to the ground reference potential at the non-inverting input of each column amplifier 15. Values for these bias sources are adjusted for each row of detectors thus providing unique bias values for each microbolometer detector 3.

Figure 39:
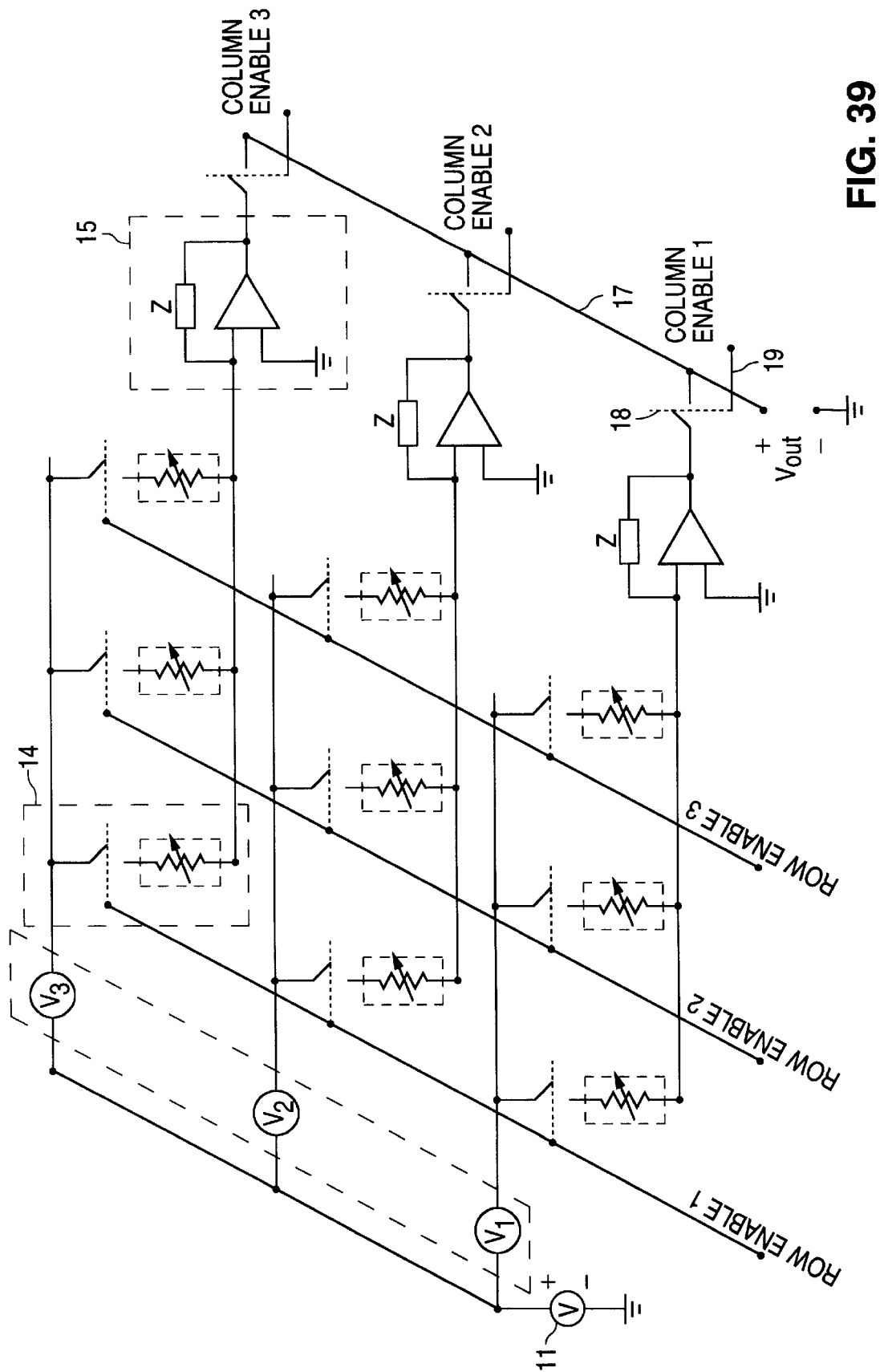
FIG. 39 is a schematic diagram of a two dimensional three-by-three detector multiplexer showing application of the bias-correction method at the detector bias supply for each column.

A third possible configuration for implementing the bias-correction method is shown in FIG. 39. Here bias sources $v_1$, $v_2$, and $v_3$ are shown being applied separately to the detector bias supply for each column. Values for these bias sources are adjusted for each row of detectors thus providing unique bias values for each microbolometer detector 3.

It will be understood that any of the circuits shown in FIGS. 29–35 can be incorporated into the two-dimensional arrays shown in FIGS. 37–39 by placing the components at various locations in the array.

Figure 40:
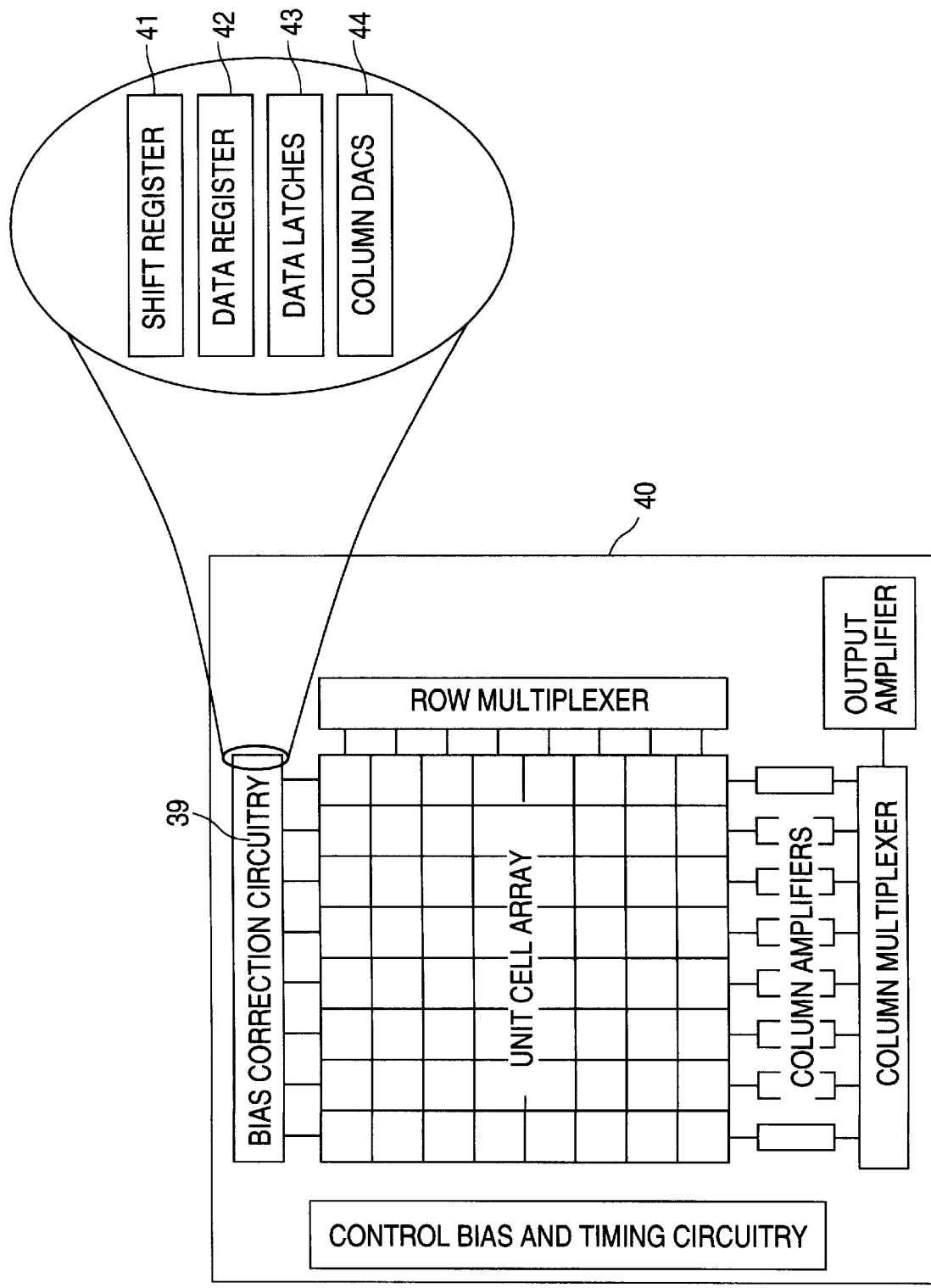
FIG. 40 is an illustration of the bias-correction circuitry components.

FIG. 40 shows the incorporation of the bias-correction circuitry 39 onto an ROIC 40. The exploded view of the bias-correction circuit block shows the four major components: the address control shift register 41, the data register 42, the data latches 43 and the column digital-to-analog converters (DAC's) 44. The data latches 43 drive the digital input to column DACs 44. A conventional CMOS DAC architecture, such as described in a National Semiconductor CMOS Databook, is utilized to provide the column DACs 44. In other embodiments, a single DAC may be shared by more than one column so that there are fewer DACs than columns.

Figure 41:
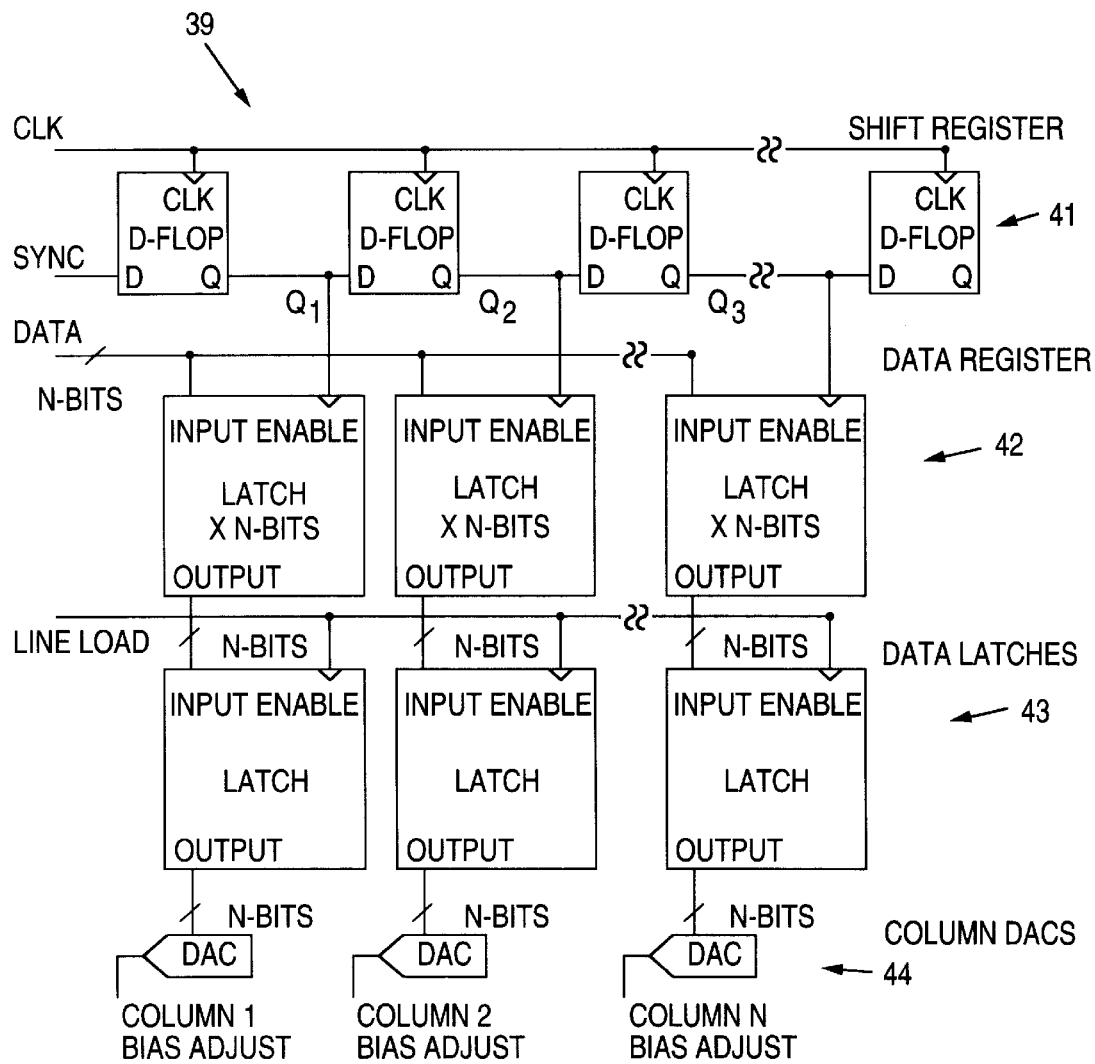
FIG. 41 is a schematic diagram of the functional elements for the bias compensation circuit block.

FIG. 41 illustrates the function of these blocks. The address shift register 41 is implemented as a D flip-flop serial register with input "Sync" and controlling clock "Clk". An active or enabling state is input by the "Sync" and clocked down the shift register 41 by "Clk". The data register 42 is comprised of n-bit latches where "n" is the number of DAC data bits. The total number of n-bit latches in the data register 42 is equal to the number of columns in the detector array. The address shift register 41 sequentially enables and latches each of the data register latches 42 at a unique time allowing unique DAC correction coefficient data to be loaded into each data register 42 location. Once the data register 42 is loaded, a "Line Load" clock is used to transfer the data from the data register 42 to the data latches 43. The data latches 43 drive the digital input to column DAC's 44. This data register and data latch configuration is similar to a "master-slave" latch that can maintain a stable "slave" output of correction coefficients to the column DACs while new data is loaded into the "master", data register 42, input for the next row of correction coefficients.

Figure 42:
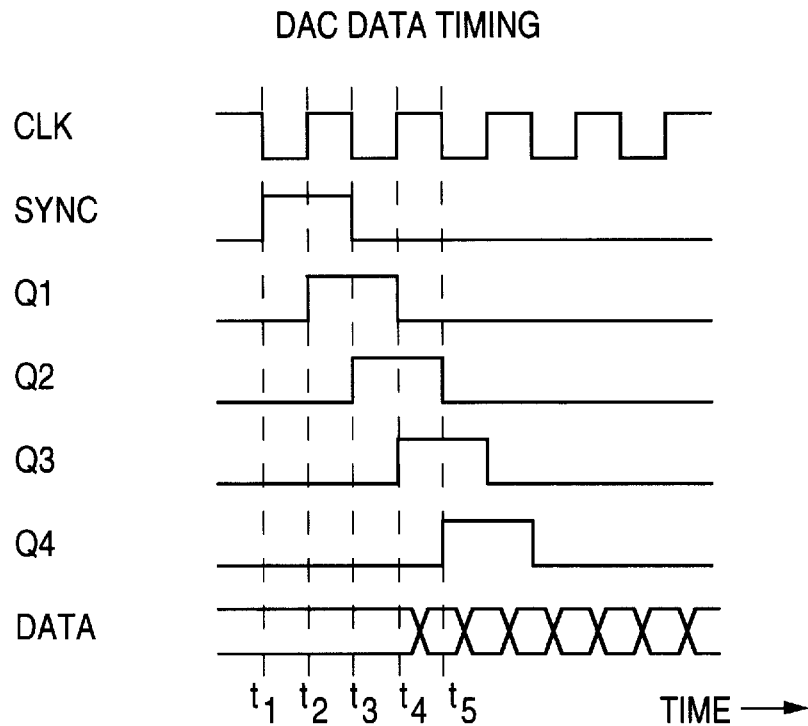
FIG. 42 is an illustration of the timing for the digital-to-analog converter (DAC) correction data load process.

FIG. 42 shows the timing for the bias-correction circuit 39 shown in FIGS. 40 and 41. "Clk" is the clock to the address shift register 41. "Sync" is the input to the address shift register 41. "Q1" is the output of the column 1 enable of the address shift register 41, "Q2" is the output of the column 2 enable of the address shift register 41, and so on. "Data" represents the data inputs of the data registers 42. Note that a decoded binary or gray code count scheme may also be used to address the data register latches 42 for storage of the digital correction data.

Figure 43:
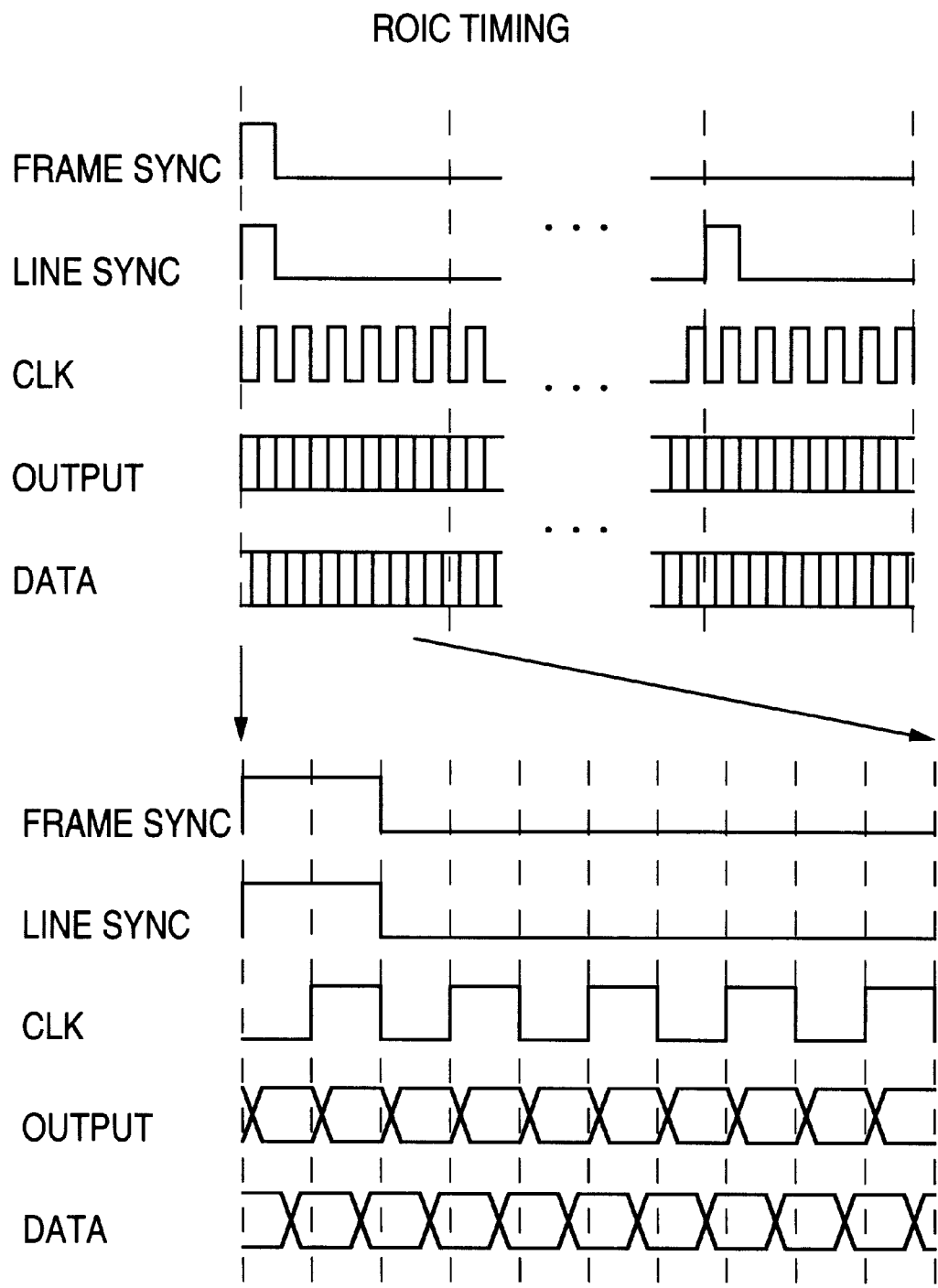
FIG. 43 is an illustration of the timing for the ROIC data load process.

A serial digital data stream of n-bit words is supplied to the readout integrated circuit to be stored in the DAC data latches. FIG. 43 shows the data load timing in relationship to the overall ROIC timing. A "Frame Sync" pulse is provided to establish the frame synchronization. "Line Sync" pulses are supplied at the start of each line time. A master clock, "Clk," is used to drive the array shift registers. During a line readout, column outputs are multiplexed to the ROIC output. At the time a particular column appears at the ROIC output, data is loaded into the data register for that column, to be applied during the subsequent row signal integration time.

As noted above, the circuitry shown in FIG. 41 is a master-slave implementation of a digital parallel/serial data interface. Many other known implementations may be used for loading the correction coefficients into the DACs.

Figure 44:
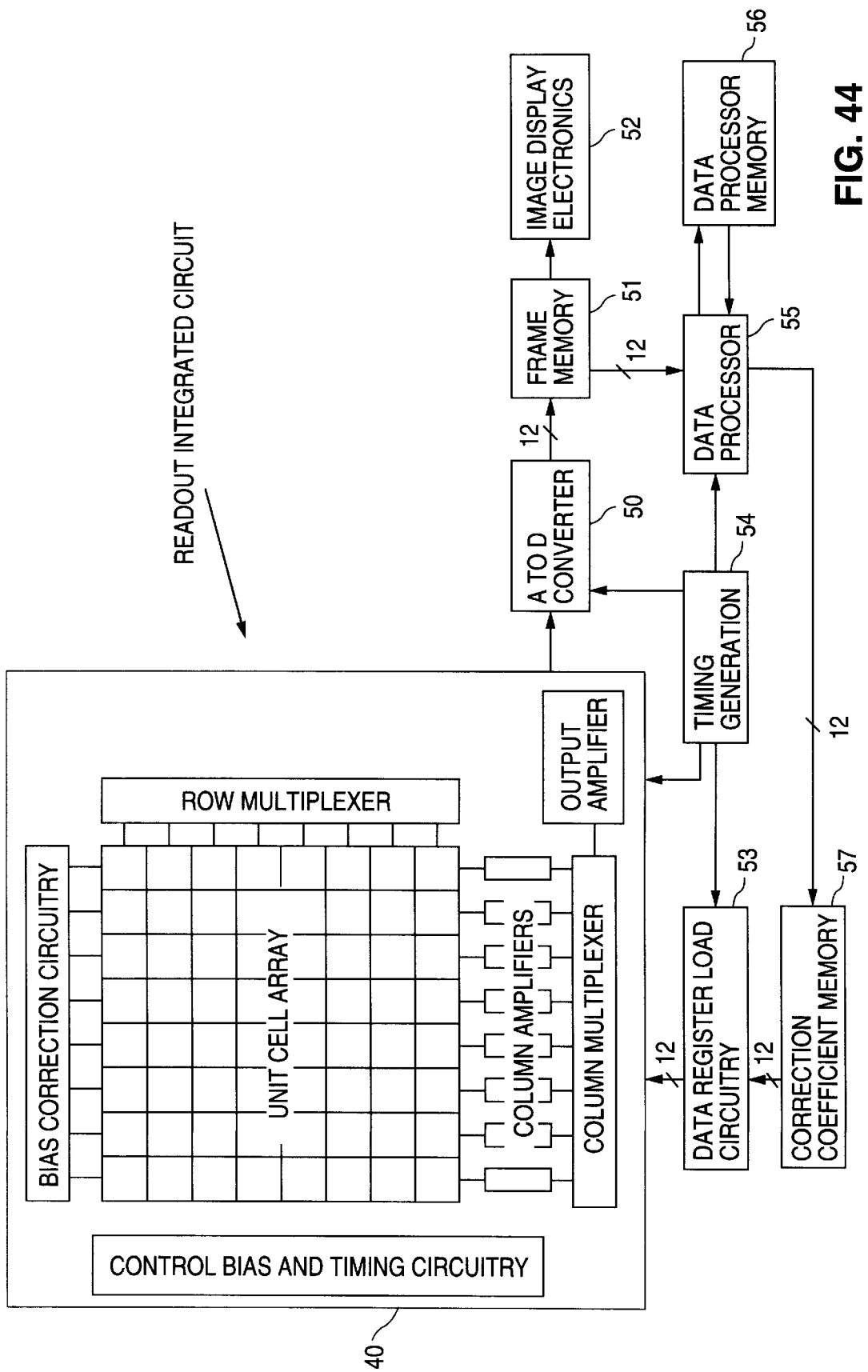
FIG. 44 is an illustration of a microbolometer ROIC with bias-correction circuitry and interface system electronics.

The DAC data words used to generate the bias sources $v_1$, $v_2$, and $v_3$ are generated off the sensor in the system electronics. FIG. 44 illustrates the associated system electronics. The readout integrated circuit 40 is shown in the upper left of this figure. Output signals from the ROIC 40 are digitized by an analog-to-digital converter 50 which may be located on or off the ROIC. The converted digital data is input to a digital frame store memory 51. The data in the frame memory 51 is then available for the system imaging electronics 52 and the system's data processor 55.

The generation of bias-correction data words (or correction coefficients) is accomplished by the data processor 55 using a correction algorithm. Data processor 55 sequences ROIC stimulus, the acquisition of ROIC data, and the calculation of correction coefficients. Data processor 55 then loads the correction coefficients to the correction coefficient memory 57. Data register load circuitry 53 interfacing to the correction coefficient memory 57 is used to load the correction data into the bias correction circuitry 39 on the ROIC 40 by providing valid data to the serial data bus interface at the time that the data register 42 is latched by the shift register 41. FIG. 44 shows a 12-bit implementation for the data paths in the system.

The generation of the bias compensation correction coefficients is accomplished by correction algorithms processed by data processor 55. These algorithms and the data processor 55 sequence a calibration stimulus and the acquisition of the required frames of data. Data processor 55 then calculates the correction coefficients and loads the coefficients to the correction coefficient memory 57. Circuitry interfacing to the correction coefficient memory is used to load the correction data onto the ROIC 40.

Numerous linear and recursive methods may be used to generate the correction coefficients. The simplest method is a linear incremental method. For this method each column DAC is set to the same value starting at the lowest value and is then stepped to each higher value by incrementing the DAC count by the least significant bit. At each DAC count four frames of data are acquired from the ROIC by the data processor. Two of the four frames are taken at the lower limit of the substrate temperature range (Tmin) at two different optical illumination levels (Qmax and Qmin). The two remaining frames are taken at the highest limit of the substrate temperature range (Tmax) at the same two optical illumination levels. The substrate temperatures are chosen to reflect the substrate temperature limits that a given system will generate for the ROIC and the optical stimulus levels are chosen to reflect the optical scene illumination levels. While the ROIC is at the first substrate temperature (Tmin), the DAC values are incremented and output data is acquired for the two optical illumination levels. Once the output frame or image data has been acquired for all DAC values at the first substrate temperature, and for the two optical illumination levels, the process is repeated at the second substrate temperature (Tmax). The acquired data is temporarily stored in memory or on disk storage media. After the frames of data have been acquired, data processor 55 calculates the optical gain at each substrate temperature level for each array element and at each DAC setting. The optical gain is equal to:

$$G = (VQmax - VQmin)/(Qmax - Qmin)$$

where VQmax and VQmin are the outputs at the incident radiation levels of Qmax and Qmin, respectively. The DAC settings are then chosen such that, for each array element, the DAC setting generates the same element optical gain as a ratio to the array mean optical gain at each calibration temperature. That is to say $$\frac{G1(Tmax)}{Gm(Tmax)} = \frac{G1(Tmin)}{Gm(Tmin)}$$
$$\frac{G2(Tmax)}{Gm(Tmax)} = \frac{G2(Tmin)}{Gm(Tmin)}$$
$$\vdots$$
$$\frac{Gn(Tmax)}{Gm(Tmax)} = \frac{Gn(Tmin)}{Gm(Tmin)}$$

where G1(Tmax) . . . Gn(Tmax) and G1(Tmin) . . . Gn(Tmin) are the optical gains of each of the individual detectors at the first and second substrate temperatures, respectively, and Gm(Tmax) and Gm(Tmin) are the mean optical gains of all detectors in the array at the first and second substrate temperatures.

Solving the above equations for Gm(Tmax)/Gm(Tmin) yields:

$$\frac{G1(Tmax)}{G1(Tmin)} = \frac{G2(Tmax)}{G2(Tmin)} = \cdots \frac{Gn(Tmax)}{Gn(Tmin)} = \frac{Gm(Tmax)}{Gm(Tmin)}$$

The DAC settings determined by this process are then stored and loaded as correction coefficients into the correction coefficient memory 57. At this point the intermediate data can be discarded.

It is important to recognize that the optical gains for the corrected array elements at the high and low temperatures are not all required to be the same. Rather, the optical gain ratios of the various detectors between the substrate temperatures are to be stabilized and equalized to the mean optical gain ratio between the substrate temperatures. Once the optical gain ratios are stabilized, a standard two-point correction can be applied to perform the final gain and offset correction as shown in FIGS. 26 and 27 above.

Although the linear method is effective it requires a large amount of systems processor memory to store the intermediate output data (i.e., the output level at each substrate temperature, each level of incident radiation, and each DAC setting) during calibration. For this reason it is desirable to use recursive methods for performing the calibration. Here the optical gain is measured at two different substrate temperatures. The DAC coefficient values are then iterated and again the optical gain is measured at each temperature. The gain ratios are analyzed to determine if they improved or degraded and the DAC coefficients are adjusted accordingly. It is desired that, for each element, the ratio of the optical gain to the mean optical gain remain constant at each substrate temperature. The process is iterated using a successive approximation until the optical gain ratio to the mean gain is stabilized at both substrate temperatures.

The preferred method for the generation of the correction coefficients is one where both linear and recursive methods are used to establish the correction coefficients to stabilize the gains. Here recursive methods can be used to minimize the amount of memory required to support the sensor system and linear methods can be used to fine adjust the calibration.

Comparison of the Traditional and New Microbolometer Bias-correction Methods

As described above, previous methods for performing non-uniformity correction use a two-point compensation technique. The two-point compensation technique corrects for offset and gain transfer function errors and can be implemented on or off of the ROIC.

The bias-correction method may be used to replace the gain correction in the standard two-point correction process for microbolometer detectors. FIGS. 45A, 45B, 45C and 45D illustrate the processing of two detectors for gain and offset correction using the bias-correction method. The graph in FIG. 45A shows the uncorrected detector transfer functions at temperatures Tmin and Tmax. Bias-correction is applied at the detector elements and the gains of the detectors are normalized, as shown in the graph of FIG. 45B. Finally, offset is corrected as shown in the graph of FIG. 45C. Offset correction can be performed on or off the ROIC. It is preferred to perform this function on the ROIC. One advantage over the traditional two-point method is that the bias-correction for gain adjustment sets the dissipated power per array element more uniformly and reduces the substrate temperature sensitivity of the array spatial non-uniformity.

Figure 46:
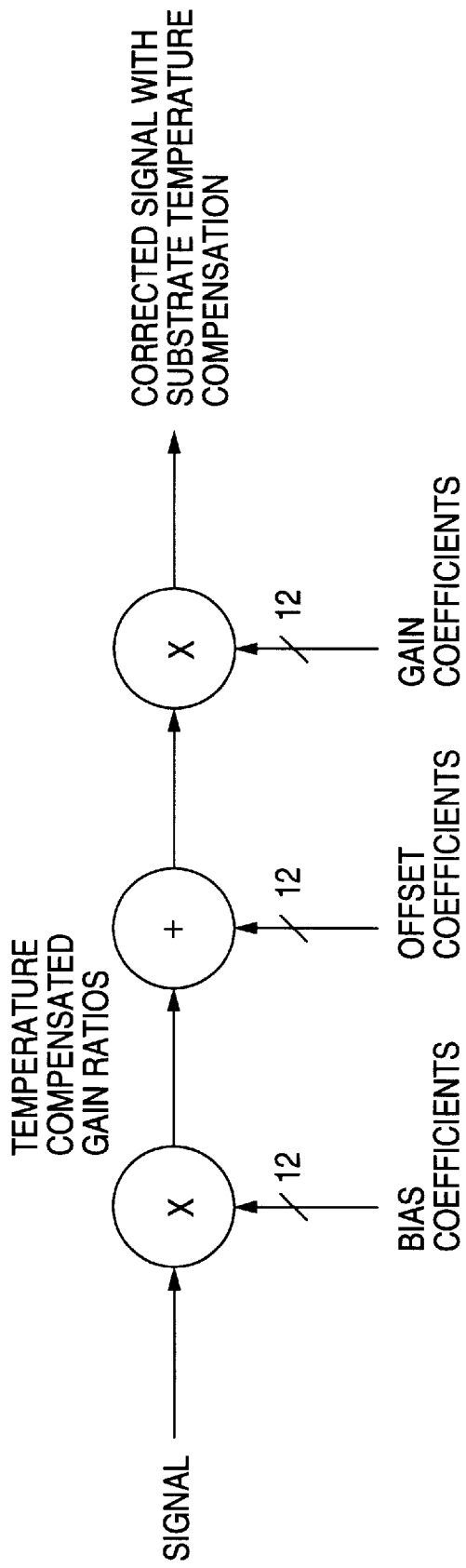
FIG. 46 is a block diagram of bias-corrected three-point non-uniformity compensation technique.

To greatly improve the uniformity compensation with changes in substrate temperature the bias-corrected three-point method can be applied. The application of the bias-correction to the microbolometer array generates a condition wherein the output signal is temperature compensated and compatible with traditional two-point offset and gain correction. FIG. 46 shows the block diagram for this method. The first step is to selectively bias the microbolometer elements. This is followed by a traditional two-point correction process. The bias-correction coefficients are calculated to provide a condition wherein the microbolometer element optical gains as a ratio to the array mean optical gain at each calibration temperature are the same.

Figure 47B:
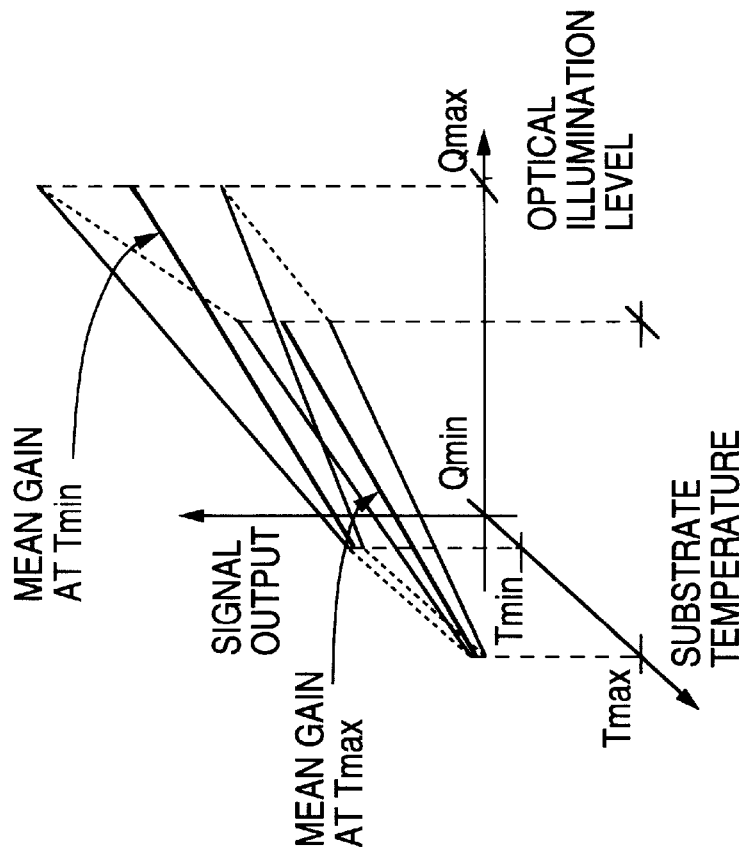
FIGS. 47A and 47B illustrate the bias-corrected three-point non-uniformity compensation technique.
Figure 47A:
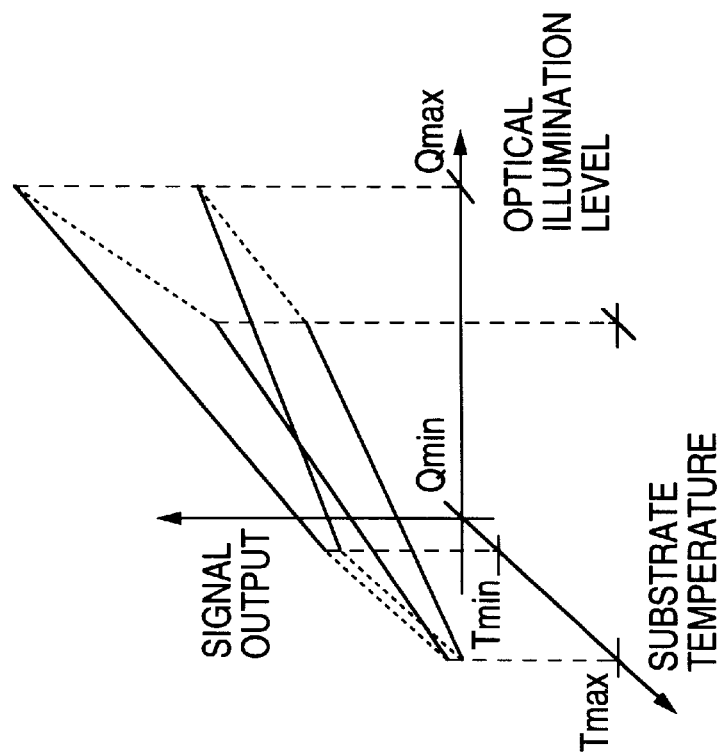
Figure 48B:
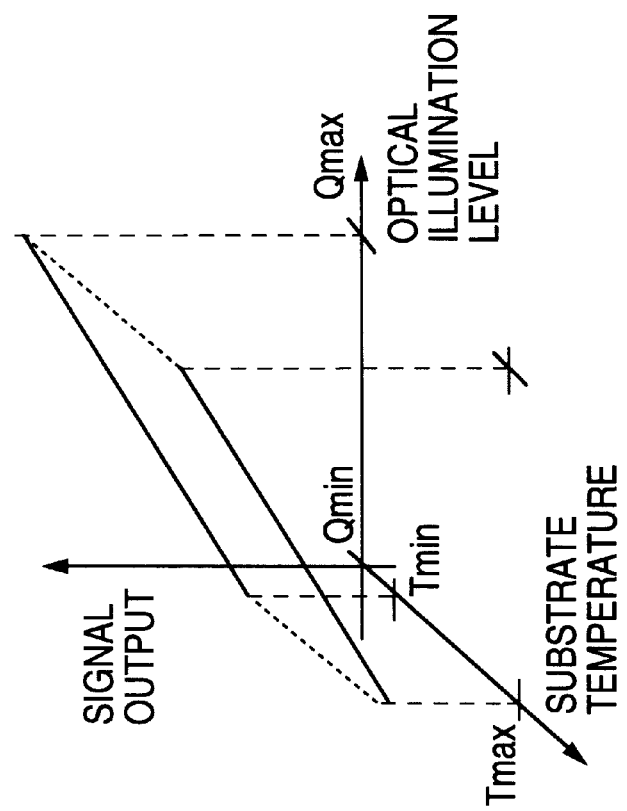
FIGS. 48A and 48B shows an illustration of the bias-corrected three-point non-uniformity compensation technique.
Figure 48A:
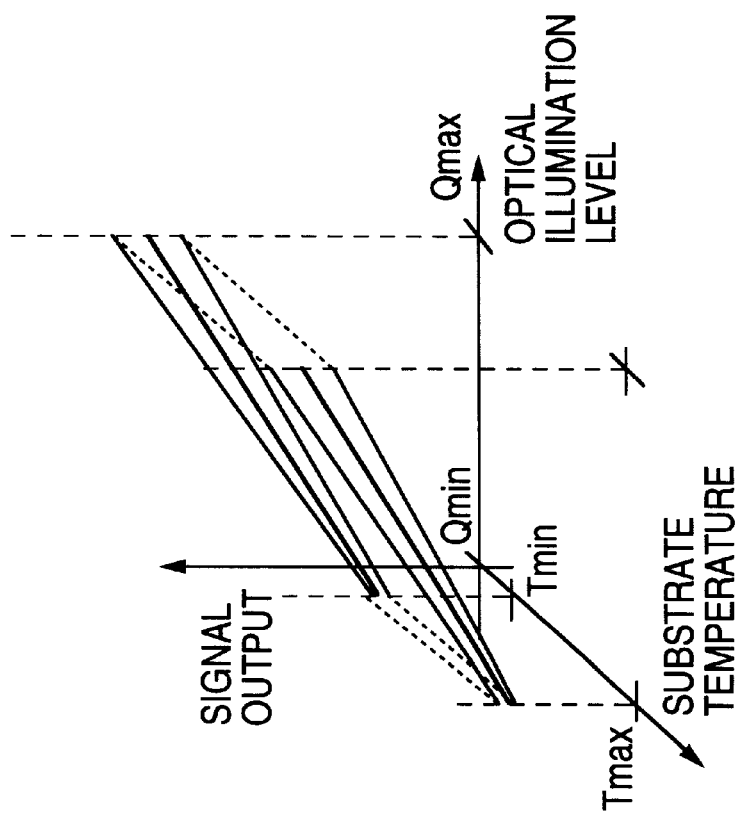

To illustrate the process of bias-corrected three-point non-uniformity compensation a series of three-dimensional plots are shown in FIGS. 47A, 47B and 48A, 48B. FIGS. 47A and 47B illustrate a graph of two detectors' transfer functions at two substrate temperatures Tmin and Tmax. The transfer functions are shown to go between optical illumination levels Qmin to Qmax with the vertical axis showing the signal output. Here the optical gain of the two detectors is shown to change between the two substrate temperatures. FIG. 47B shows the mean gain, (wide gray line), for the two detectors at Tmin and Tmax. The gain ratio compensation step sets the bias for each microbolometer element such that the ratio of the optical gain of each detector to the mean optical gain of all the detectors in the array remains the same at each substrate temperature. FIG. 48A shows the two detectors after bias-correction for gain ratio compensation. This process results in substrate temperature compensated spatial non-uniformity that can be corrected using the traditional two-point gain and offset correction. Detector optical gain ratios are compensated at the substrate temperature minimum and maximum (Tmin and Tmax). FIG. 48B shows the result of traditional two-point correction compensation applied after bias-correction.

Figure 49:
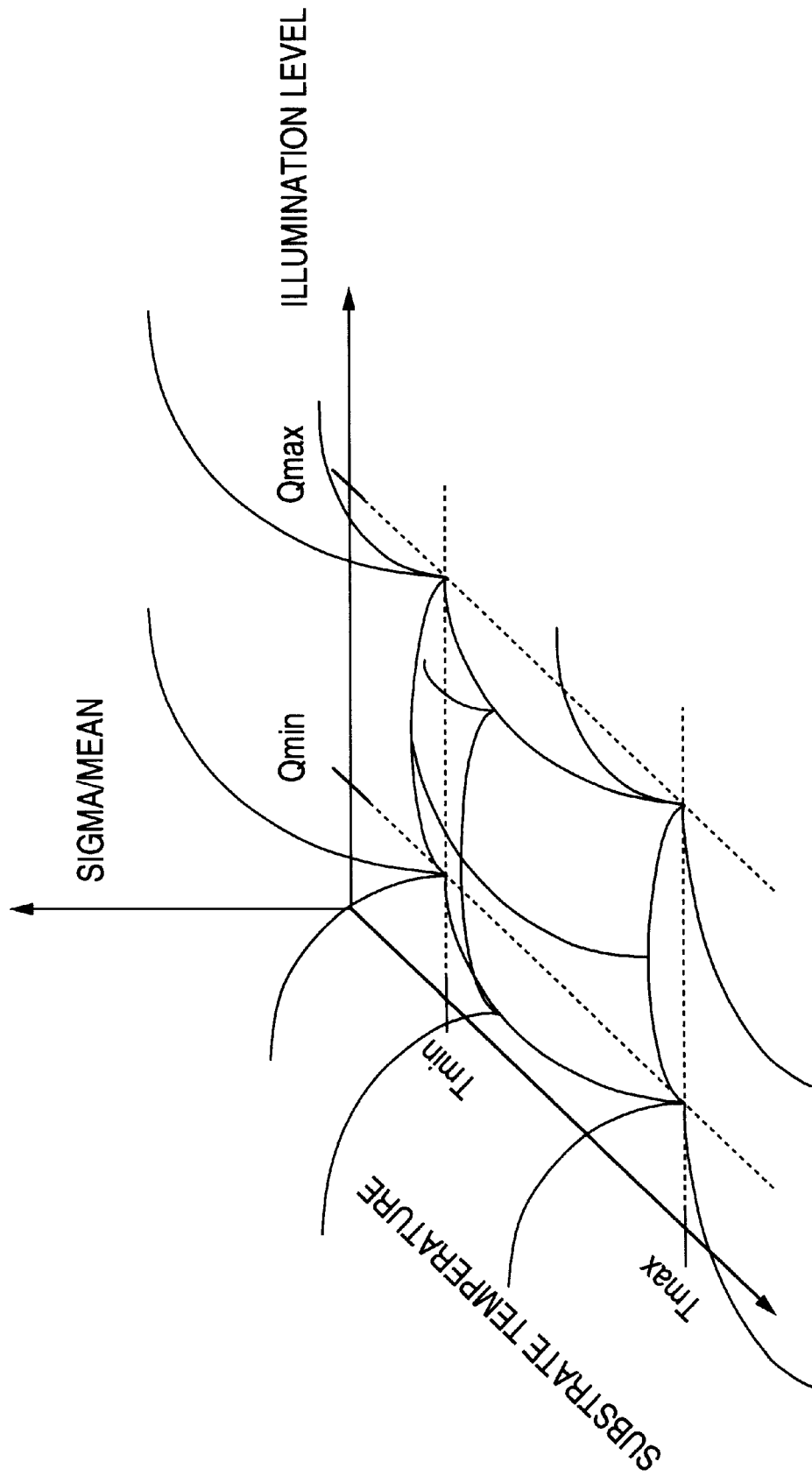
FIG. 49 is an illustration of resulting spatial non-uniformity for bias-corrected three-point calibration.

FIG. 49 shows the spatial non-uniformity after applying the bias-corrected three-point correction process. It can be seen that the region between optical signal levels Qmin to Qmax and substrate temperature range Tmin to Tmax provides a lower level of spatial non-uniformity.

Figure 50A:
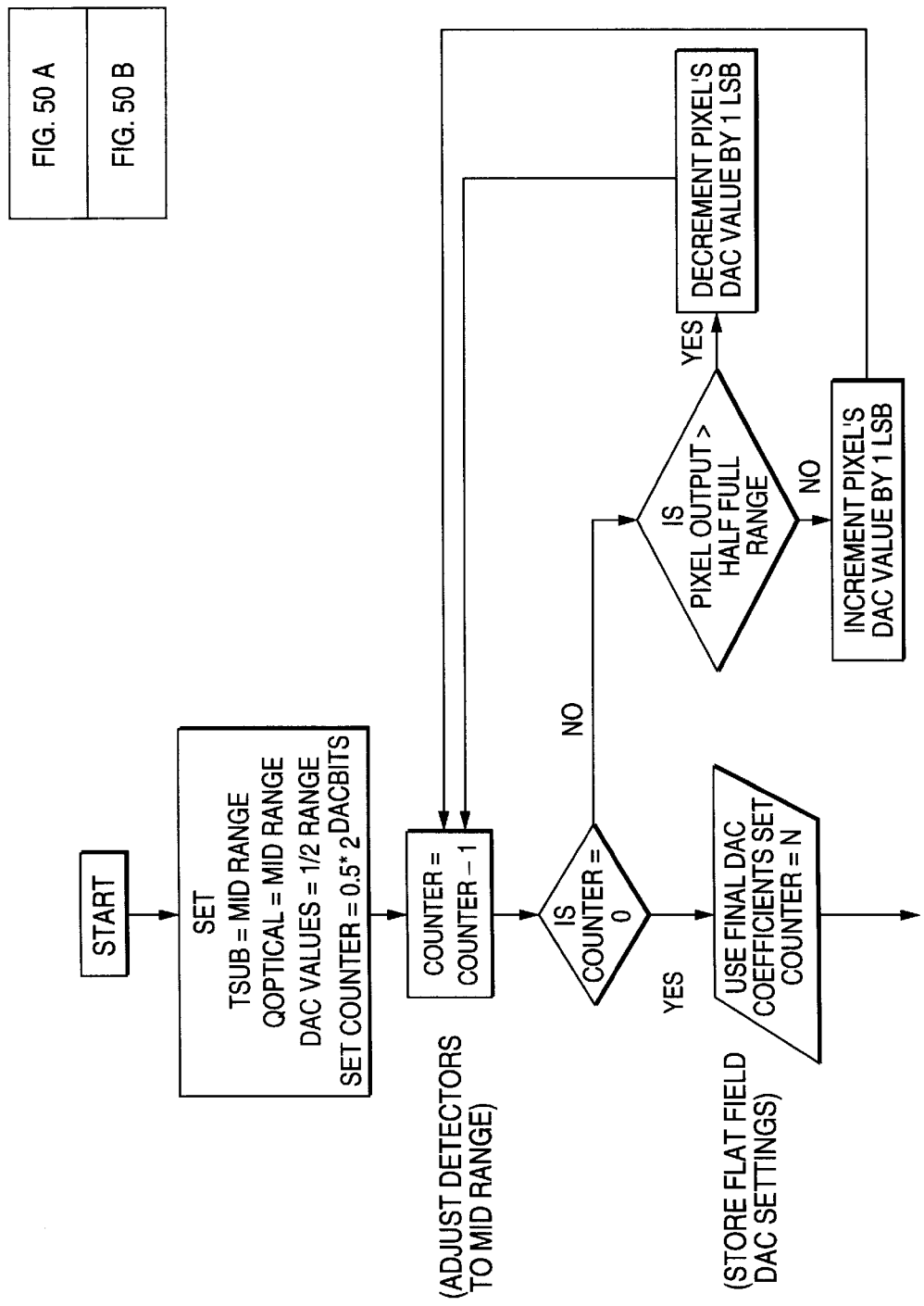
FIGS. 50A and 50B show a flow diagram for bias compensated gain two-point correction coefficient generation.
Figure 50B:
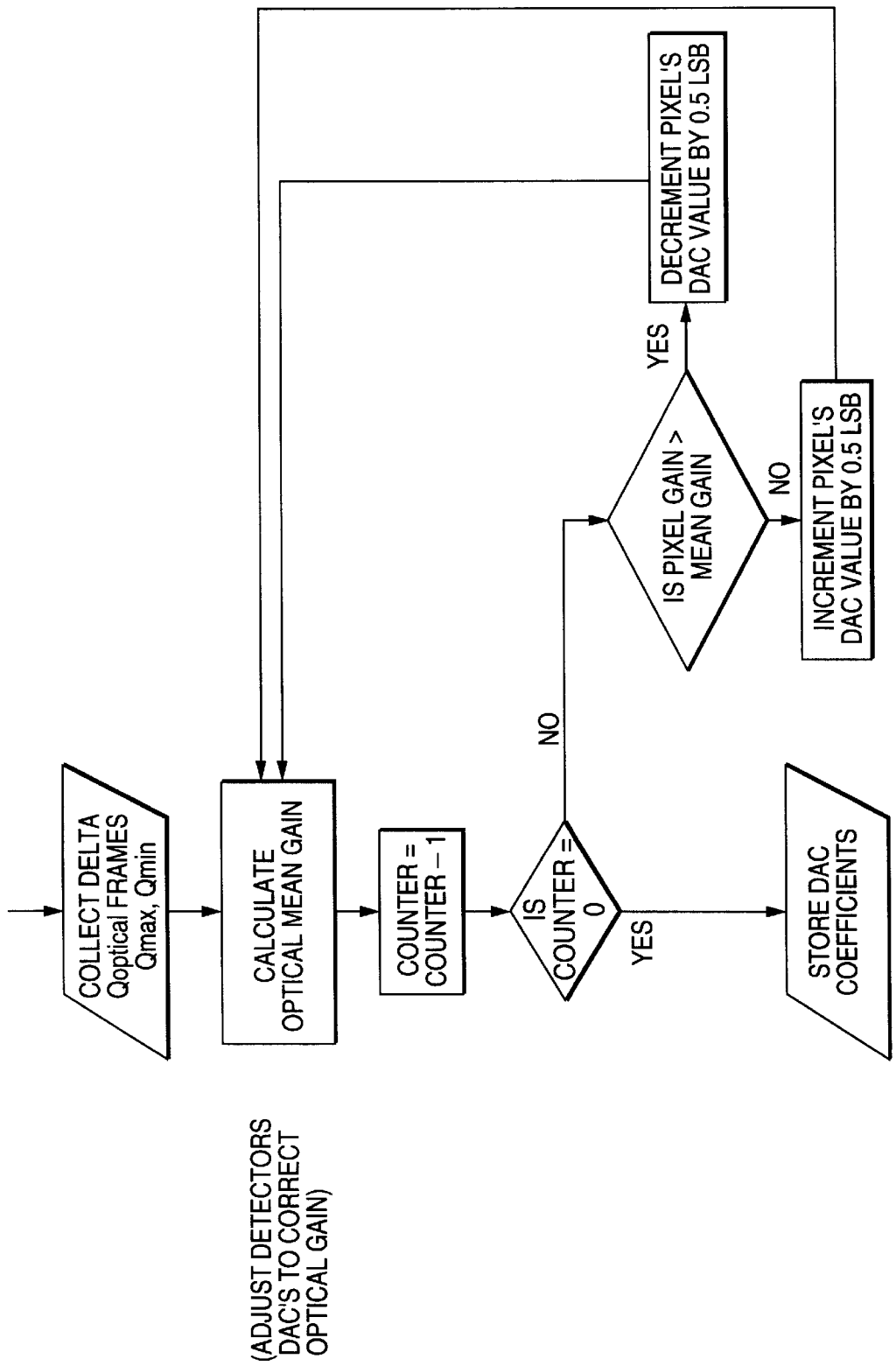

Preferred Methods For Two- and Three-Point Compensation Using The Bias Correction Technique Two flow diagrams are shown to illustrate the procedure to generate the bias-correction coefficients, which are the digital words to be input to the DACs which constitute the adjustable voltage sources such as adjustable voltage source 36 in FIG. 26. The first diagram is shown in FIGS. 50A and 50B, and it illustrates the calculation of bias coefficients for the bias-corrected two-point compensation method. Two correction loops are shown. The first loop, shown in FIG. 50A, sets Tsub (substrate temperature) and Qoptical (optical illumination level) to mid-range. The bias coefficients are then iterated such that the output signal is driven to mid-range. The result of this process is the centering of the dynamic range and the generation of "flat field" correction coefficients.

The second loop, shown in FIG. 50B, generates the bias-correction coefficients. The array temperature is set to Tnominal (the midpoint between Tmin and Tmax) and the illumination level is controlled to provide the signal Qmin and Qmax as required. The "flat field" coefficients are used as a starting value and the second loop counter is preset to the number of desired iterations (for example, 64 to 128, depending on the gain non-uniformity magnitude). At each iteration the optical gain of each detector is measured and the array mean optical gain is calculated. Bias-correction coefficient values are decremented for detectors with an optical gain greater than the mean optical gain and bias-correction coefficient values are incremented for detectors with an optical gain less than the mean optical gain. The resulting bias-correction coefficients are used to provide gain term correction by applying a bias compensation to each detector. Bias coefficients are represented in the flow diagram as DAC coefficients.

Figure 51B:
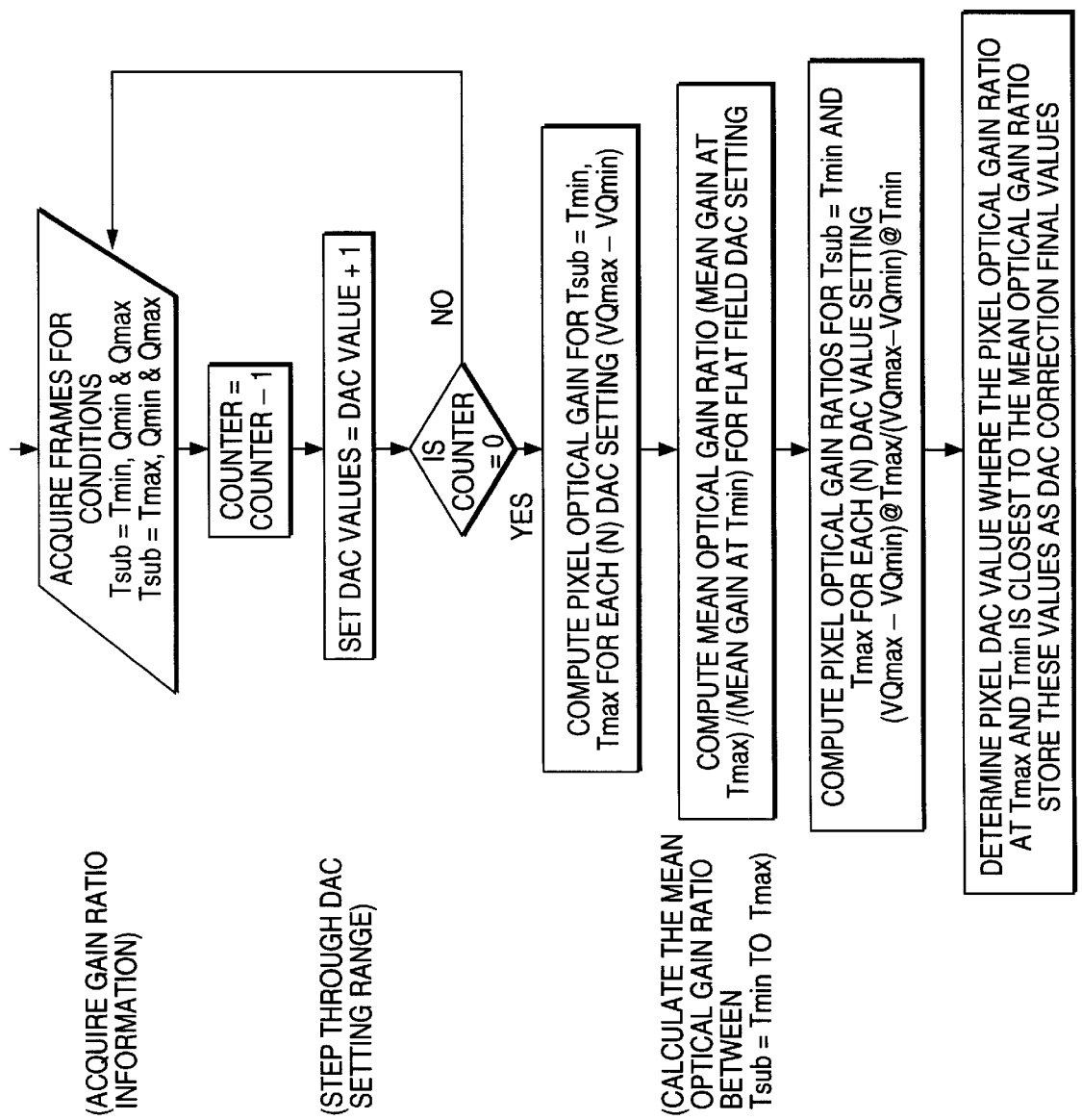

The second diagram is shown in FIGS. 51A and 51B and illustrates the calculation of bias coefficients for the bias-corrected three-point compensation method. Two correction loops are shown. The first loop, shown in FIG. 51A, sets Tsub (substrate temperature) and Qoptical (optical illumination level) to mid-range. The bias coefficients are then iterated such that the output signal is driven to mid-range. The result of this process is the centering of the dynamic range and the generation of "flat field" correction coefficients.

The second loop, shown in FIG. 51B, generates the bias-correction coefficients for the bias-corrected three-point method by collecting the data necessary to choose the correction coefficients that provide the best gain ratio temperature compensation. The "flat field" coefficients, minus the number of second loop iterations divided by two, are used as starting bias-correction coefficient values. The second loop counter is preset to the number of desired iterations (for example, 64 to 128, depending on the gain non-uniformity magnitude). At each iteration the microbolometer array signal is measured for Qmin and Qmax for the substrate temperatures Tmin and Tmax. The bias-correction coefficients are then incremented by 1 before the start of the next iteration. After all output data is acquired, the optical gain for each detector is calculated for each bias-correction coefficient setting and each substrate temperature. The mean optical gain is then calculated for Tmin and Tmax using the "flat field" bias-correction coefficient values. The mean optical gain value at Tmin is then divided by the mean optical gain value at Tmax to establish the mean optical gain ratio. For every bias-correction coefficient setting used in the second loop, the ratio of optical gain at Tmin to optical gain at Tmax is calculated for each detector. The detector optical gain ratios are then analyzed to select the bias-correction coefficient value that provides the detector optical gain ratio closest to the mean optical gain ratio between Tmin and Tmax. The resulting DAC coefficients are used to provide gain term correction by applying a bias compensation to each detector.

IV. On-ROIC Substrate Temperature Control Method for Microbolometer Detector Arrays Due to non-uniformity correction limitations, previous microbolometer focal plane arrays have required accurate control of the substrate temperature. By applying the pre-bias or bias-correction methods as described, requirements for substrate temperature control can be relaxed such that on-ROIC substrate temperature control is now possible.

Figure 52:
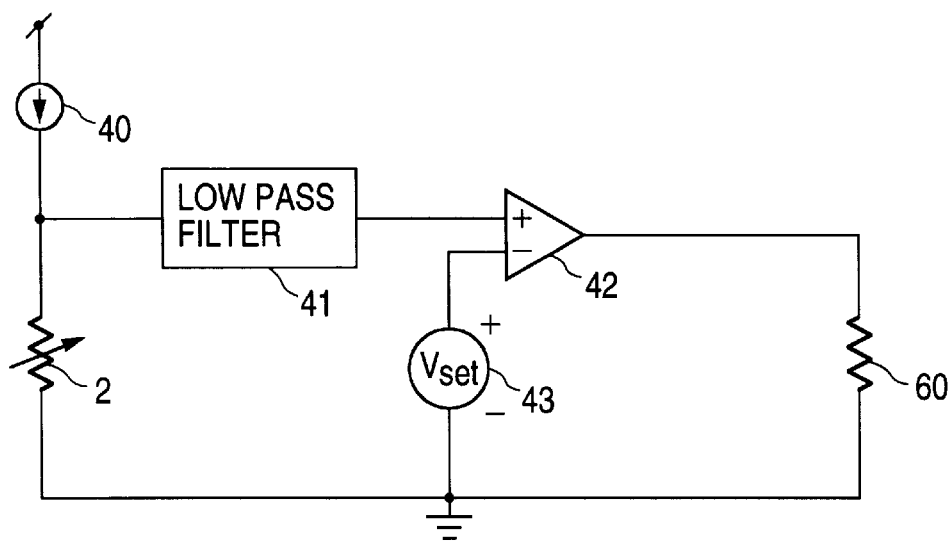
FIG. 52 is a schematic diagram for a circuit to perform on-ROIC substrate temperature control.

FIG. 52 illustrates a circuit to perform on-ROIC substrate temperature control. Here current source 40 supplies a constant current through a thermally-shorted microbolometer 2. This circuit is used to sense the substrate temperature. An amplifier 42 drives an on-ROIC resistor 60 to heat the ROIC substrate to a constant temperature. A voltage source 43 is used to set the desired substrate temperature. A low pass filter 41 is used at the input of amplifier stabilize the thermal control loop.

Figure 53:
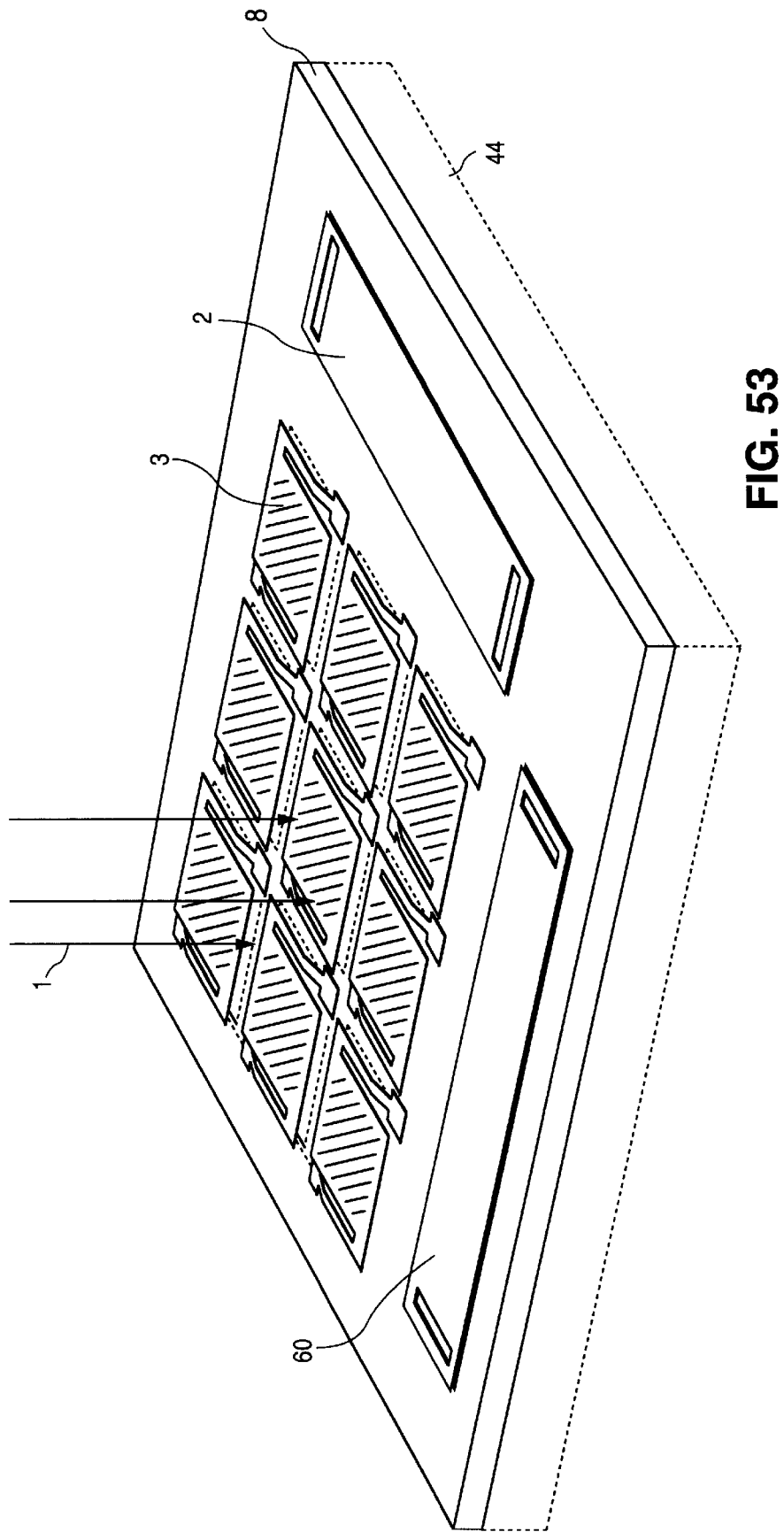
FIG. 53 is a schematic diagram for a microbolometer focal plane array with on-ROIC thermal control circuitry.

FIG. 53 shows the resistor elements required to implement on the ROIC circuitry to control the temperature of the ROIC substrate 8. Shown are the substrate temperature sensor resistor (thermally-shorted microbolometer 2) and the heating element resistor 60. This heating element will heat the substrate of the array and control the substrate temperature above room temperature. A material with a low thermal conductivity, such as silica glass 44, is used to provide a thermal standoff from the surrounding environment.

The methods and circuitry disclosed in this application now make it feasible to control the substrate of the array by heating instead of cooling. The benefit of heating the substrate is that it is much easier and cheaper to control the substrate temperature by heating than by cooling, since the prior art required cooling below room temperature and controlling it to a fraction of a degree. The methods and circuitry disclosed in this application therefore greatly simplify the requirements for the practical operation of microbolometer infrared focal plane arrays.

V. On-ROIC Offset Correction Method for Microbolometer Detector Arrays

Many of the preceding embodiments show a voltage bias Vload connected to the thermally-shorted microbolometer (see, e.g., FIGS. 21–24 and 29–35). The bias Vload is used to adjust the load current and thereby optimize the operating point of the circuit by setting the output voltage or current at a desired point within a range of outputs. In those embodiments, the bias Vload is typically a single voltage level set for the entire array of microbolometers.

In further embodiments according to this invention a unique voltage bias is applied to each thermally-shorted microbolometer to provide a fine adjustment to the load voltage or current and thereby correct for offset errors in the output signals from the thermally-isolated microbolometers. This on-ROIC offset adjustment can supplant either the conventional offset correction to the output signal illustrated in FIGS. 26 and 27 or both the conventional offset and gain corrections.

Figure 54:
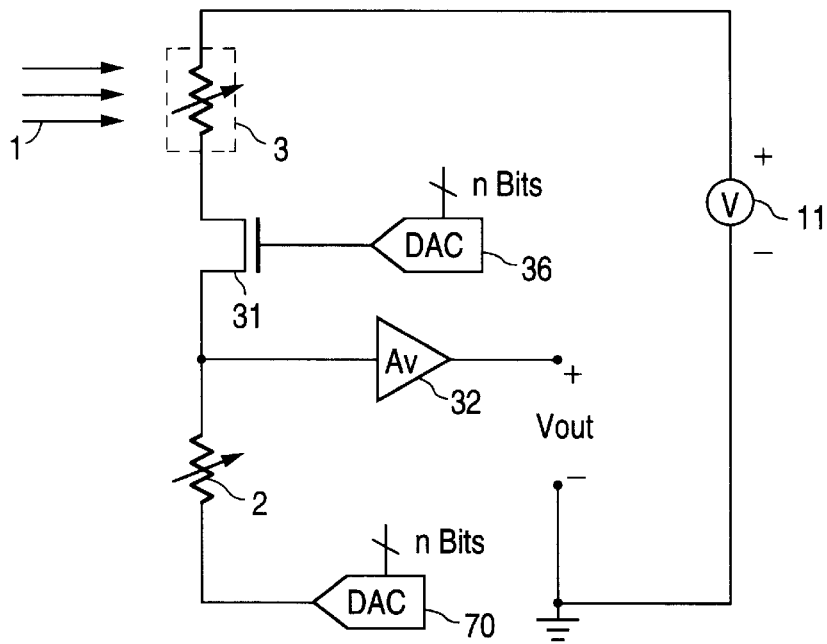
FIG. 54 is a schematic diagram of a circuit for applying an adjustable load bias to the thermally-shorted microbolometer to provide an adjustable voltage offset.

FIG. 54 illustrates a first embodiment of this aspect of the invention. It will be noted that FIG. 54 is identical to FIG. 29 except that a second DAC 70 has been substituted for the bias Vload. DAC 70 provides a unique output voltage to the negative terminal of the thermally-shorted microbolometer 2.

As in FIG. 29, DAC 36 drives the gate of the common gate amplifier or MOSFET 31 so as to provide a variable bias for the thermally-isolated microbolometer 3. The potential of the voltage source 11 and voltage at the source of the P-channel MOSFET 31 establish the voltage across the active microbolometer 3. The voltage at the drain of MOSFET 31 is typically biased such the MOSFET 31 is saturated. Since amplifier 32 has a high-impedance input, the currents through microbolometers 2 and 3 are essentially the same. Thus the voltage across microbolometer 2 is equal to the product of (i) the current through microbolometer 3 and (ii) the resistance of microbolometer 2. The voltage at the input to amplifier 32 is in turn equal to the sum of this product and the voltage provided by DAC 70. Since microbolometer 3 and the combination of microbolometer 3 and MOSFET 31 act as a voltage divider, with the input to amplifier 32 as the midpoint, the voltage at the input to amplifier 32 can be adjusted by changing the output of DAC 70. DAC 70 can be used in this way in effect to remove the offset from the output of the circuit.

Figure 55:
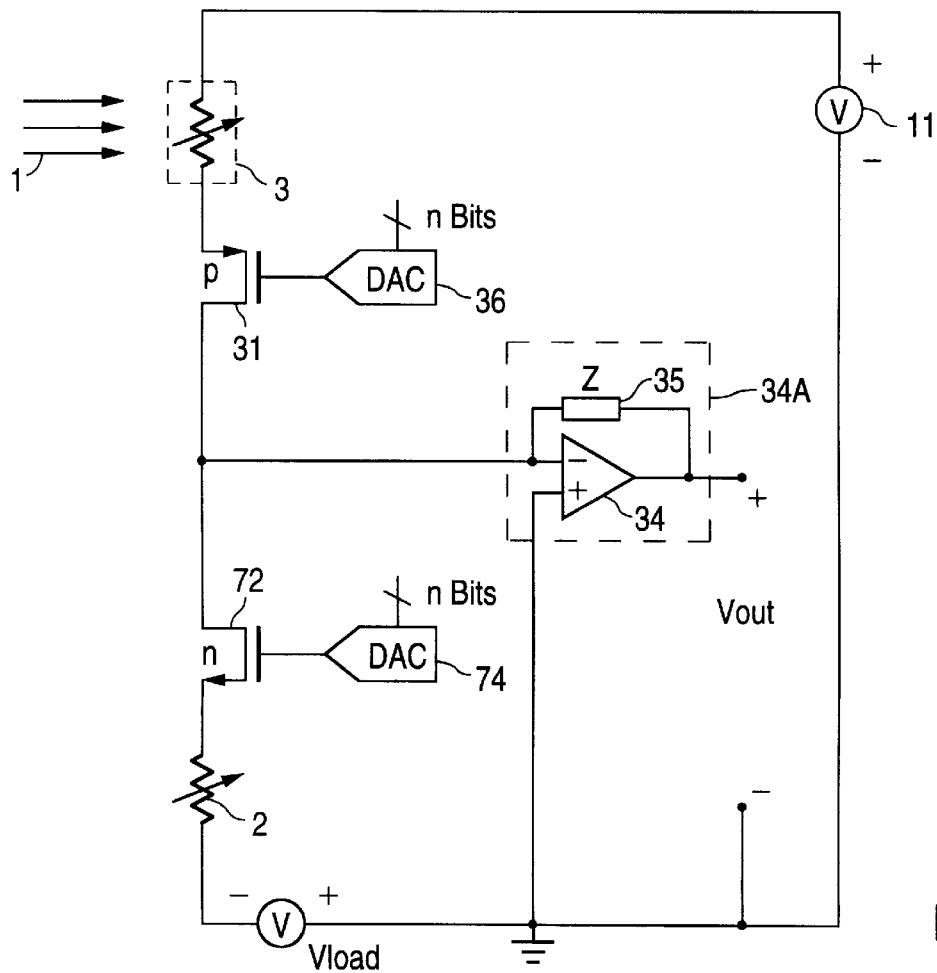
FIG. 55 is a schematic diagram of a circuit for applying an adjustable bias to a transistor in series with the thermally-shorted microbolometer to provide an adjustable current offset.

Another embodiment is shown in FIG. 55. The circuit of FIG. 55 is similar to the circuit shown in FIG. 32, except that an N-channel MOSFET 72 is connected between the drain of P-channel MOSFET 31 and microbolometer 2, the gate of MOSFET 72 being driven by a DAC 74 (also, row enable transistor 16 is not shown in FIG. 55).

While FIGS. 54 and 55 show the application of this aspect of the invention on circuits of the kind shown in FIGS. 29 and 32, respectively, it will be understood that the adjustment of the offset by varying the bias applied to the thermally-shorted microbolometer can also be applied to other circuits, including those which provide a non-uniform bias to the thermally-isolated microbolometer (see, e.g., FIGS. 30, 31, 34, 35), and those which provide a uniform bias to the thermally-isolated microbolometer (see, e.g., FIGS. 21–24).

Charge integrator or transimpedance amplifier 34A is connected to the common point between the drain of P-channel MOSFET 31 and N-channel MOSFET 72. Since the transimpedance amplifier 34A has a low-impedance input, the current flowing into transimpedance amplifier 34A is the difference between the current in microbolometer 3 and the current in thermally-shorted microbolometer 2. The current through microbolometer 2 is determined by the voltage across microbolometer 2, which is established by DAC 74 bias Vload. That voltage is equal to the difference between −Vload and the voltage at the source of MOSFET 72 which is essentially a threshold drop below the gate voltage applied by DAC 74. The current through microbolometer 3 is determined by the resistance of microbolometer 3 and the difference between the voltage source 11 and the source potential of MOSFET 31 which is typically operated in a saturated condition. The net effect is that the output of DAC 74 can be used to control the portion of the current through microbolometer 3 that flows into the inverting input of transimpedance amplifier 34A.

The setting of DAC 70 in FIG. 54 is determined separately for each microbolometer detector in the array and is applied synchronously with the input to DAC 36. Similarly, the setting of DAC 74 in FIG. 55 is determined separately for each microbolometer detector in the array and is applied synchronously with the input to DAC 36.

These settings are determined by a calibration process which is designed to equalize the offsets of the outputs of the microbolometers in the array. Initially, DAC 36 is calibrated as described above, with the input to DAC 70 or 74 at mid-range. After DAC 36 has been calibrated, The substrate temperature is set to the midpoint between Tmin and Tmax, and the level of incident radiation is set to the midpoint between Qmin and Qmax. DAC 70 or 74 is then incremented upward or downward by an iterative process until the output of amplifier 32 (in the embodiment of FIG. 54) or the current into transimpedance amplifier 34A (in the embodiment of FIG. 55) is at the desired level.

The use of the "offset" DACs 70 and 74 may allow the conventional offset correction illustrated in FIGS. 26 and 27 to be eliminated. Even if the conventional offset correction cannot be totally eliminated, the use of DACs 70 and 74 greatly improves the uniformity and quality of the signals at the outputs of the microbolometers. This in turn simplifies the circuitry that is required to perform the conventional corrections.

The offset and gain corrections are normally implemented as a part of the integration stage or after the integration stage, on or off of the ROIC, and either in analog or digital form. The circuitry required for these normal corrections is typically more expensive, more involved and more complex than the additional circuitry required to perform offset correction on the ROIC. This is particularly true if the system must withstand significant temperature differences.

Thus, the principles of this invention may be implemented in a wide variety of circuit devices and materials. Accordingly, the embodiments described above are only exemplary of the principles of the invention and are not intended to limit the invention to the specific embodiments disclosed.

We claim:

1. A microbolometer detector circuit comprising:
   a substrate;
   a first microbolometer detector attached to but substantially thermally isolated from said substrate;
   a second microbolometer detector thermally shorted to said substrate, said second microbolometer detector being for providing temperature compensation for said first microbolometer detector;
   a first voltage source, said first and second microbolometers being connected in series in a conduction path supplied by said first voltage source;
   a transistor connected between said first and second microbolometer detectors in said conduction path, a gate of said transistor being connected to a second voltage source; and
   a variable voltage source coupled to said second microbolometer detector for providing a variable voltage across said second microbolometer detector.

2. The microbolometer detector circuit of claim 1 wherein said variable voltage source comprises a digital-to-analog converter connected to a negative terminal of said second microbolometer detector.

3. The microbolometer detector circuit of claim 1 wherein said variable voltage source comprises a second transistor connected in series between said first and second microbolometer detectors and a second digital-to-analog converter connected to a gate of said second transistor.

4. The microbolometer detector circuit of claim 1 wherein said second voltage source comprises a digital-to-analog converter.

5. The microbolometer detector circuit of claim 4 wherein said digital-to-analog converter is for providing a bias for correcting for variations in the properties of said first microbolometer detector.

6. The microbolometer detector circuit of claim 5 wherein said variable voltage source comprises a second digital-to-analog converter connected to a negative terminal of said second microbolometer detector.

7. The microbolometer detector circuit of claim 5 wherein said variable voltage source comprises a second transistor connected in series between said first and second microbolometer detectors and a second digital-to-analog converter connected to a gate of said second transistor.

8. A microbolometer detector circuit comprising:
   a substrate;
   a first microbolometer detector attached to but substantially thermally isolated from said substrate;
   a digital-to-analog converter coupled to said first microbolometer detector for providing a bias for correcting for variations in the properties of said first microbolometer detector; and
   a second microbolometer thermally-shorted to said substrate, said first and second microbolometer detectors being connected in series in a conduction path extending from an output of said digital-to-analog converter; and
   a variable voltage source coupled to said second microbolometer detector for providing a variable voltage across said second microbolometer detector.

9. The microbolometer detector circuit of claim 8 wherein said variable voltage source comprises a second digital-to-analog converter connected to a negative terminal of said second microbolometer detector.

10. The microbolometer detector circuit of claim 8 wherein said variable voltage source comprises a second transistor connected in series between said first and second microbolometer detectors and a second digital-to-analog converter is connected to a gate of said second transistor.

11. A method of detecting a level of incident radiation comprising:
    providing a first microbolometer detector, said first microbolometer detector being attached to but substantially thermally isolated from a substrate;
    providing a second microbolometer detector, said second microbolometer detector being thermally connected to said substrate;
    connecting said first and second microbolometers in a series conduction path;
    applying a first variable voltage to said first microbolometer detector;
    applying a second variable voltage to said second microbolometer detector; and
    detecting a resistance of said first microbolometer detector, said resistance being representative of the level of said radiation.

12. The method of claim 11 wherein the step of detecting the resistance of said first microbolometer detector is performed during a sampling period, the steps of applying said first and second variable voltages being performed during said sampling period.

13. The method of claim 11 wherein the step of detecting the resistance of said first microbolometer detector is performed during a sampling period, the step of applying said first variable voltage being performed before the beginning of said sampling period, the step of applying said second variable voltage being performed during said sampling period.

14. The method of claim 11 further comprising the step of performing a first calibration process to determine the level of said first variable voltage, said first calibration process comprising the steps of:
    detecting an output of said first microbolometer detector at a first substrate temperature and at a first level of incident radiation;
    detecting an output of said first microbolometer detector at said first substrate temperature and at a second level of incident radiation;
    detecting an output of said first microbolometer detector at a second substrate temperature and at said first level of incident radiation;
    detecting an output of said first microbolometer detector at said second substrate temperature and at said second level of incident radiation.

15. The method of claim 14 further comprising the step of performing a second calibration process to determine the level of said second variable voltage, said second calibration process comprising the steps of:
    setting said first variable voltage at a level determined by said first calibration process;
    detecting an output of said first microbolometer detector at a first level of said second variable voltage; and
    detecting an output of said first microbolometer detector at a second level of said second variable voltage.

16. The method of claim 15 wherein said microbolometer detector is included in an array of microbolometer detectors and said first calibration process comprises applying a linear incremental technique to outputs of microbolometer detectors in said array.

17. The method of claim 15 wherein said microbolometer detector is included in an array of microbolometer detectors and said calibration process includes applying a recursive technique to outputs of microbolometer detectors in said array.

* * * * *